United States Patent

Abreu

(10) Patent No.: US 11,523,674 B2
(45) Date of Patent: Dec. 13, 2022

(54) SUPPORT SYSTEM FOR ELECTRONIC DEVICE

(71) Applicant: GeeLux Holdings, Ltd., Tortola (VG)

(72) Inventor: Marcio Marc Abreu, Bridgeport, CT (US)

(73) Assignee: GeeLux Holdings, Ltd., Tortola (VG)

( * ) Notice: Subject to any disclaimer, the term of this patent is extended or adjusted under 35 U.S.C. 154(b) by 0 days.

(21) Appl. No.: 15/882,389

(22) Filed: Jan. 29, 2018

(65) Prior Publication Data

US 2018/0213921 A1   Aug. 2, 2018

Related U.S. Application Data

(63) Continuation of application No. 14/992,879, filed on Jan. 11, 2016, now Pat. No. 9,913,526.

(Continued)

(51) Int. Cl.
*A45F 5/00* (2006.01)
*A45F 5/02* (2006.01)
(Continued)

(52) U.S. Cl.
CPC ............... *A45F 5/00* (2013.01); *A45C 11/00* (2013.01); *A45F 5/02* (2013.01); *A45F 5/021* (2013.01); *A45F 5/022* (2013.01); *F16B 1/00* (2013.01); *F16B 2/06* (2013.01); *F16B 2/10* (2013.01); *F16B 2/12* (2013.01); *A45C 2200/15* (2013.01); *A45F 2005/006* (2013.01); *A45F 2200/05* (2013.01); *A45F 2200/0508* (2013.01); *A45F 2200/0516* (2013.01); *F16B 2001/0035* (2013.01); *H04R 1/1033* (2013.01); *H04R 2205/021* (2013.01)

(58) Field of Classification Search
CPC .... A45F 2200/0516; A45F 5/021; A45F 5/02; A45F 2200/0508; A45F 5/004; A45C 2011/002; Y10T 24/3451; Y10T 24/31; Y10T 24/3452; Y10S 224/93; B25B 3/00; B25B 5/00
USPC ................. 224/255–256, 930, 162, 254, 257
See application file for complete search history.

(56) References Cited

U.S. PATENT DOCUMENTS 147,325 A * 2/1874 House ...................... A41B 3/08
24/328
1,505,884 A * 8/1924 Goldquist .............. A45C 11/38
206/225
(Continued)

FOREIGN PATENT DOCUMENTS

TW            425028 U      3/2001

OTHER PUBLICATIONS

International Search Report; PCT/US16/12888 dated Jun. 17, 2016.
(Continued)

*Primary Examiner* — Adam J Waggenspack
(74) *Attorney, Agent, or Firm* — Studebaker & Brackett PC

(57) ABSTRACT

Systems and apparatuses for supporting electronic devices are described. Such systems and apparatuses provide significant adaptability to position an electronic device in commonly used locations by using an interface that is readily provided in virtually any location. Furthermore, the systems and apparatuses described herein include cradles that adaptable to a wide array of electronic device dimensions, including width and depth or thickness.

7 Claims, 51 Drawing Sheets

Related U.S. Application Data

(60) Provisional application No. 62/102,020, filed on Jan. 10, 2015.

(51) Int. Cl.
    *A45C 11/00*      (2006.01)
    *F16B 1/00*      (2006.01)
    *F16B 2/06*      (2006.01)
    *F16B 2/10*      (2006.01)
    *F16B 2/12*      (2006.01)
    *H04R 1/10*      (2006.01)

(56) References Cited

U.S. PATENT DOCUMENTS

| | | | | |
|---|---|---|---|---|
| 6,229,893 | B1* | 5/2001 | Chen | B60R 11/0241 |
| | | | | 379/446 |
| 6,834,820 | B2* | 12/2004 | Wei | B65H 75/4449 |
| | | | | 191/12.2 R |
| 6,932,309 | B1 | 8/2005 | Corey et al. | |
| 7,103,944 | B2* | 9/2006 | Johnson | A47J 36/06 |
| | | | | 220/315 |
| 8,668,122 | B2* | 3/2014 | Case | A45F 3/02 |
| | | | | 224/218 |
| 8,783,531 | B2* | 7/2014 | Kroupa | B65H 75/4431 |
| | | | | 224/162 |
| 9,392,349 | B2* | 7/2016 | Merenda | H04R 1/1033 |
| 2004/0069823 | A1 | 4/2004 | Condiff | |
| 2005/0255898 | A1 | 11/2005 | Huang | |
| 2006/0105819 | A1 | 5/2006 | Liao | |
| 2007/0263350 | A1 | 11/2007 | Lin et al. | |
| 2008/0041857 | A1* | 2/2008 | Johnson | B65D 45/26 |
| | | | | 220/318 |
| 2011/0203955 | A1* | 8/2011 | Fasula | A45C 3/02 |
| | | | | 206/320 |
| 2012/0200102 | A1* | 8/2012 | McMeans | A45C 1/04 |
| | | | | 294/149 |
| 2013/0129138 | A1* | 5/2013 | Washington, Jr. | H04R 1/1033 |
| | | | | 381/384 |
| 2014/0042294 | A1 | 2/2014 | Marzynski et al. | |
| 2015/0028071 | A1* | 1/2015 | Brillon, Jr. | A45F 5/021 |
| | | | | 224/247 |
| 2016/0273703 | A1* | 9/2016 | Li | A45F 5/00 |

OTHER PUBLICATIONS

Written Opinion of the International Searching Authority; PCT/US16/12888 dated Jun. 17, 2016.

"Review PUREX Technology 7" to 8.5" Tablet Desk mount/clamp and stand with swivel base and extended arm—PX" Ciacoi Review; 2014; pp. 1-3. <URL:http://giacoi.com/18369431-review-purex-technology-7-to-8-5-tablet-desk-mountclamp-and-stand-with-swivel-base-and-extend-arm-px.html>.

International Preliminary Report on Patentability; PCT/US2016/012888 dated Jul. 20, 2017.

\* cited by examiner

FIG. 22
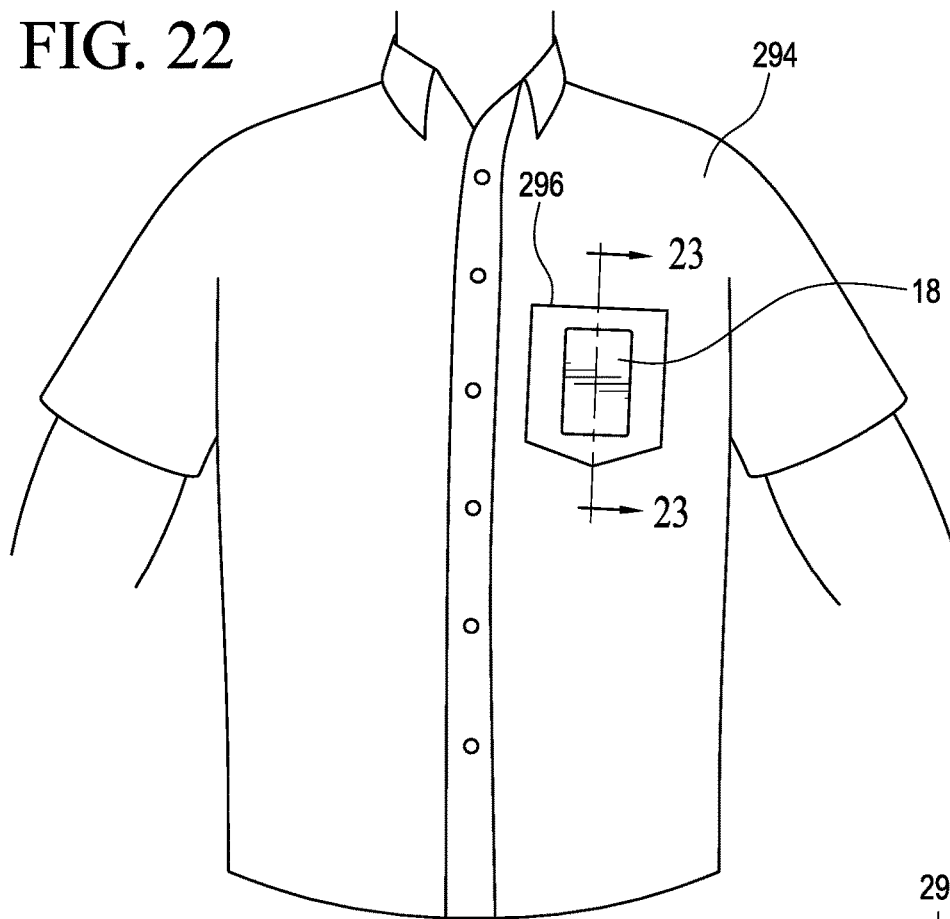
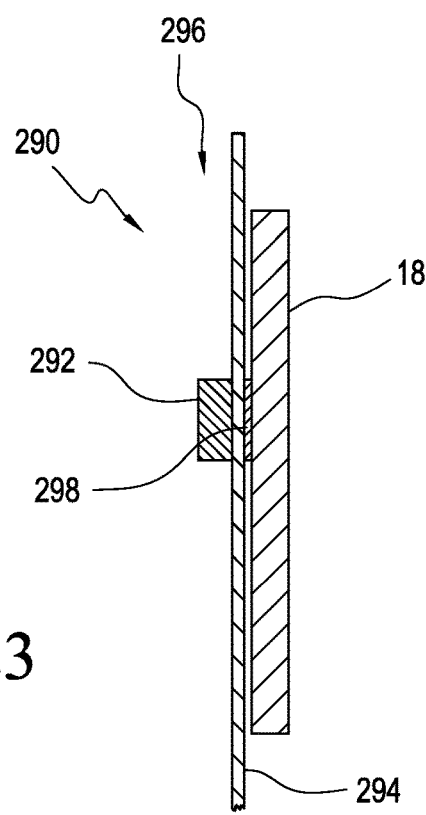
FIG. 23

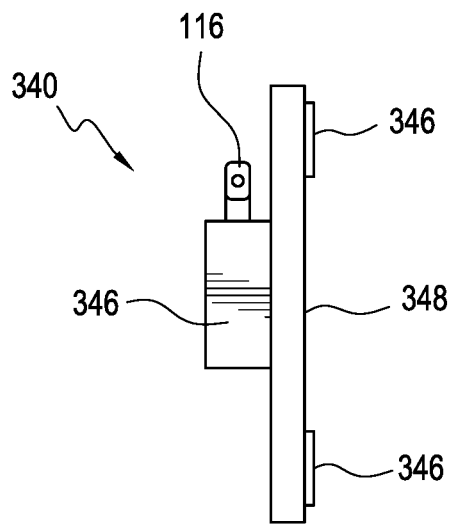
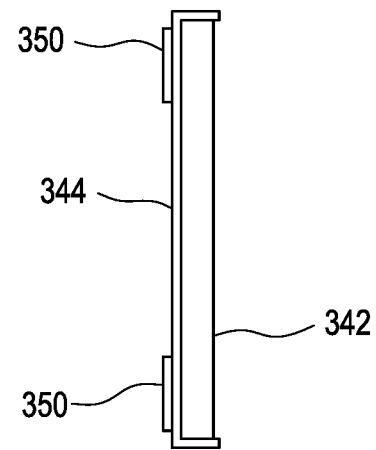
FIG. 38  FIG. 39
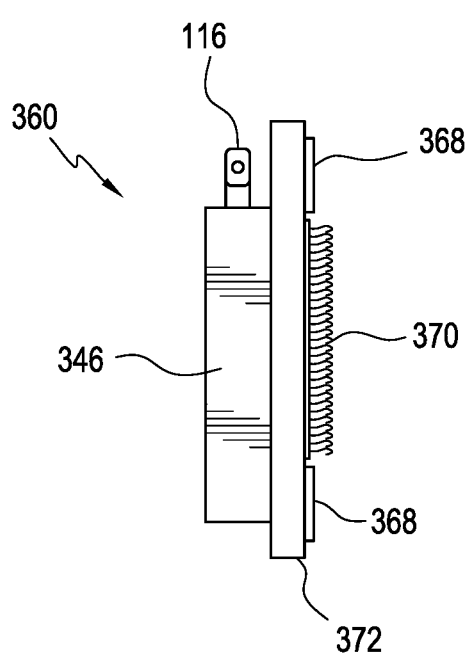
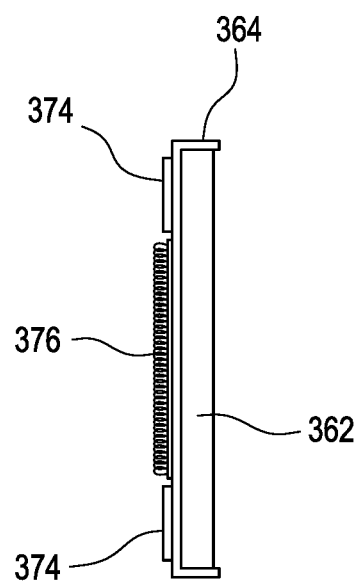
FIG. 40  FIG. 41

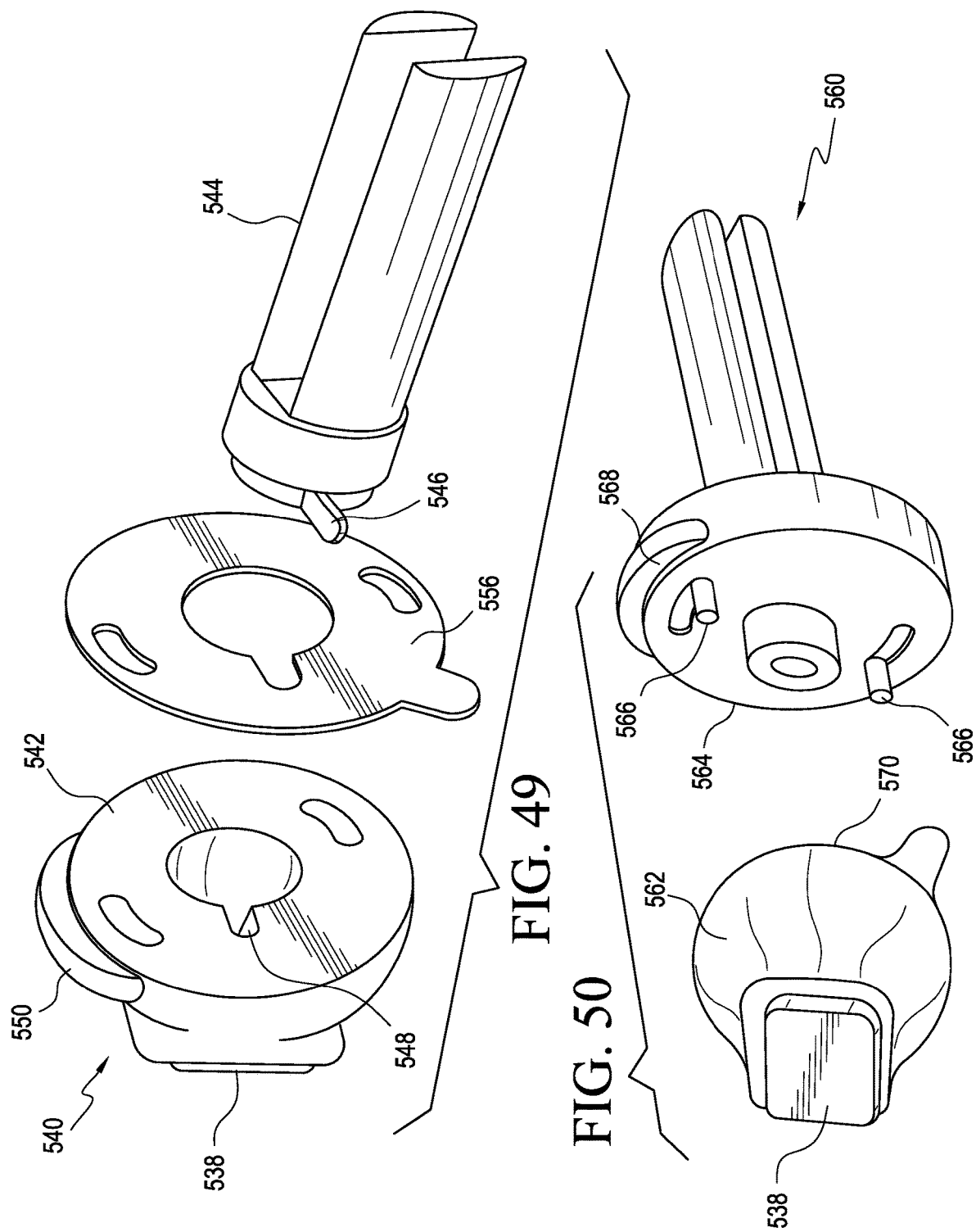

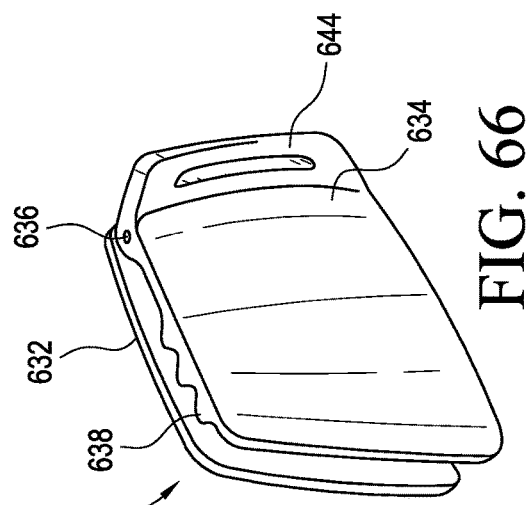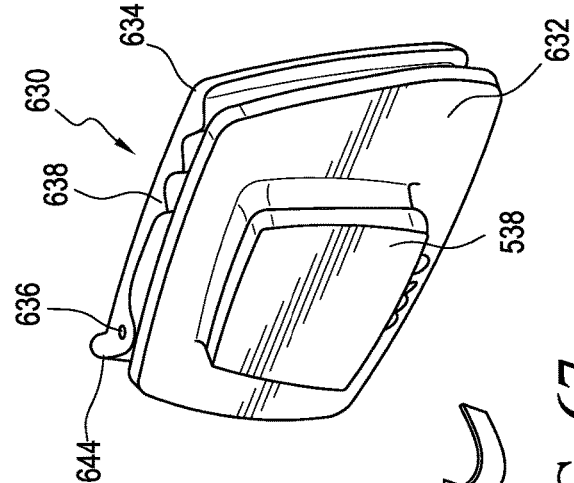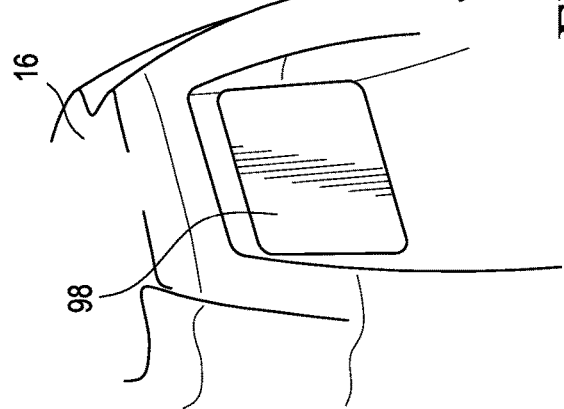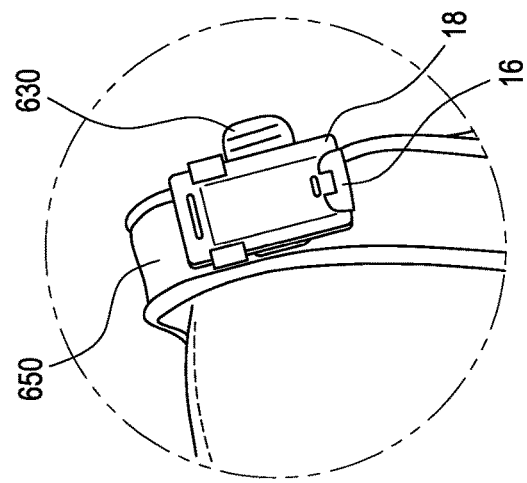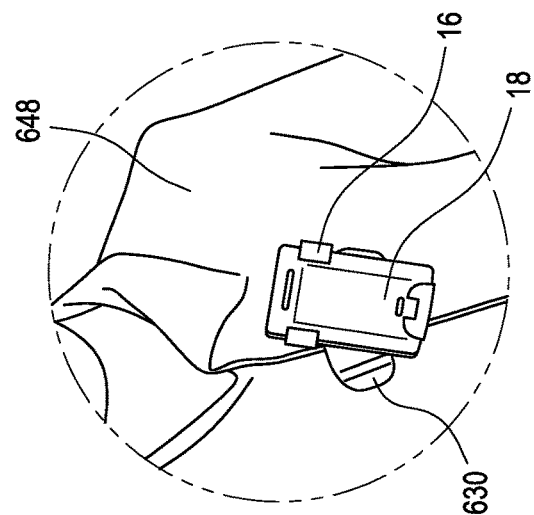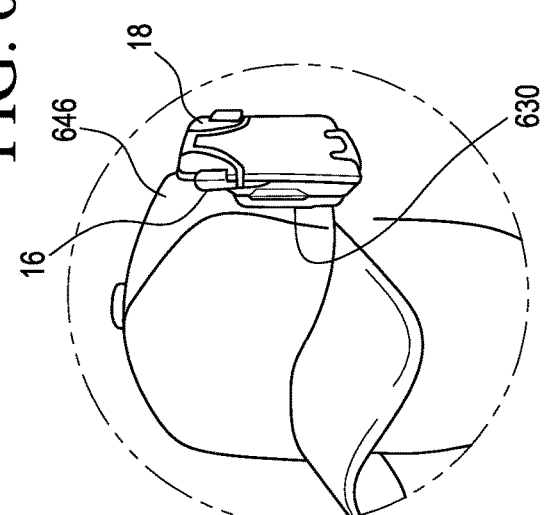

SUPPORT SYSTEM FOR ELECTRONIC DEVICE

CROSS-REFERENCE TO RELATED APPLICATIONS

This application is a continuation of application of U.S. patent application Ser. No. 14/992,879, filed Jan. 11, 2016, which claims the benefit of priority to U.S. Provisional Patent Application No. 62/102,020, filed on Jan. 10, 2015, which is hereby incorporated by reference in its entirety.

TECHNICAL FIELD

This disclosure relates to systems that support electronic devices.

BACKGROUND

Support systems for electronic devices include cases or covers and holsters. Some holsters are configured to support a case or cover.

SUMMARY

This disclosure provides a support for an electronic device, comprising a housing, a magnet, a first arm, a second arm, and an end bracket. The housing includes a pocket on a first side of the housing and a surface on the opposite side of the housing from the first side on which is positioned the electronic device. The magnet is fixedly secured in the pocket. The first arm is pivotally supported by the housing and is configured to be biased to contact an edge of the electronic device. The second arm is pivotally supported by the housing and is configured to be biased to contact an opposite edge of the electronic device. The end bracket is movably supported by the housing and configured to move a spaced distance that is the same as a thickness of the electronic device when the electronic device is positioned on the housing.

This disclosure also provides a support for an electronic device comprising a first rotatable arm, a second rotatable arm, and an end bracket. The first rotatable arm is configured to contact a first edge of the electronic device. The second rotatable arm is configured to contact a second edge of the electronic device different from the first edge. The end bracket is configured to contact a third edge of the electronic device different from the first edge and the second edge.

This disclosure also provides a system for supporting an electronic device comprising a wearable article, a strap, a plate, and a cradle. The strap extends from the wearable article. The plate is positioned on an end of the strap. The cradle is configured to support the electronic device on at least two opposite sides of the electronic device. The cradle includes a housing and a magnet positioned on the housing, the plate being configured to be attracted to the magnet by magnetic force.

This disclosure also provides a support system for an electronic device comprising a wearable article, a pocket formed on the wearable article, a first magnet positioned in the pocket, and a second magnet affixed to the electronic device. The second magnet is positioned on the wearable article such that the electronic device is supported on the wearable article by attraction of the second magnet to the first magnet.

This disclosure also provides a support system for an electronic device comprising a housing. The housing includes at least two first side retainers positioned on opposite sides of the housing from each other, a housing side positioned at an end of the housing, and a top retainer positioned on an opposite end of the housing from the end of the housing. The two side retainers, the housing side, and the top retainer are configured to secure the electronic device in the housing.

This disclosure also provides a support system for an electronic device, comprising a flexible and stretchable support base, a top retainer; and a bottom retainer positioned a spaced distance from the top retainer. The bottom retainer is movable by stretching of the support base to increase the spaced distance to enable insertion or removal of the electronic device.

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 22 is a view a support system in accordance with a further exemplary embodiment of the present disclosure.

FIG. 23 is a sectional view of the support system of FIG. 22 along lines 23-23.

FIG. 38 is a side or edge view of a cradle in accordance with an exemplary embodiment of the present disclosure.

FIG. 39 is a side or edge view of a case and electronic device configured to mate with the cradle of FIG. 38.

FIG. 40 is a side or edge view of a cradle in accordance with another exemplary embodiment of the present disclosure.

FIG. 41 is a side or edge view of a case and electronic device configured to mate with the cradle of FIG. 40.

FIG. 49 is a view of a portion of a support system in accordance with an exemplary embodiment of the present disclosure.

FIG. 50 is a view of a portion of a support system in accordance with an exemplary embodiment of the present disclosure.

FIG. 66 is another view of the clamp apparatus of FIG. 62.

FIG. 67 is a view of the clamp apparatus of FIG. 62 and a cradle in accordance with an exemplary embodiment of the present disclosure.

FIG. 68 is a view of the clamp apparatus of FIG. 62 positioned on a first wearable article in accordance with an exemplary embodiment of the present disclosure.

FIG. 69 is a view of the clamp apparatus of FIG. 62 on a second wearable article in accordance with an exemplary embodiment of the present disclosure.

FIG. 70 is a view of the clamp apparatus of FIG. 62 on a third wearable article in accordance with an exemplary embodiment of the present disclosure.

DETAILED DESCRIPTION

Cases for electronic devices are configured to support such devices in a variety of ways. A case may include a built-in stand. Mounts for such cases are also known. However, cases are configured to mate with one specific electronic device, mounts are cumbersome, and insertion of an electronic device into such mounts can require two hands and significant dexterity. The present disclosure describes systems and apparatuses for supporting electronic devices. Such systems and apparatuses provide significant adaptability to position an electronic device in commonly used locations by using an interface that is readily provided in virtually any location. Furthermore, the systems and apparatuses described herein include cradles that are adaptable to a wide array of electronic device dimensions, including width and depth or thickness, and the electronic device can be inserted using one hand by virtue of the structure design and arms that are adapted for easily inserting and removing the electronic device and by virtue of the springs in the structure. Electronic device includes any electrical device or electronic device, and by way of example, includes cellular telephone or any telephone, radio, GPS, camera, display, wireless device, Bluetooth device, processor, controller, memory device, computer, tablet, health monitoring device, clock or any watch device, two-way radio, audio device, voice recorder, infrared image device, radio reflective system, television, any touch-screen device, and the like.

Figure 1:
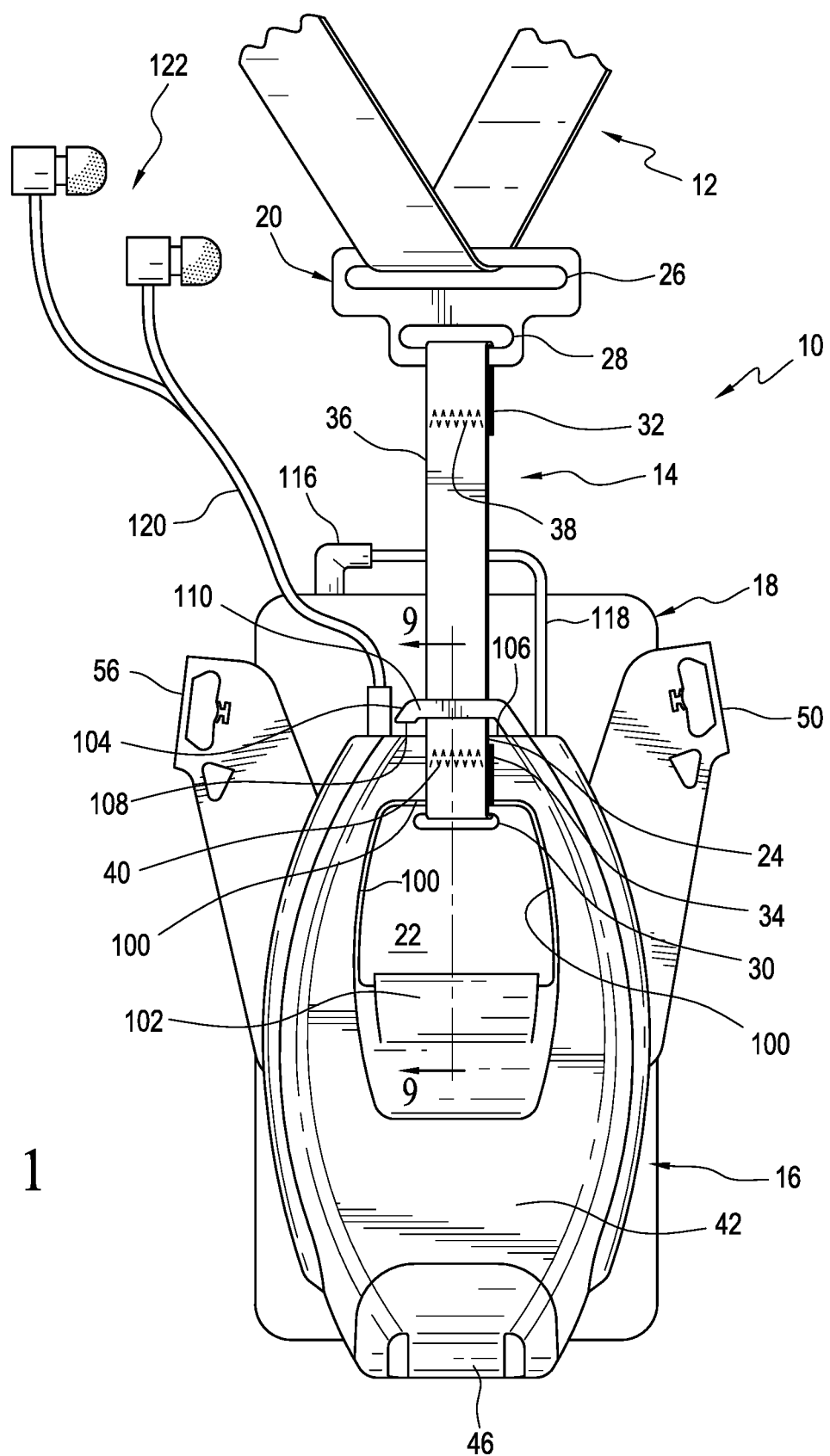
FIG. 1 is a view of a support system in accordance with an exemplary embodiment of the present disclosure.

FIGS. 1-9 and 12 are views of a support system 10 in accordance with an exemplary embodiment of the present disclosure. Support system 10 includes a wearable article 12, an interface portion 14, and cradle 16. As shown in FIG. 1, cradle 16 is supporting an electronic device 18.

In the exemplary embodiment of FIG. 1, wearable article 12 is configured as a lanyard, which may be supported by a neck of a user. Interface portion 14 extends between wearable article 12 and cradle 16. In the exemplary embodiment of FIGS. 1 and 12, interface portion 14 includes a buckle 20, a plate 22, and a strap 24 extending from buckle 20 to plate 22.

For comfort of a wearer, lanyard 12 includes a first width configured to provide a wide support area for the wearer's neck. Such first width can be the width of a first opening 26 formed in an element described in more detail hereinbelow. It should be understood that a thin cord can be used as a wearable article and that this cord can have small dimensions. Such cords are described further hereinbelow. It should also be understood that a wide flat lanyard can be used as wearable article and that this lanyard can have a large range of dimensions. Such first width can be, for example, about 1.5 mm to about 150 mm; preferably about 5 mm to about 35 mm, and most preferably about 12 mm to about 26 mm. Yet most preferably such first width can have dimensions ranging from equal to or larger than 1.5 mm to equal to smaller than 150 mm.

Figure 19:
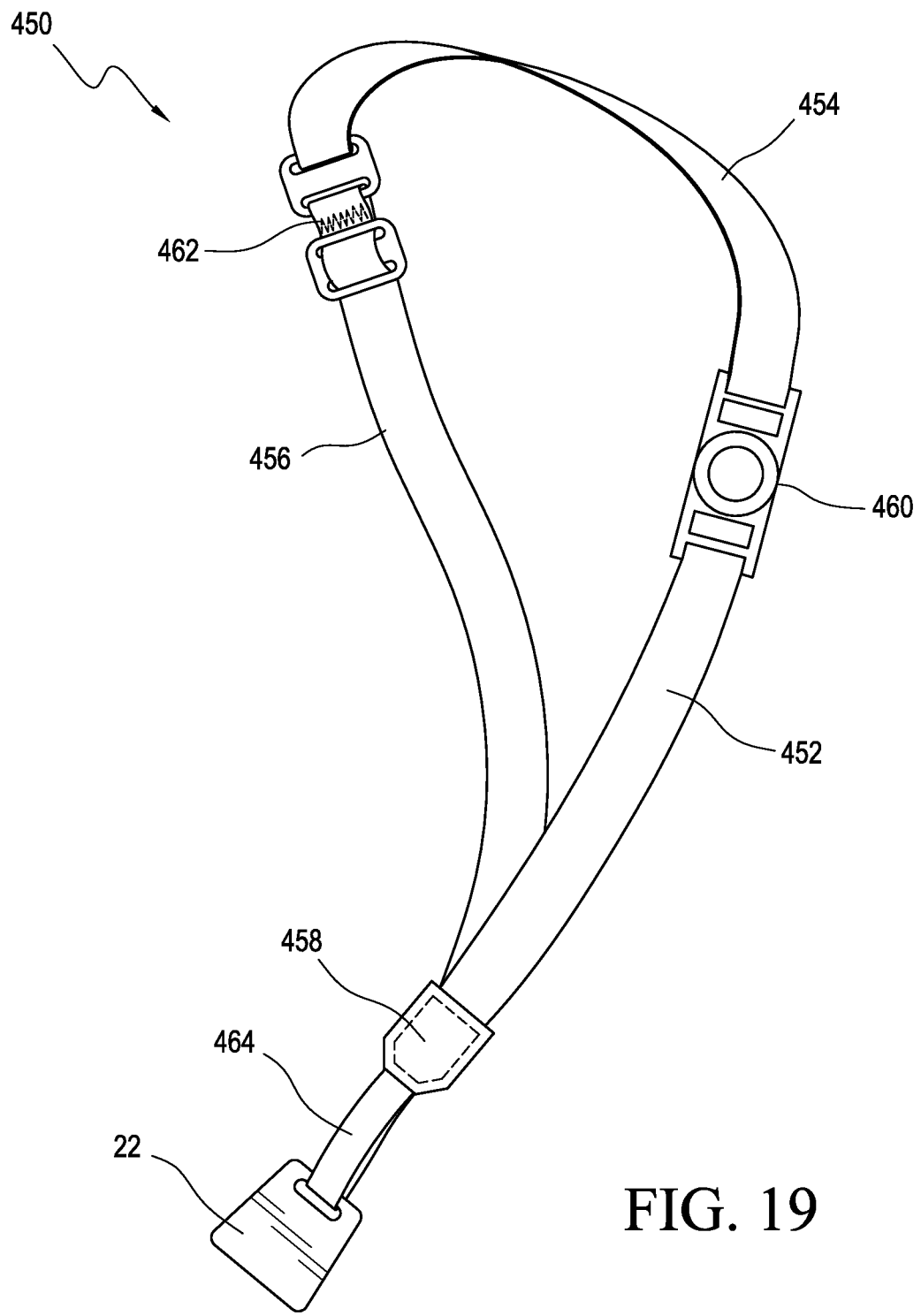
FIG. 19 is a view of a portion of a support system in accordance with an exemplary embodiment of the present disclosure.

Buckle 20 may also be described as an adapter, a strap interface, or a lanyard interface. Buckle 20 includes first opening 26 and a second opening 28. First opening 26 is configured with a first opening width that is preferably greater than the first width of lanyard 12. First opening 26 is configured to permit the movement of interface portion 14, and thus cradle 16, along or relative to lanyard 12 as the wearer moves and gravity pulls on interface portion 14 and cradle 16. Thus, first opening 26 allows sliding movement of interface portion 14 along lanyard 12 to the lowest position along lanyard 12 based on the pull of gravity. Second opening 28 is configured with a second opening width that is sized and dimensioned to be greater than the width of strap 24, but much smaller than the first opening width 26. For example, the first opening width can be about 1.1 inches if lanyard 12 is 1 inch wide, and the second opening width can be about 0.5 inches if strap 24 is 0.373 inches wide. It should be understood that the first opening width can be in a range from 1.5 mm to 150 mm and that the second opening width can be in a range from 1.0 mm to 120 mm. It should also be understood that first opening 26 can be configured with a first opening width that is smaller than or equal to the width of second opening 28. An exemplary embodiment includes a thin cord that is supported by first opening 26 and a strap that is supported by second opening 28. It should also be understood that buckle 20 can be replaced by a piece sown in that secures the lanyard to the strap 24 as shown in FIG. 19, described in more detail below. It should further be understood that a fastener 38, which is described in more detail hereinbelow, connecting the wearable article (e.g., lanyard 12) to strap 24 can include a thread, a rivet, heat staking, a screw, a crimp, a snap, or other suitable fasteners.

Both first opening 26 and second opening 28 have a height or thickness that is based on the thickness of lanyard 12 and strap 24, respectively. For example, if lanyard 12 is about 0.06 inches thick, first opening 26 can be about 0.2 inches in height or thickness to permit slipping lanyard 12 through first opening 26 and to allow buckle 20 to slide along lanyard 12 easily. The height or thickness of second opening 28 is configured for ease of assembling strap 24 to buckle 20 and to permit strap 24 to move pivotally or back and forth with respect to buckle 20. A preferred height or thickness of first opening 26 is equal to or less than 25 mm, is preferably equal to or less than 12 mm, is more preferably equal to or less than 7 mm, and is most preferably equal to or less than 5 mm. A preferred height or thickness of second opening 28 is equal to or less than 15 mm, is preferably equal to or less than 7 mm, is more preferably equal to or less than 5 mm, and is most preferably equal to or less than 3 mm. It should be understood that an alternative embodiment comprises a buckle having only one opening in which both lanyard 12 and strap 24 slip through said one opening as compared to the configuration of buckle 20. It should further be understood that an alternative embodiment can comprise a buckle having more than two openings.

Plate 22 is configured to include a plate opening 30 that can be dimensioned similar to second opening 28. However, since pivoting of plate 22 with respect to strap 24 is desirable only for orientation of plate 22 with respect to strap 24, the thickness or height of plate opening 30 can be less than the thickness or height of second opening 28. For example, if the thickness of strap 24 is about 0.06 inches thick, plate opening 30 can be only slightly thicker than the thickness of strap 24, for example, 0.07 inches thick. However, for ease of manufacturing, plate opening 30 may be approximately 0.05 inches thicker than strap 24. A preferred thickness of strap 24 is equal to or less than 15 mm, is preferably equal to or less than 7 mm, is more preferably equal to or less than 3 mm, and is most preferably equal to or less than 1.5 mm. Plate opening 30 may be preferably between 5 mm and 10 mm thicker than strap 24, may be more preferably between 2 and 5 mm thicker than strap 24, and may be most preferably between 1 mm and 2 mm thicker than strap 24.

Strap 24 is sized and dimensioned to permit cradle 16 along with a supported electronic device, such as electronic device 18, to be positioned entirely below buckle 20. In some exemplary embodiments, the length of strap 24 can be in the range 2 to 6 centimeters. A preferred length of strap 24 is equal to or less than 25 centimeters, is preferably equal to or less than 12 centimeters, is more preferably equal to or less than 6 centimeters, and is most preferably equal to or less than 3 centimeters. Strap 24 extends between buckle 20 and plate 22, and is looped or extended through second opening 28 and plate opening 30 during manufacturing. Strap 24 includes a first looped portion 32 and a second looped portion 34. However, it should be understood that the two ends of strap 24 can be sown together and thus strap 24 can include a circular configuration. First looped portion 32 of strap 24 extends through second opening 28 and is positioned immediately adjacent and alongside a main body portion 36 of strap 24 and secured to main body portion 36 by way of fastener 38. Fastener 38 may be a thread, a rivet, heat staking, a screw, a crimp, a snap, or other suitable fasteners. Second looped portion 34 of strap 24 extends through plate opening 30 and is positioned immediately adjacent and alongside main body portion 36 of strap 24 and secured to main body portion 36 by way of a fastener 40. Fastener 40 can be identical to fastener 38 or can be a different type of fastener. For example, fastener 40 can be a non-removable fastener such as a rivet or a sewn thread, and fastener 38 can be a removable fastener such as a snap to permit replacement of strap 24.

Plate 22 is either a ferromagnetic material or a magnet, including a rare earth magnet. If plate 22 is a ferromagnetic material, thickness of plate 22 only needs to be sufficient for structural integrity of the material and the capability of supporting interface portion 14 and cradle 16 securely in anticipated environments. For example, plate 22 can be about 0.05 inches thick if plate 22 is ferromagnetic and can be about 0.06 inches thick if plate 22 is a rare earth magnet. Note that these dimensions are examples only, and actual thicknesses can deviate from those listed, including being thinner and thicker.

Figure 2:
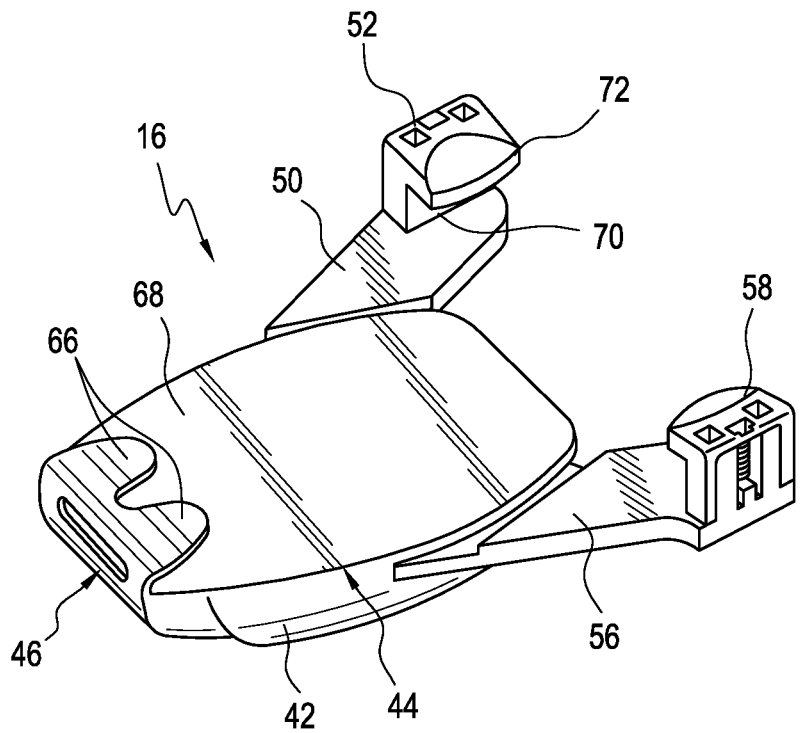
FIG. 2 is a first view of a cradle of the support system of FIG. 1
Figure 3:
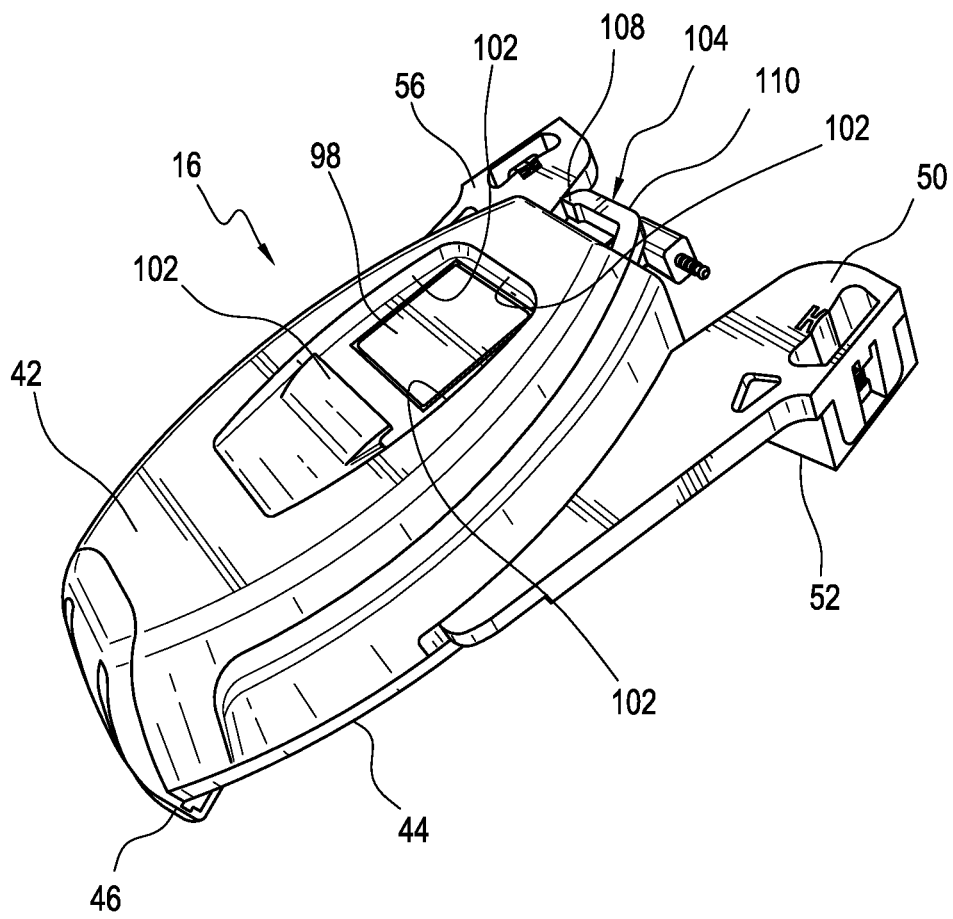
FIG. 3 is a second view of the cradle of FIG. 2.
Figure 4:
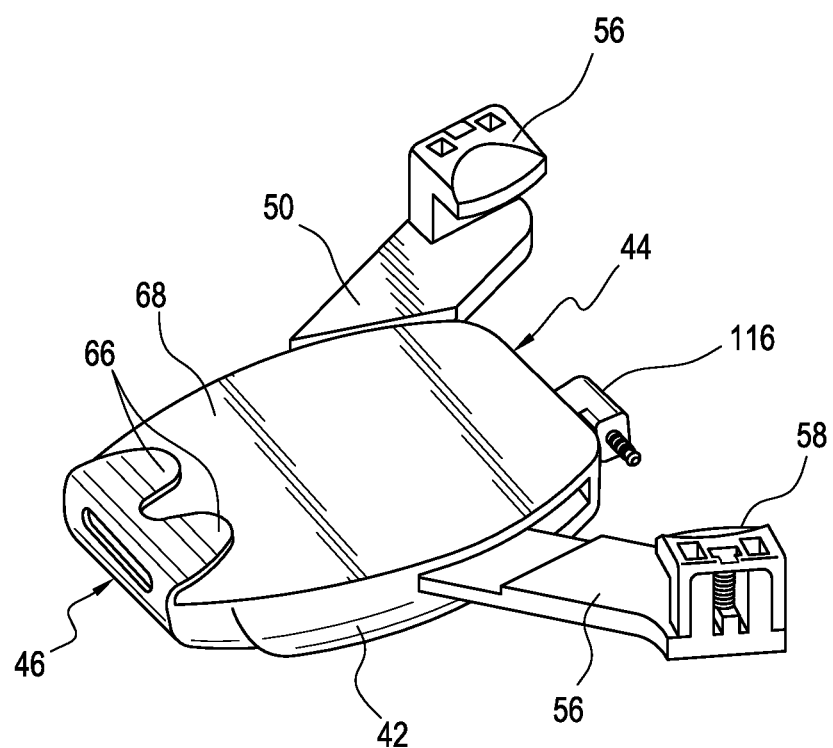
FIG. 4 is a view of the cradle of FIG. 2 showing one support arm after rotational movement of one support arm.

Cradle 16 is configured to include a housing 42 and a housing cover 44, as shown in, for example, FIGS. 2-4. Positioned between housing 42 and housing cover 44 are a slidable or extendable end bracket 46, a compression spring 48 positioned between end bracket 46 and housing cover 44, a first wing or arm 50 pivotally positioned between housing 42 and housing cover 44, and a second wing or arm 56 pivotally positioned between housing 42 and housing cover 44. Cradle 16 further includes a first extendable support 52 slidably or extendably positioned on first arm 50, a first extension spring 54 attached to first extendable support 52 and to first arm 50, a second extendable support 58 slidably or extendably positioned on second arm 56, a second extension spring 60 attached to second extendable support 58 and to second arm 56. A third extension spring 62 is attached to first arm 50 and to second arm 56.

Figure 8:
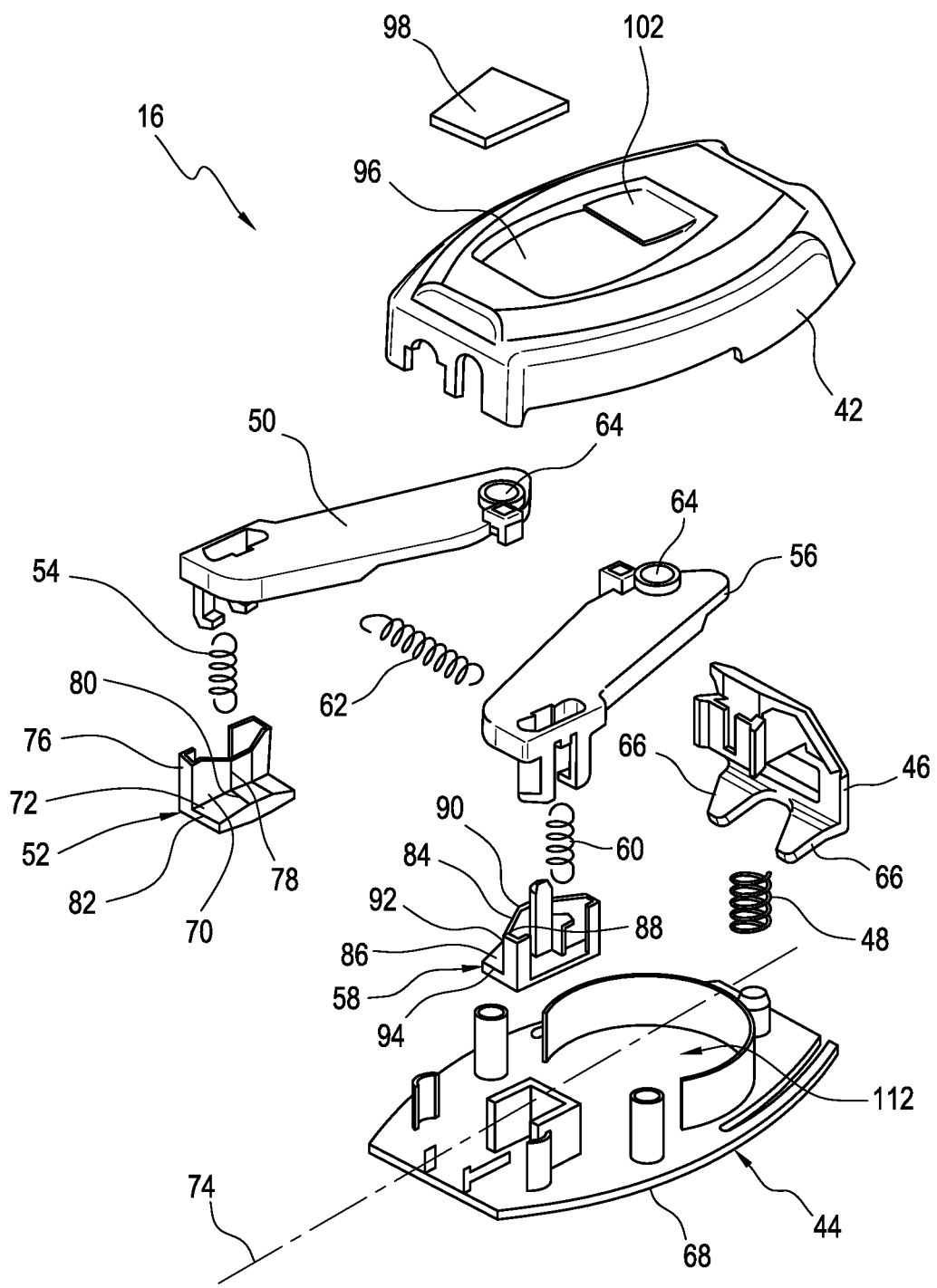
FIG. 8 is an exploded perspective view of the cradle of FIGS. 2-6.

As shown in FIG. 8, first arm 50 and second arm 56 each include a pivot 64 that interfaces with one of housing 42 and cover 44. In the exemplary embodiment of FIG. 8, pivots 64 interface with a mating pivot (not shown) in housing 42. Pivots 64 are configured to permit first arm 50 and second arm 56 to move rotationally such that first extendable support 52 and second extendable support 58 move away from each other under the force of an electronic device engaging with first extendable support 52 and second extendable support 58. It should be apparent that each of first arm 50 and second arm 56 are independently movable. Third extension spring 62 provides a restoring or biasing force to first arm 50 and to second arm 56 that keep first arm 50 and second arm 56 in contact with an electronic device being mounted on cradle 16, as described in more detail hereinbelow.

End bracket 46 includes an engaging portion 66. Engaging portion 66 is oriented at an angle with respect to a plane parallel to an outer surface 68 of housing cover 44, in a direction that is away from outer surface 68.

First extendable support 52 includes a first angled surface 70 that is oriented approximately perpendicular to surface 68 of housing cover 44. First angled surface 70 is oriented such that a first end 76 of first angled surface 70 that is further from end bracket 46 as compared to a second end 78 of first angled surface 70, which is further from a centerline 74 of cradle 16 as compared to second end 78 of first angled surface 70. First extendable support 52 also includes a second angled surface 72 that includes a third end 80 and a fourth end 82, with fourth end 82 further from end bracket 46 than third end 80. Second angled surface 72 is angled such that when cradle 16 is assembled, fourth end 82 is further from exterior surface 68 of housing cover 44 than third end 80.

Second extendable support 58 includes a third angled surface 84 that is oriented approximately perpendicular to surface 68 of housing cover 44. Third angled surface 84 is oriented such that a first end 88 of third angled surface 84 that is further from end bracket 46 as compared to a second end 90 of third angled surface 84 is further from centerline 74 of cradle 16 as compared to second end 90 of third angled surface 84. Second extendable support 58 also includes a fourth angled surface 86 that includes a third end 92 and a fourth end 94, with fourth end 94 further from end bracket 46 than third end 92. Fourth angled surface 86 is angled such that when cradle 16 is assembled, fourth end 94 is further from exterior surface 68 of housing cover 44 than third end 92.

Cradle 16 further includes a magnet 98, and housing 42 further includes a pocket or recess 96 that is sized and dimensioned to receive magnet 98. Surrounding pocket 96 may be a plurality of walls 100, which are sized and dimensioned to assist in positioning plate 22, as described in more detailed hereinbelow. Housing 42 can further include an integral retainer or retainer wall 102 that secures one end of plate 22. Magnet 98 may be insert molded into housing 42, may be retained in housing 42 by an adhesive, or may be mechanically retained in housing 42, such as by a fastener or retaining mechanism (not shown).

At a top 106 of housing 42 is a tab 104. Tab 104 may be described as a positioner, an ear, an extension, or other terms. Tab 104 extends from top 106 and then approximately parallel to the top of housing 42. At an opposite end of tab 104 from where tab 104 extends from top 104 is a protrusion 108 that extends from tab 104 toward top 106. Tab 104 is positioned a first spaced distance from top 106 in a region 110 of tab 104 between the connection of tab 104 with top 106 and protrusion 108. Protrusion 108 is also positioned a second spaced distance from top 106, but the second spaced distance between top 106 and protrusion 108 is less than the first spaced distance between region 110 and top 106. As will be described in more detail hereinbelow, protrusion 108 helps to retain strap 34 in the spaced distance between region 110 and top 106. It should be understood that in an alternative embodiment, tab 104 can be configure to include an arc-shape, a loop-shape, a semi-circle-shape, and the like, in which one of the ends of tab 104 is removed and the second end remains attached to a surface, such as top 106, creating thereby an opening in one of the ends.

Figure 5:
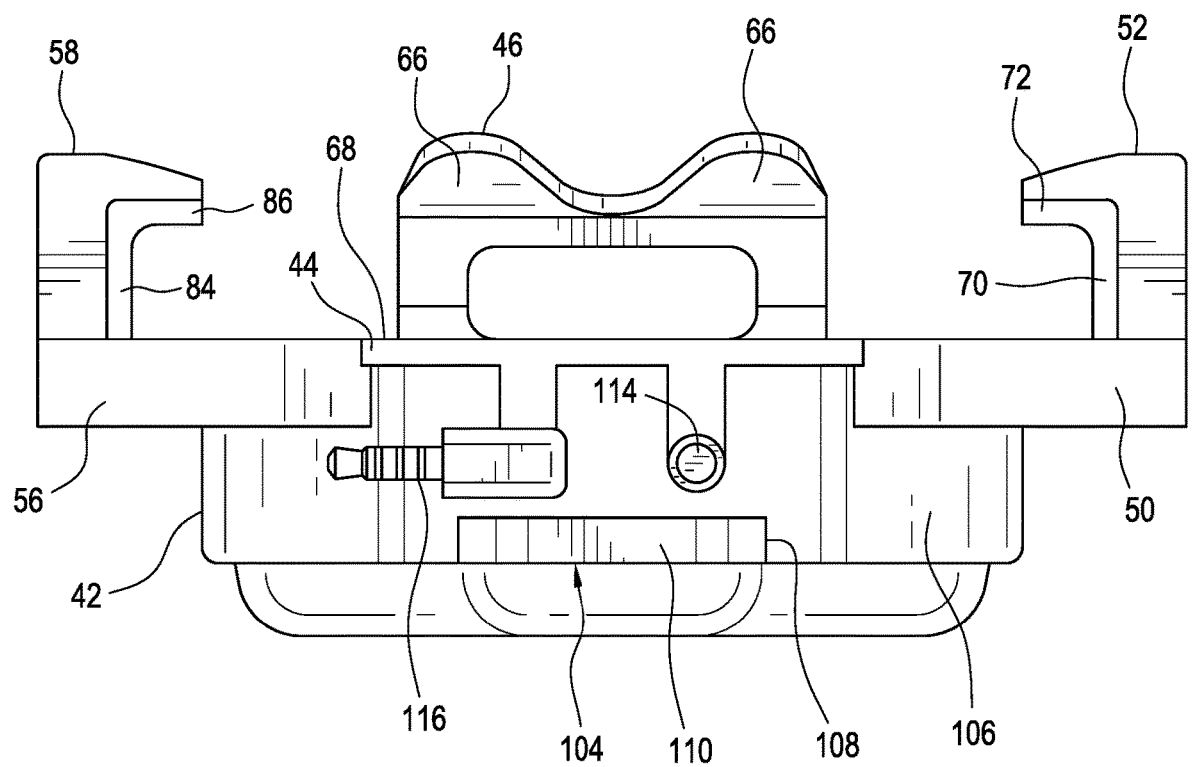
FIG. 5 is a top view of the cradle of FIGS. 2-4.
Figure 6:
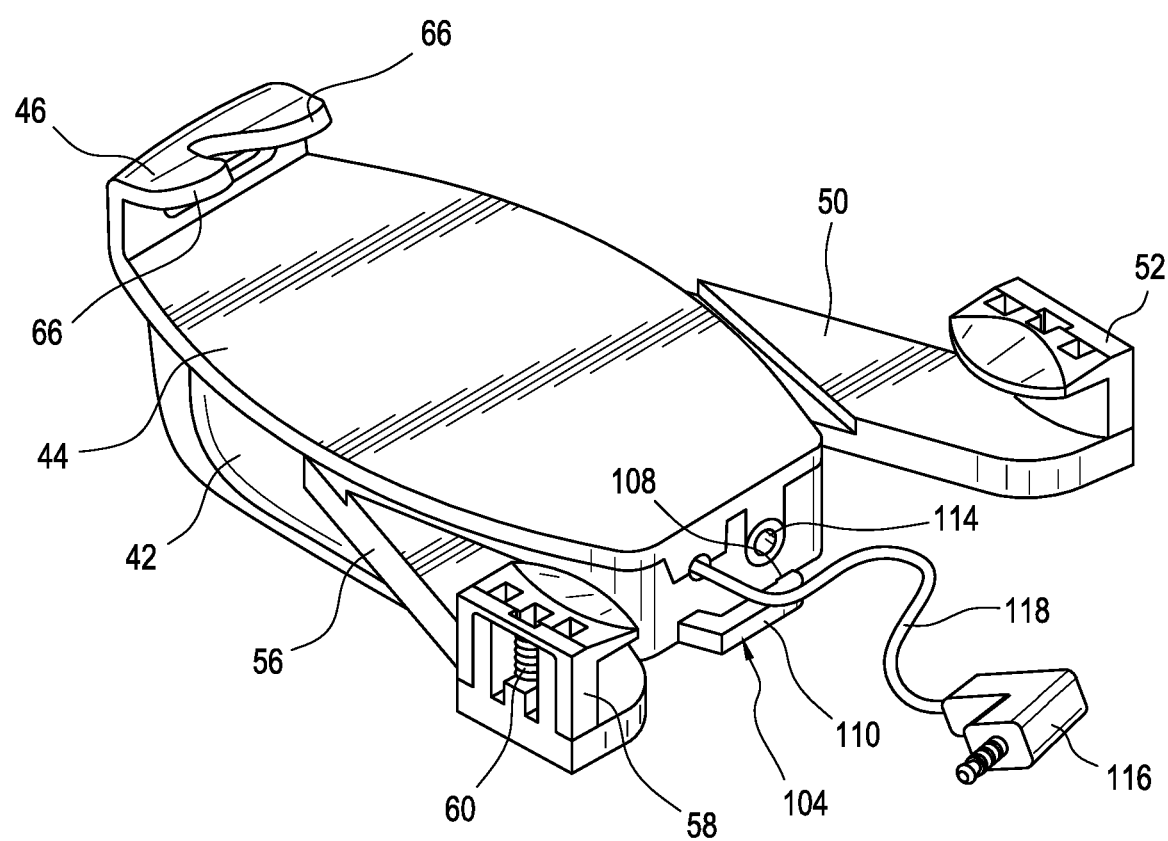
FIG. 6 is a perspective view of the cradle of FIGS. 2-5.

Cradle 16 also includes a female earbud, earphone, or speaker jack or connector 114, which in the exemplary embodiment of FIG. 5 is positioned in top 106 of housing 42. Cradle 16 further includes a male earbud, earphone, or speaker jack 116, also positioned in top 106 of housing 42 in the exemplary embodiment of FIG. 5. In addition, cradle 16 includes a cylinder 112, which in the exemplary embodiment of FIG. 8 is formed as a part of housing cover 44. Cylinder 112 is configured to support a retraction mechanism or apparatus, such as a spool 126 with retractable or extendable cable 118. Connector 114 is attached to spool 126 by way of a fixed length, i.e., non-retractable, cable or wire 113. Male connector 116 is connected to a female connector 128 of electronic device 18 by a wire 118, which is wound around the retraction mechanism. When an electronic device, such as electronic device 18 shown in FIG. 1, is positioned in cradle 16, male earphone connector is retracted from cradle 16 and connected to a mating connector located in electronic device 18. In addition, earbud(s), earphone(s), or speaker(s) 122 can be connected by a wire 120 to female connector 114. Earbud(s), earphone(s), or speaker(s) 122 can further include a first wire 125 and a second wire 127 of dissimilar length for an offset position of electronic device 18.

One benefit of configuration of the embodiment of FIGS. 1-9 and 12 is that electronic device 18 can be removed from cradle 16 while maintaining an electrical connection to earbuds 122 because wire 118 can be extended from cradle 16. To restore electronic device 18 to cradle 16, wire 118 is retracted into cradle 16 while repositioning electronic device 18 on cradle 16.

It should be understood that wire or cable 118 can include a female connector and that wire or cable or wire 113 can include a male connector (not shown). In contrast to the embodiment of FIGS. 1-9 and 12, the embodiments of FIGS. 75 and 77-79 show the right wire and left wire of the right ear phone and left ear phone having similar length since a spool 698, described in more detail hereinbelow, is centrally located and the ear phone cords are positioned in the front of the user.

Cradle 16 operates as follows. Without an electronic device mounted or positioned on cradle 16, first arm 50 and second arm 56 are pulled toward each other in a minimum spaced distance apart, as shown in, for example, FIGS. 2 and 3. In addition, end bracket 46, first extendable support 52, and second extendable support 60 are all fully retracted, also as shown in FIGS. 2 and 3. When an electronic device, such as electronic device 18, is inserted into cradle 16, opposite sides or edges of electronic device 18 first engage first angled surface 70, second angled surface 72, third angled surface 84, and fourth angled surface 86. As electronic device 18 engages these surfaces, first extendable support 52 and second extendable support 58 move outwardly or away from surface 68 of housing cover 44 by a spaced distance, which is the same as a thickness of electronic device 18 where electronic device 18 interfaces with first extendable support 52 and second extendable support 58, while stretching first extension spring 54 and second extension spring 60, respectively. In an exemplary embodiment, first extendable support 52 and second extendable support 58 are configured to accept thickness in a range of 2 millimeters to about 20 millimeters, more preferably in a range of 3 millimeters to about 16 millimeters, more preferably in a range of 4 millimeters to about 14 millimeters, and most preferably in a range of 5 millimeters to about 12 millimeters. First extendable support 52 is shown fully retracted and second extendable support 58 is shown in an extended position in FIG. 5. A preferred length of cable or wire 118 is equal to or less than 140 cm, is more preferably equal to or less than 100 cm, is even more preferably equal to or less than 70 cm, and is most preferably equal to or less than 50 cm. A preferred length of wire or cable 113 is equal to or less than 40 cm, is more preferably equal to or less than 20 cm, is even more preferably equal to or less than 10 cm, and is most preferably equal to or less than 6 cm.

The engagement of electronic device 18 with surfaces 70, 72, 84, and 86 also forces first arm 50 and second arm 56 away from each other, stretching third extension spring 62. Thus, first extendable support 52, second extendable support 58, first arm 50, and second arm 56 automatically adjust to a width and a thickness of electronic device 18. Furthermore, the tension on first extension spring 54, second extension spring 60, and third extension spring 62 helps provide a force on surfaces 70, 72, 84, and 86 against electronic device 18 to help maintain electronic device 18 in position on cradle 16. In an exemplary embodiment, first arm 50 and second arm 56 are configured to rotate up to about 20 degrees, and are able to adapt to electronic device 18 widths in a range of 40 millimeters to about 400 millimeters, more preferably in a range of 60 millimeters to about 250 millimeters, yet more preferably in a range of 70 millimeters to about 150 millimeters, and most preferably in a range of 50 millimeters to about 90 millimeters. In an exemplary embodiment, first arm 50 and second arm 56 are each configured to preferably rotate up to about 120 degrees, more preferably are configured to rotate up to about 50 degrees, and most preferably are configured to rotate up to about 30 degrees. However, these dimensions and rotations, as with other dimensions described herein, are adjustable by appropriate design, as should be understood by a person of skill in the art.

Electronic device 18 is pressed or slid longitudinally along surface 68 of housing cover 44, which also at least partially supports electronic device 18, until electronic device 18 contacts angled or chamfered engaging portions 66 of end bracket 46. As electronic device 18 is pressed into end bracket 46, end bracket 46 extends away from surface 68 by a spaced distance that is the same as a thickness of electronic device 18 where electronic device 18 interfaces with end bracket 46, squeezing or compressing compression spring 48. In an exemplary embodiment, end bracket 46 is configured to accept electronic device 18 thicknesses in the range 2 to 20 millimeters. A preferred configuration of end bracket 46 to receive the thickness of electronic device 18 (and consequently dimensions of the end bracket 46 when fully contracted and fully extended) is in the range of 2 millimeters to about 20 millimeters, is more preferably in the range of 3 millimeters to about 12 millimeters, even more preferably is in the range of 4 millimeters to about 10 millimeters, and most preferably is in the range of 5 millimeters to about 9 millimeters. The force of compression spring 48 on end bracket 46 provides a force against electronic device 18 that, with the forces exerted by first extendable support 52, second extendable support 58, first arm 50, and second arm 56, help secure electronic device 18 in cradle 16. Note that end bracket 46 would typically be oriented in a downward position, thus gravity also assists in securing electronic device 18 in cradle 16.

In practice, the force of springs 48, 54, 60, and 62, and the configuration of surfaces 70, 72, 84, and 86 is such that electronic device 18 can be positioned in cradle 16 with one hand as long as cradle 16 is supported, with such support being a flat surface or a mount, such as are described in more detail hereinbelow.

After electronic device 18 is positioned on cradle 16, strap 24 can be positioned between tab 104 and top 106 of housing 42. Strap 24 is assisted in remaining in this position by the tension on strap 24 caused by the weight of cradle 16 and electronic device 18. In addition to the tension created by gravity, protrusion 108 helps maintain the position of strap 24 in the first spaced distance between region 110 of tab 104 and top 106.

To remove electronic device 18 from cradle 16, all that is required is to slide electronic device 18 along surface 68 away from end bracket 46. If connector 116 is secured to electronic device 18, wire 118 will extend from cradle 16. If a complete disconnection from cradle 16 is desired, connector 116 can be disconnected from electronic device 18 either before or after removing electronic device 18 from cradle 16.

Cradle 16 can be attached to an array of devices, apparatus, mounts, wearable articles, etc. by way of magnet 98, pocket 96, and walls 100, by interfacing with plate 22, or an equivalently configured plate sized and dimensioned to fit within walls 100 and to mate with magnet 98, such as shown in FIG. 1. To provide the interface between plate 22 and magnet 98, a first end 124 of plate 22 is slid along magnet 98 until first end 124 is positioned between retainer wall 102 and magnet 98. Such positioning may be accomplished while holding plate 22 at an angle with respect to magnet 98. Plate 22 is then carefully released to be attracted to magnet 98, which then secures cradle 16 to plate 22. If plate 22 is secured to a wearable article, such as lanyard 12 shown in FIG. 1, then cradle 16 will be secured to lanyard 12 by the attraction of plate 22 to magnet 98.

Figure 9:
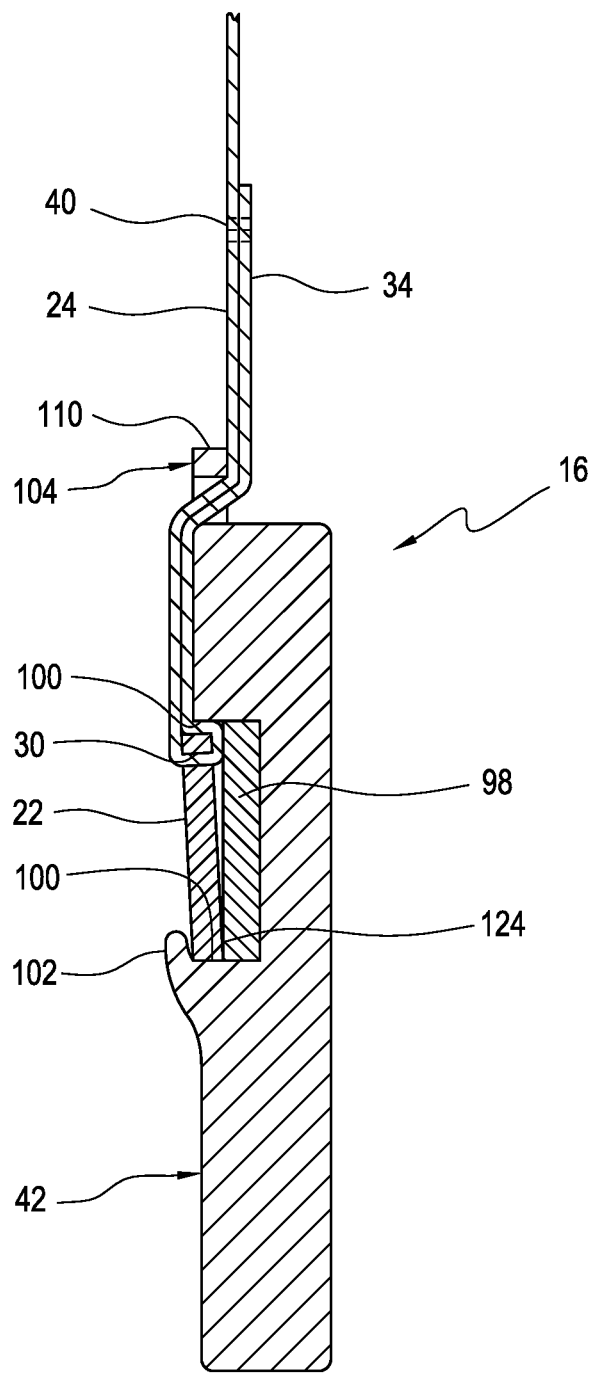
FIG. 9 is a stylized sectional view of the cradle of FIG. 1 along lines 9-9.

As shown in FIG. 9, when plate 22 is positioned in pocket 96, strap 34 is positioned between a portion of plate 22 and magnet 98, thus spacing plate 22 a small distance away from magnet 98. It should be noted that housing 42 is shown as being solid by the section lines internal to housing 42. In reality, housing 42 contains numerous features that are replaced by section lines for the sake of simplicity and clarity. Such simplification is repeated in FIGS. 10 and 11. When cradle 16 is anchored to a piece of clothing, then another surface is added, said surface (e.g. fabric of a shirt) is positioned on top of plate 22 and then said fabric is sandwiched between plate 22 and a ferromagnetic material, which is positioned on the other side of the fabric.

Figure 10:
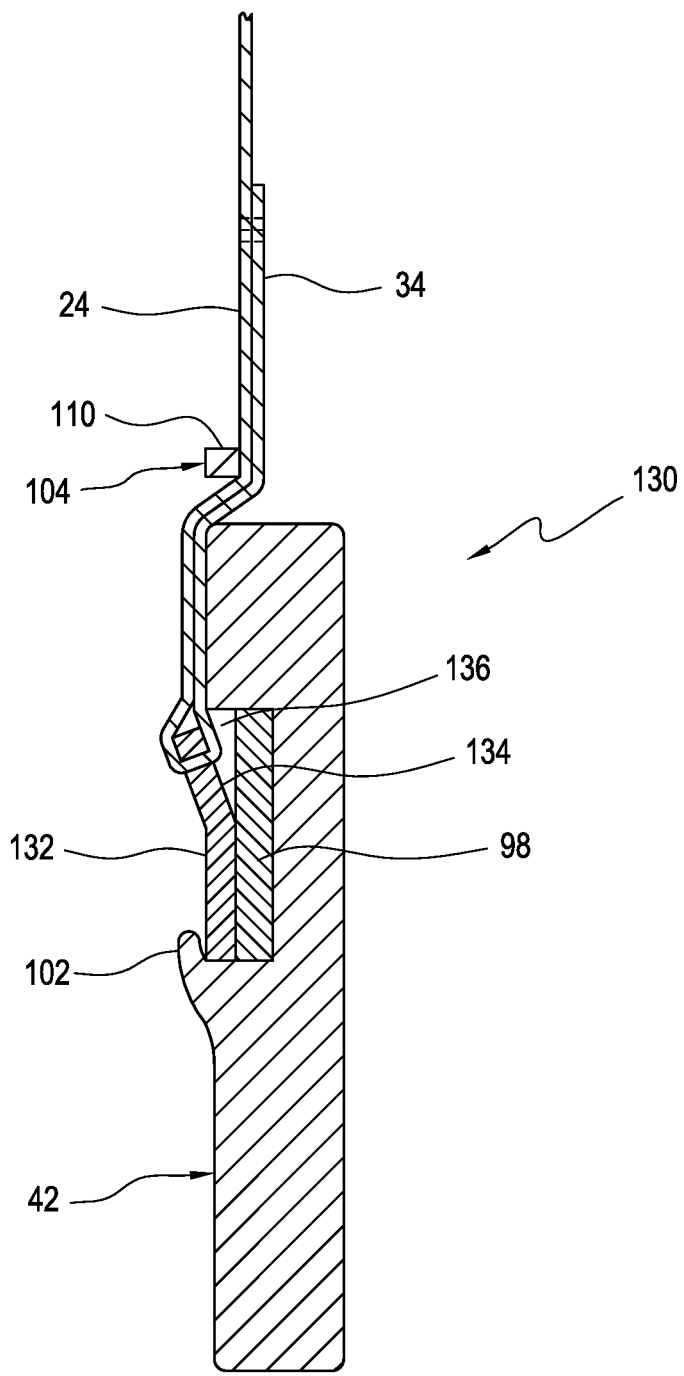
FIG. 10 is a stylized sectional view of a cradle in accordance with another exemplary embodiment of the present disclosure.
Figure 11:
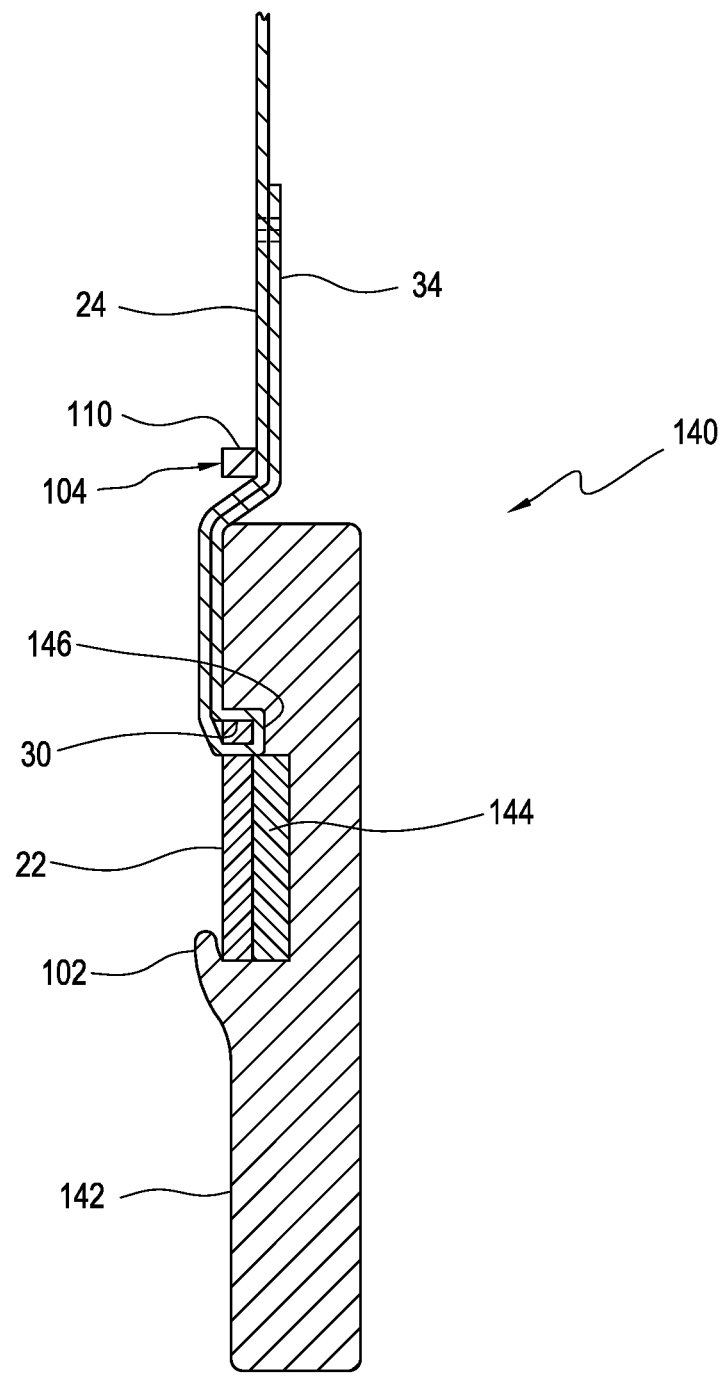
FIG. 11 is a stylized sectional view of a cradle in accordance with yet another exemplary embodiment of the present disclosure.
Figure 12:
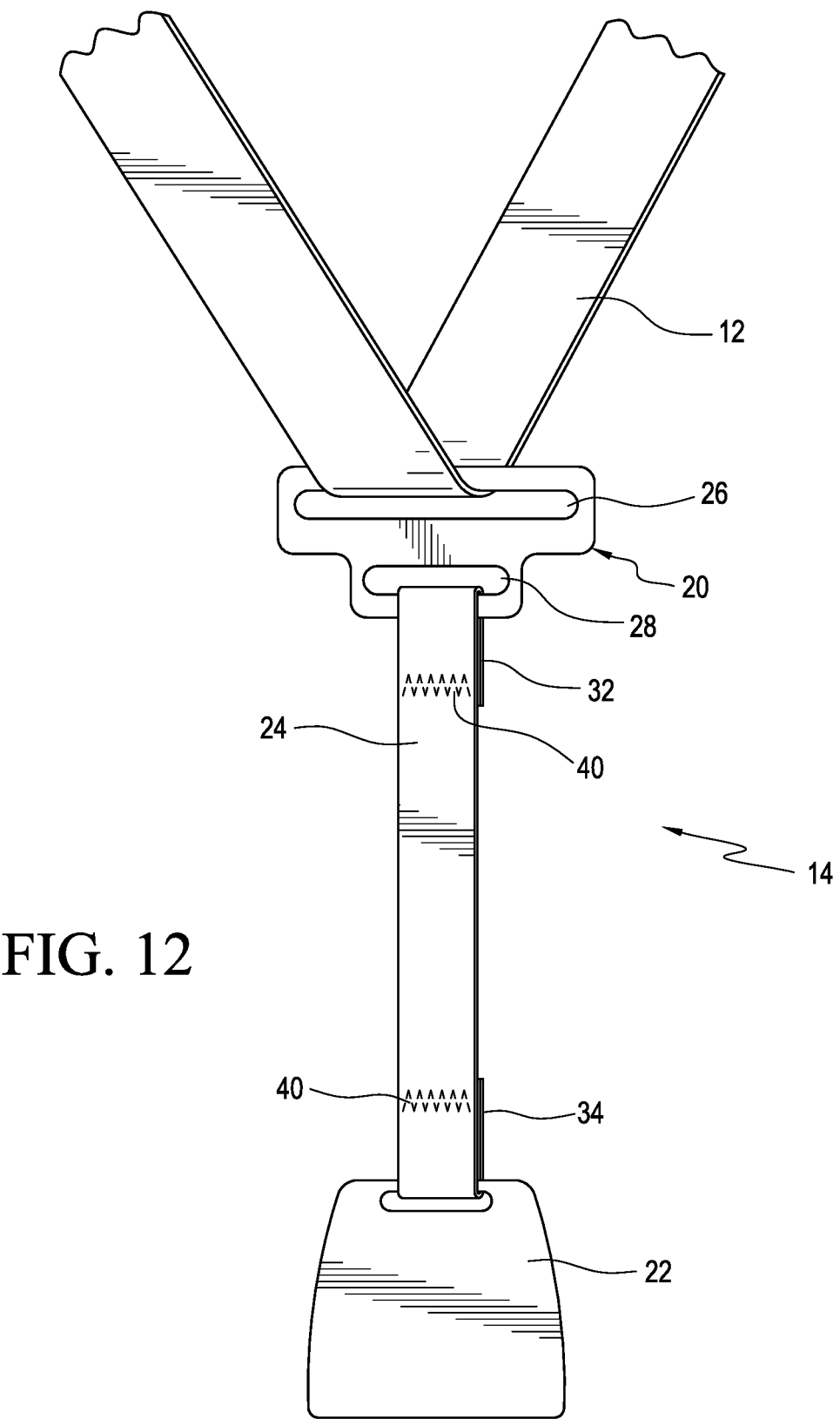
FIG. 12 is a view of an interface apparatus of the support system of FIG. 1 in accordance with an exemplary embodiment of the present disclosure.

Contact between a plate and magnet 98 can be improved. FIG. 10 is a stylized sectional view of a cradle 130 in accordance with another exemplary embodiment of the present disclosure. In this embodiment, a plate 132 includes an angled portion 134 that provides a space or gap 136 for strap 24. Thus, strap 24 in this embodiment does not form a gap along the length of plate 132 between plate 132 and magnet 98. FIG. 9 is a stylized sectional view of a cradle 140 in accordance with yet another exemplary embodiment of the present disclosure. In this embodiment, cradle 140 includes a housing 142 in which a recess 146 is formed. Recess 146 provides clearance for strap 24 to allow plate 22 to rest directly on a magnet 144, which can be shorter than magnet 98 to help in providing clearance for strap 24. It should be understood that plate 22 can have an area that is thinner than the remainder of plate 22, said thinner area being the area receiving strap 24, and said thinner area preferably having the same thickness as strap 24.

Figure 13:
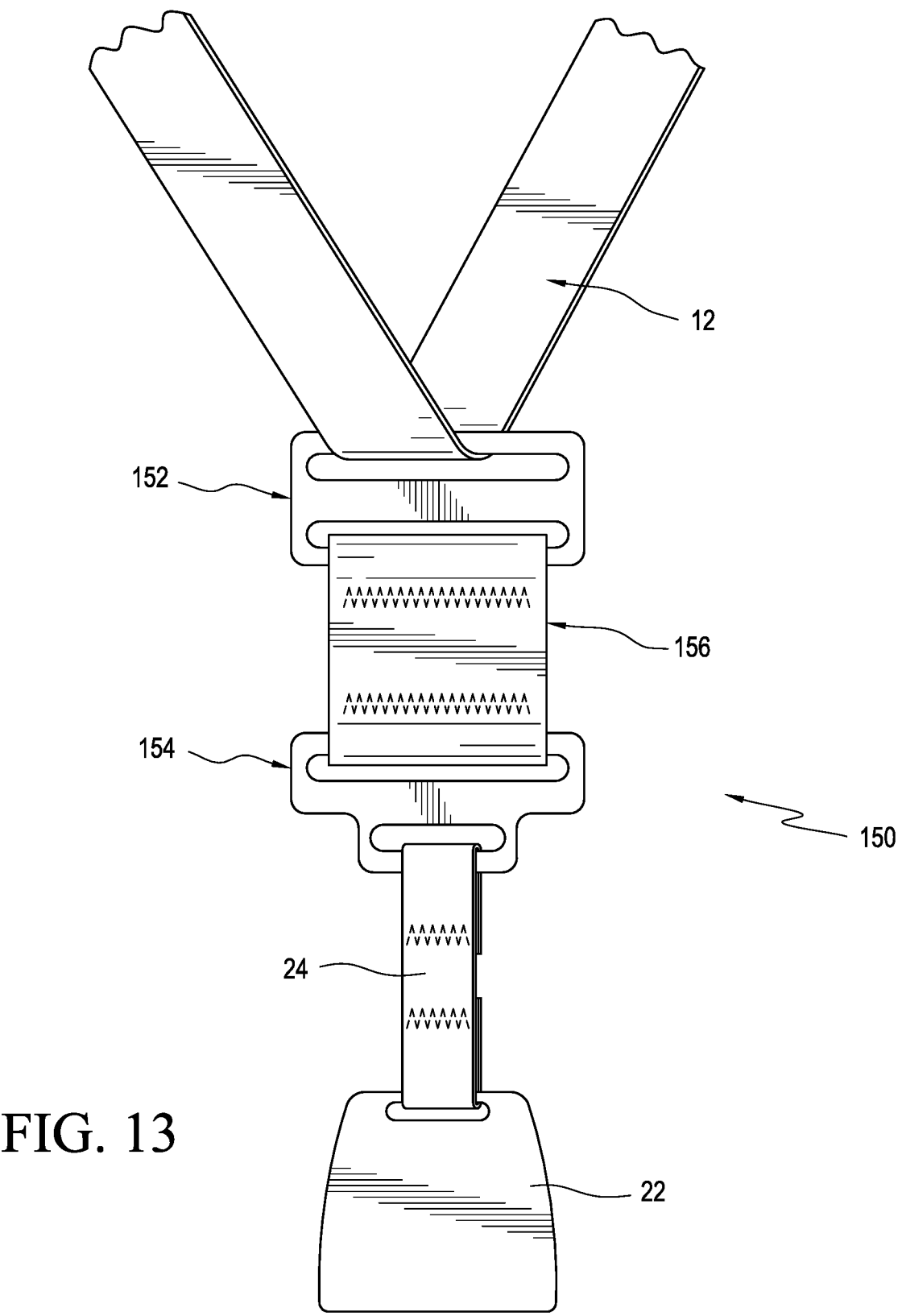
FIG. 13 is a view of an interface apparatus in accordance with another exemplary embodiment of the present disclosure.

As noted earlier, wearable article or lanyard 12 may be configured with a first width for the comfort of the wearer, while strap 24 has a second, narrower width. Interface portion 14 shown in FIG. 1 is one configuration for interfacing wider lanyard 12 with narrow strap 24. FIG. 13 is a view of an interface apparatus 150 in accordance with an exemplary embodiment of the present disclosure. Interface apparatus 150 includes a first buckle 152, a second buckle 154, and an intermediate strap 156. First buckle 152 is positioned between intermediate strap 156 and lanyard 12. Second buckle 154 is positioned between intermediate strap 156 and a strap that interfaces with plate 22. The strap that interfaces with plate 22 may be similar or identical to strap 24.

Figure 14:
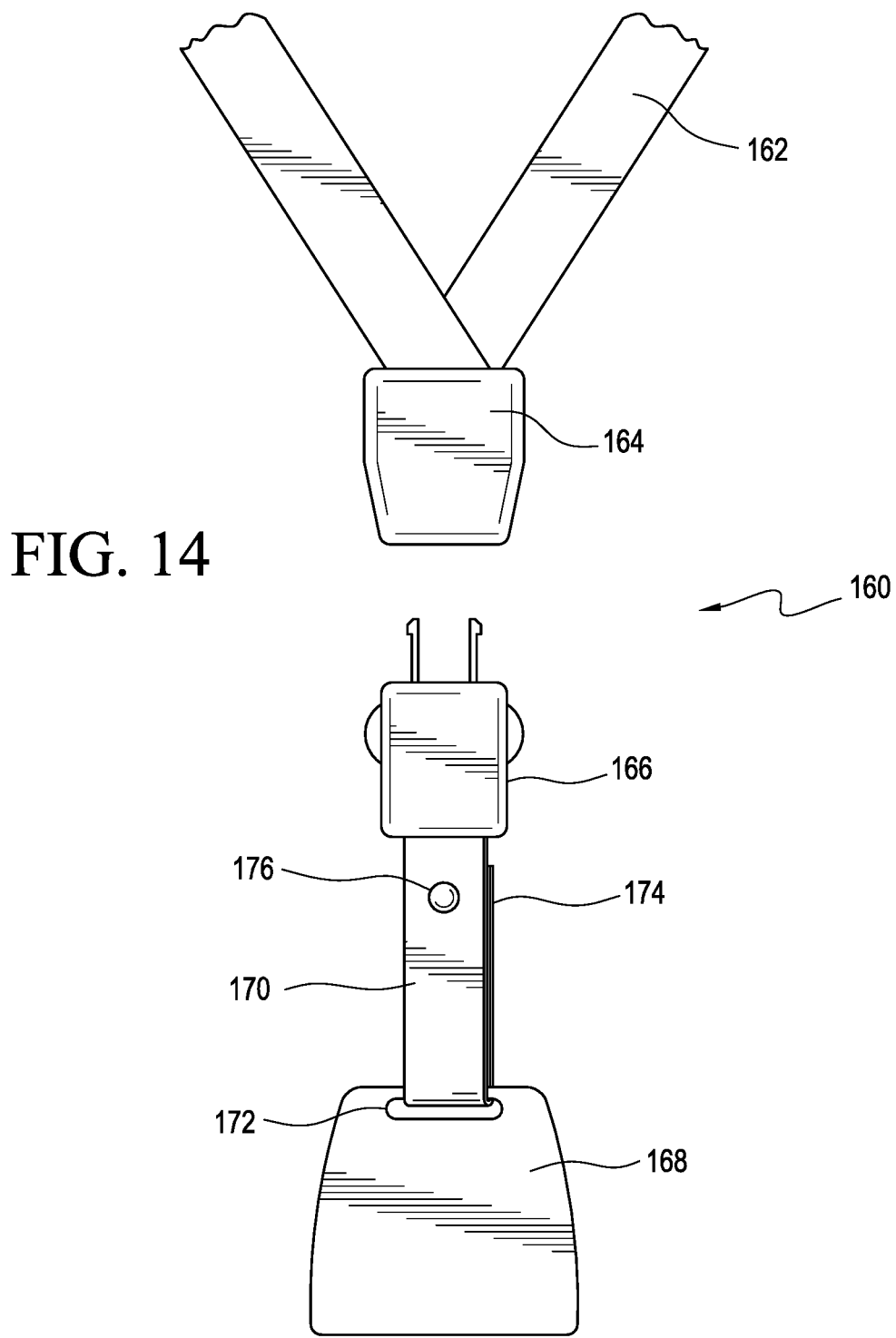
FIG. 14 is a view of an interface apparatus in accordance with yet another exemplary embodiment of the present disclosure.

FIG. 14 is a view of an interface apparatus 160 in accordance with yet another exemplary embodiment of the present disclosure. Interface apparatus 160 includes a lanyard, necklace, or wearable article 162, a buckle receiver 164, a buckle 166, a plate 168, and a strap 170 extending between buckle 166 and plate 168.

Buckle receiver 164 can be crimped, heat staked, or fastened in another manner to lanyard 162. Buckle 166 can also be crimped, heat staked, or fastened in another manner to strap 170. As with interface apparatus 14, lanyard 162 can be dimensioned similar to lanyard 12 and strap 170 can be dimensioned similar to strap 24. Accordingly, strap 170 can be relatively narrow as compared to lanyard 162. Plate 168 includes a plate opening 172, through which strap 170 extends and a looped portion 174 of strap 170 loops back toward buckle 166. Looped portion 174 of strap 170 can be attached to strap 170 by a fastener 176, or looped portion 174 can be attached to buckle 166 by a fastener (not shown). Fastener 176 can be, for example, a rivet, a snap, a crimp, a heat stake, a cloth thread, a threaded fastener such as a screw, etc.

One advantage to the configuration of interface apparatus 160 is that it permits easy removal of interface apparatus 160 from lanyard 162. While a cradle, such as cradle 16, can be removed from plate 168 in a manner similar to that described elsewhere herein, in some circumstances it may be advantageous to leave cradle 16 attached to interface apparatus 160 and to remove cradle 16, interface apparatus 160, and an electronic device, such as electronic device 18, from lanyard 162.

Figure 15:
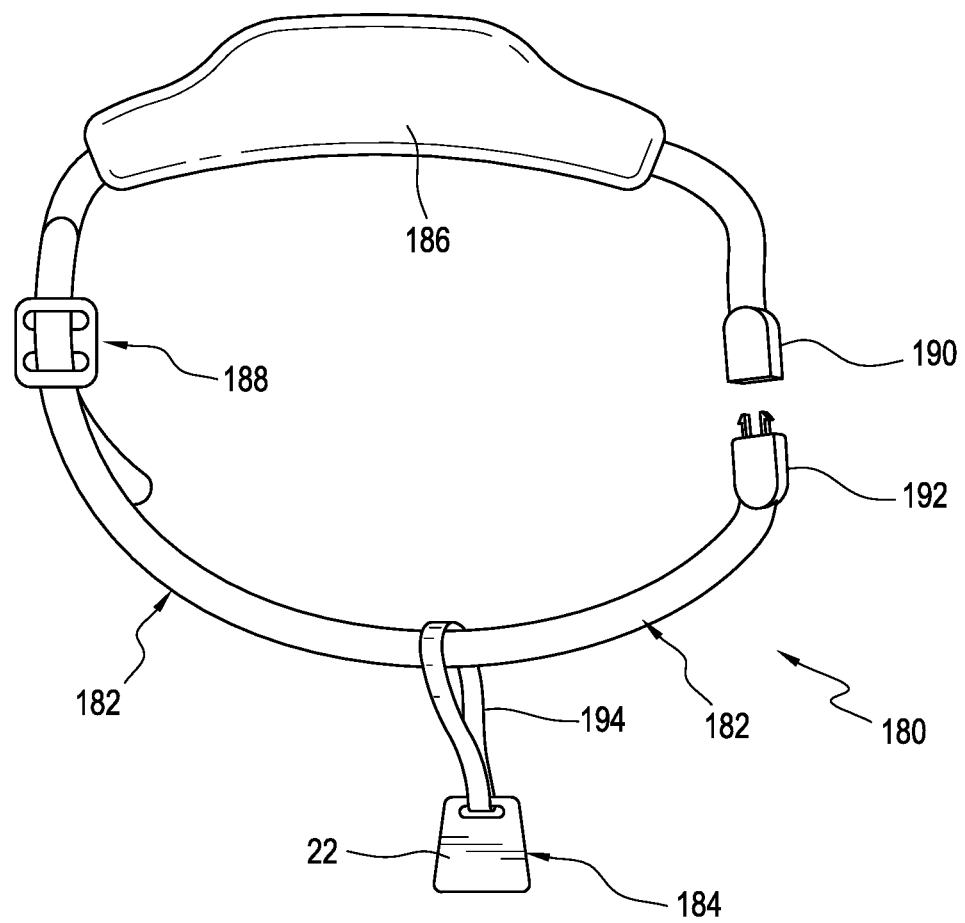
FIG. 15 is a view of a portion of a support system in accordance with an exemplary embodiment of the present disclosure.

FIG. 15 is a view of a portion of a support system 180 in accordance with an exemplary embodiment of the present disclosure, with a cradle removed for clarity and simplicity. Support system 180 includes a strap, lanyard, or necklace 182, an interface apparatus 184, and a neck pad 186 for providing cushioning or support against the neck of the wearer. Lanyard 182 may further include a first buckle 188 positioned thereon to permit varying the length of lanyard 182 when positioned on the wearer. In addition, lanyard 182 can include a buckle receiver 190 and a second buckle 192, both of which can be positioned on a generally opposite side of lanyard 182 from first buckle 188. Buckle receiver 190 and second buckle 192 may be attached by heat staking, crimping, or other fasteners to lanyard 182. Interface apparatus 184 can be as disclosed in other embodiments presented herein, or can be a simple strap loop 194 configured to support plate 22. The configuration of FIG. 13 is advantageous in that the length of lanyard 182 can be set according to the desires of the wearer, and the length can be maintained during removal of support system 180 from around the neck of the wearer by disconnecting buckle 192 from buckle receiver 190. It should be understood that simple strap loop 194 configured to support plate 22 provides the advantage of centering cradle 16 in an unobstructed manner by virtue of gravity. Buckle receiver 190 and buckle 192 allows opening or closing necklace 182, thereby once the length of necklace 182 is adjusted using buckle 188 the length of necklace 182 can remain with a fixed length. Once the wearer or user wants to wear necklace or lanyard 182, the user opens the buckle and places necklace 182 around the neck and inserts buckle 192 into buckle receiver 190 for securing necklace 182. Once the wearer wants to remove necklace 182, the user simply removes buckle 192 from receiver buckle 190. Once the user adjusts the length to be positioned on or around the heart area and around the end of the sternum, the length remains fixed for said user.

The benefit of having a specialized length of necklace 182 (or any lanyard of the present disclosure) to allow positioning of cradle 16 on the heart area or around the inferior end of the sternum is to avoid radiation effects of electronic devices. Why does one not hear about heart cancer? The reason is because heart cells are more resistant to cancer and to radiation effects causing cancer. A system as described in the present disclosure allows specialized positioning of cradle 16 on the area in the body most resistant to the effects of radiation, allowing a user to safely use and wear electronic device 18 such as a cell phone. Other preferred areas resistant to radiation are the shoulder area above the apex of the lung, the back of the head at the level of the occipital bone, and both of said areas, in addition to the heart area, are part of the methods of the present disclosure, said method disclosing areas in which to position an electronic device on the body. Most organs below the diaphragm are characterized by cells that have high mitotic activity and those cells that divide constantly should be avoided and no radiating device should be placed on said areas. Likewise, any areas of the body above the diaphragm that divide more frequently, such as breast glands and lung tissue, should be avoided and no radiating device should be placed on said areas. Colon, rectum, gastrointestinal tract, pancreas, liver, genitals, kidneys, and urinary tract are regions that are at increased risk of cancer when exposed to radiation, and said areas are avoided by the methods and devices disclosed in the present disclosure. Placement of any radiating device on or next to the ear canal causes direct radiation of the brain, and must be avoided, which can be accomplished with the inventions of the present disclosure. The use of a wireless device in the ear receiving a signal from a cell phone located in other part of the body can cause a triple radiation risk, because radiation from the cell phone is transmitted through the body to reach the ear piece. The triple radiation risk includes: 1) cell phone: a cell phone for instance in a back pocket, which will be irradiating all adjacent organs, namely colon, rectum, bladder, kidney, prostate in men, and ovaries/uterus in women, besides pancreas in the left or liver in the right; 2) ear piece: ear piece irradiating the brain; and 3) Trans-radiation: radiation going across the body from the lower abdomen (back pocket cell phone) to head (ear piece), impacting all organs below and above the diaphragm.

Figure 16:
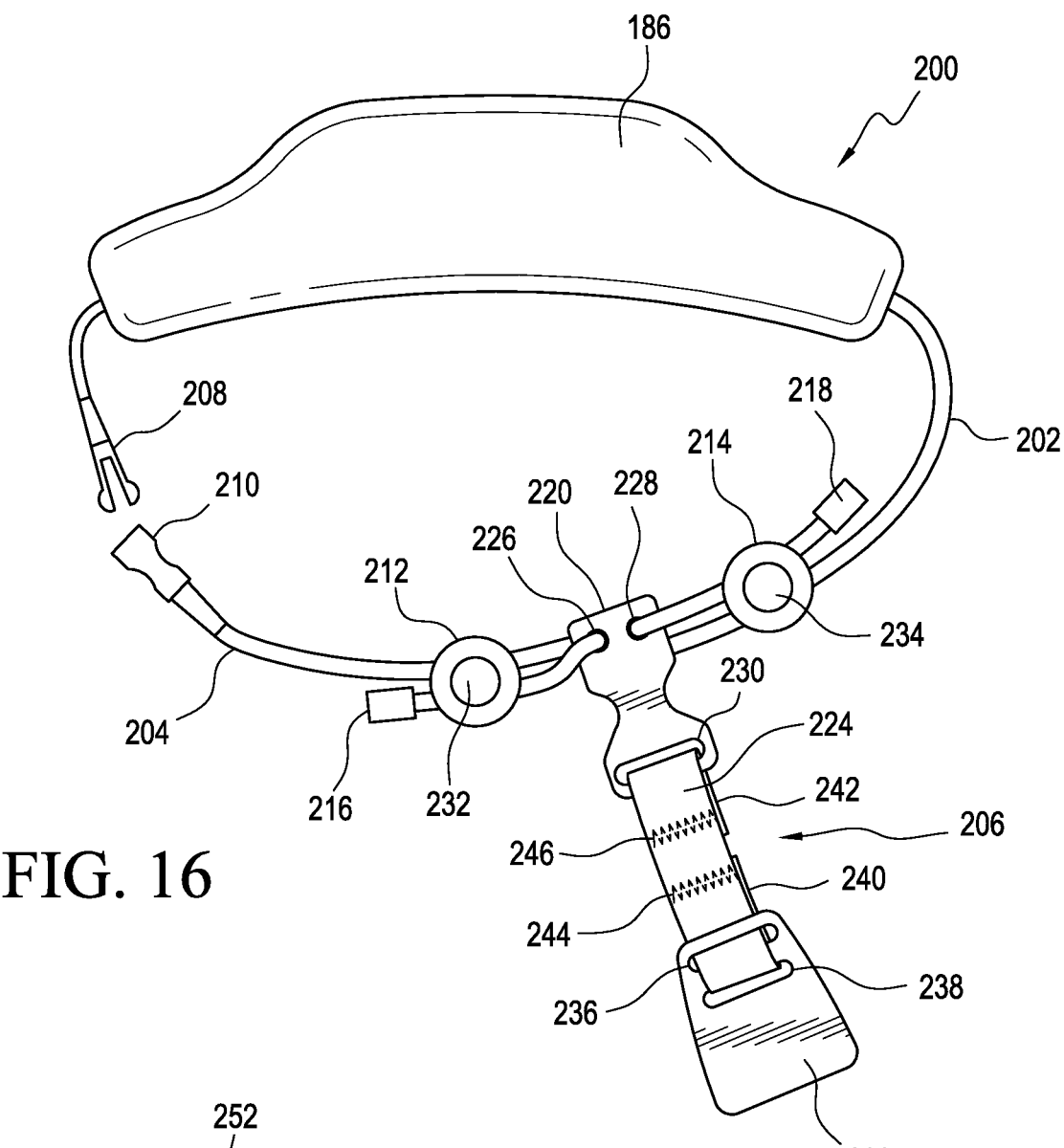
FIG. 16 is a view of a portion of a support system in accordance with another exemplary embodiment of the present disclosure.

FIG. 16 is a view of a portion of a support system 200 in accordance with another exemplary embodiment of the present disclosure with a cradle removed for clarity and simplicity of description. Support system 200 includes neck pad 186, a first cord 202, a second cord 204, an interface apparatus 206, a buckle 208, a buckle receiver 210, a first lock 212, a second lock 214, a first end cap 216, and a second end cap 218. First lock 212 includes a first release button 232 and second lock 214 includes a second release button 234. Interface apparatus 206 includes an interface plate 220, a plate 222, and a strap 224 that is configured to connect plate 222 to interface plate 220. Interface plate 220 includes a first hole or opening 226, a second hole or opening 228 that can be adjacent or alongside first hole or opening 226, and a third opening 230.

First cord 202 extends through neck pad 186, and can be slidably or fixedly secured to neck pad 186. Buckle 208 is positioned on a first end of first cord 202 and first end cap 216 is positioned on a second end of first cord 202. Buckle receiver 210 is positioned on a first end of second cord 204 and buckle 208 is configured to mate with buckle receiver 210. Second end cap 218 is positioned on a second end of second 204. First cord 202 extends through first hole 226 and second cord 204 extends through second hole 228, thus securing interface apparatus 206 to first cord 202 and second cord 204.

First lock 212 is positioned on one side of interface plate 220 and slidably receives first cord 202 and second cord 204 in a side-by-side or parallel configuration. First end cap 216 is secured to the second end of first cord 202 during manufacturing, and thus first end cap 216 serves as a stop to prevent removal of first cord 202 from first lock 212. Second lock 214 is positioned on a second side of interface plate 220 that is opposite from the first side and second lock 214 also slidably receives first cord 202 and second cord 204 in a side-by-side or parallel configuration. Second end cap 218 is secured to the second end of second cord 204 during manufacturing, and thus second end cap 218 serves as a stop to prevent removal of second cord 204 from second lock 214. First lock 212 and second lock 214 are fixed in position on first cord 202 and second cord 204 by friction. By pressing first release button 232, the friction on first cord 202 and second cord 204 is reduced such that first lock 212 is slidable on first cord 202 and second cord 204. Similarly, by pressing second release button 234 second lock 214 is slidable on first cord 202 and second cord 204. By pressing first release button 232 and second release button 234, the length of the portion of support system 200 that extends around the neck of the wearer can be adjusted. Once the length is adjusted as desired, the length can remain fixed because buckle 208 can be disconnected from buckle receiver 210 to permit removal of support system 200 from the neck of the wearer without affecting the length.

Plate 222 can be similar to previous plates described herein for mating with a cradle, such as cradle 16. In the embodiment of FIG. 16, plate 222 includes a first opening 236 and a second opening 238. Strap 224 extends through first opening 236 and then second opening 238, with a first loop 240 of strap 224 extending back along strap 224 to be secured to strap 224 by a fastener 244, which can be similar to such fasteners described elsewhere herein. Strap 224 also extends through third opening 230, with a second loop 242 extending back along strap 224 to be secured to strap 224 by a fastener 246, which can also be similar to such fasteners described elsewhere herein.

Among the advantages of support system 200 are the ability to easily adjust length by way of first lock 212, second lock 214, first cord 202, and second cord 204 while support system 200 is located on the neck of the wearer, and the ability to keep the length fixed by being able to remove support system 200 by disconnecting buckle 208 from buckle receiver 210.

Figure 17:
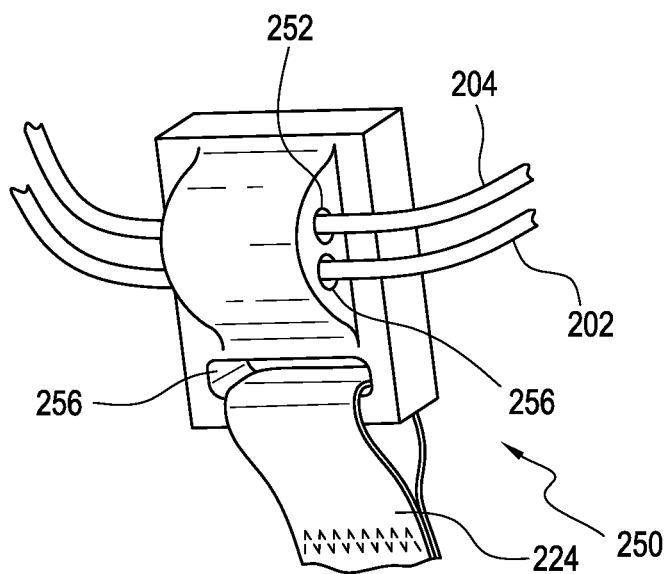
FIG. 17 is a view of a cord interface in accordance with an exemplary embodiment of the present disclosure.

FIG. 17 is a view of a cord interface 250 in accordance with an exemplary embodiment of the present disclosure. Cord interface 250 can be used in place of interface plate 220 shown in FIG. 16. Cord interface 250 includes a first opening 252 configured to receive second cord 204 and a second opening 254 configured to receive first cord 202 in a vertically extending configuration as compared to the horizontal side-by-side configuration of interface plate 220 shown in FIG. 16. Cord interface 250 further includes a third opening 256 configured to permit strap 224 to extend therethrough, similar to third opening 230 of interface plate 220. One advantage of this configuration is that routing of first cord 202 and second cord 204 can be simplified and may be more visually appealing than the configuration of FIG. 16.

Figure 18:
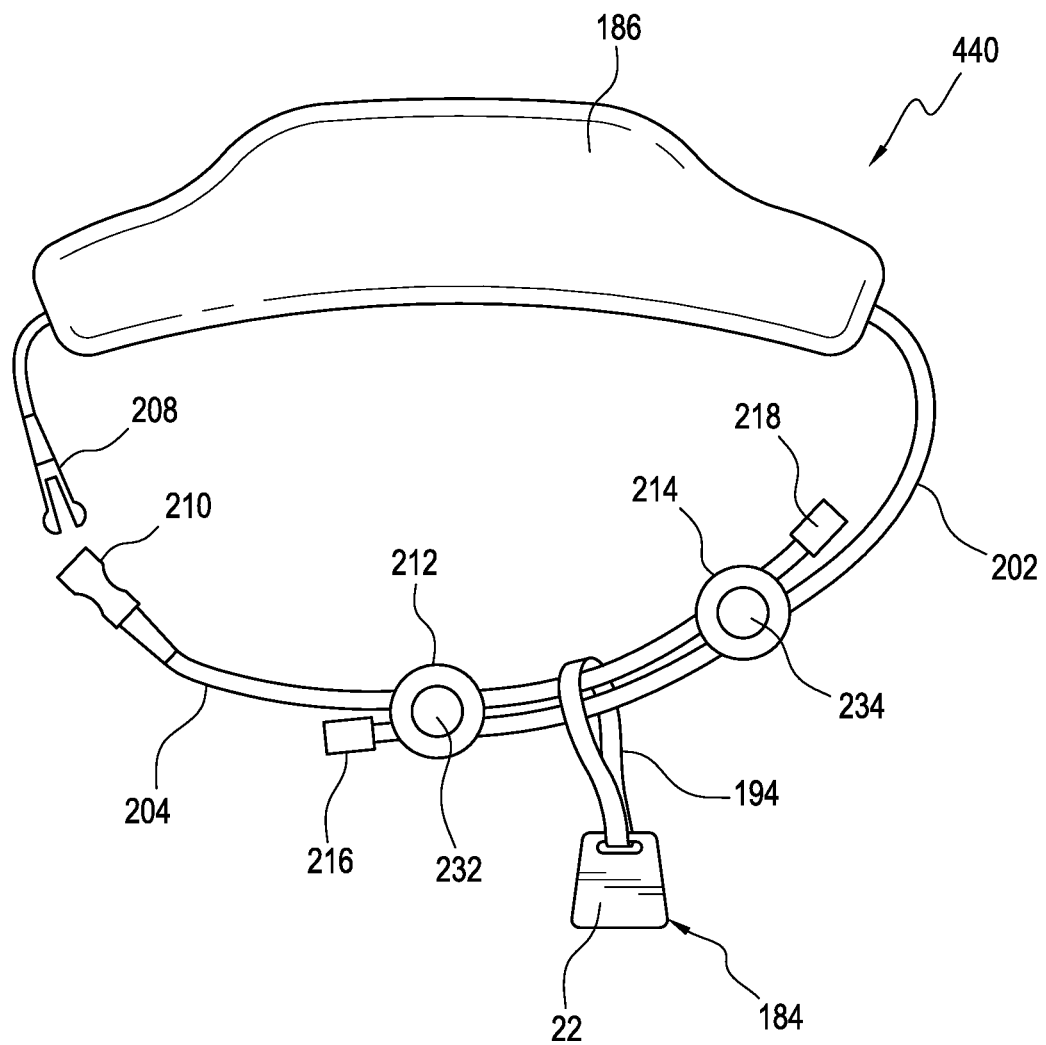
FIG. 18 is a view of a portion of a support system that combines the features of FIGS. 15 and 16.

FIG. 18 is a view of a portion of a support system 440 that combines the features of FIGS. 15 and 16. The elements of support system 440 function as previously described hereinabove.

FIG. 19 is a view of a portion of a support system 450 in accordance with an exemplary embodiment of the present disclosure. Support system 450 includes a first lanyard portion 452, a second lanyard portion 454, a third lanyard portion 456, a connection 458, a strap 464, and a plate such as plate 22. First buckle assembly 460 is configured to disconnect first lanyard portion 452 from second lanyard portion 454 such that support system 450 can be positioned around or removed from around the wearer's neck. Second buckle assembly 462 is configured to adjust the length of second lanyard portion 454 and third lanyard portion 456, thus adjusting the overall length of support system 450. Connection 458 may be sewn, heat staked, crimped, adhered, or otherwise fastened to secure first lanyard portion 452, third lanyard portion 456, and strap 464 to each other. As in other embodiments, strap 464 is configured to loop through and support plate 22. It should be understood that a standard necklace, without buckle or adjustments can be used, said standard necklace having preferably interface 464 and plate 22. In this embodiment, since there is no adjustment, the length of the necklace is preferably a length that positions cradle 16 on the heart area of the user, and in this embodiment the length is determined by the height of the user.

Figure 20:
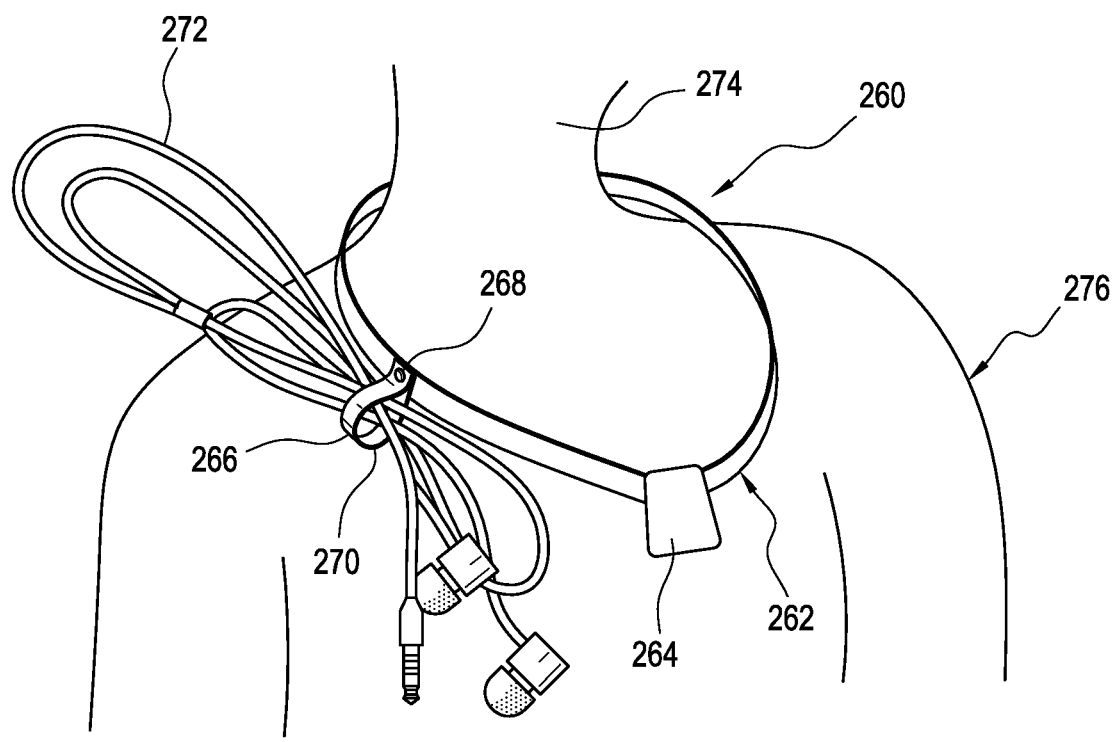
FIG. 20 is a view of a portion of a support system in accordance with an exemplary embodiment of the present disclosure.

FIG. 20 is a view of a portion of a support system 260 in accordance with another exemplary embodiment of the present disclosure with a cradle removed for clarity and simplicity of description. Support system 260 is configured as a necklace 262 that supports plate 264. Necklace 262 extends around a neck 274 of a user 276. Plate 264 is configured to interface with a magnet of a cradle, such as magnet 98 of cradle 16. Support system 260 further includes a strap 266 that can be supported on necklace 262 and secured to necklace 262 by way of a dis-connectable fastener 268, such as a snap, to form a loop 270. Loop 270 can be used to secure or support the wire(s) of ear buds or ear phones 272.

Figure 7:
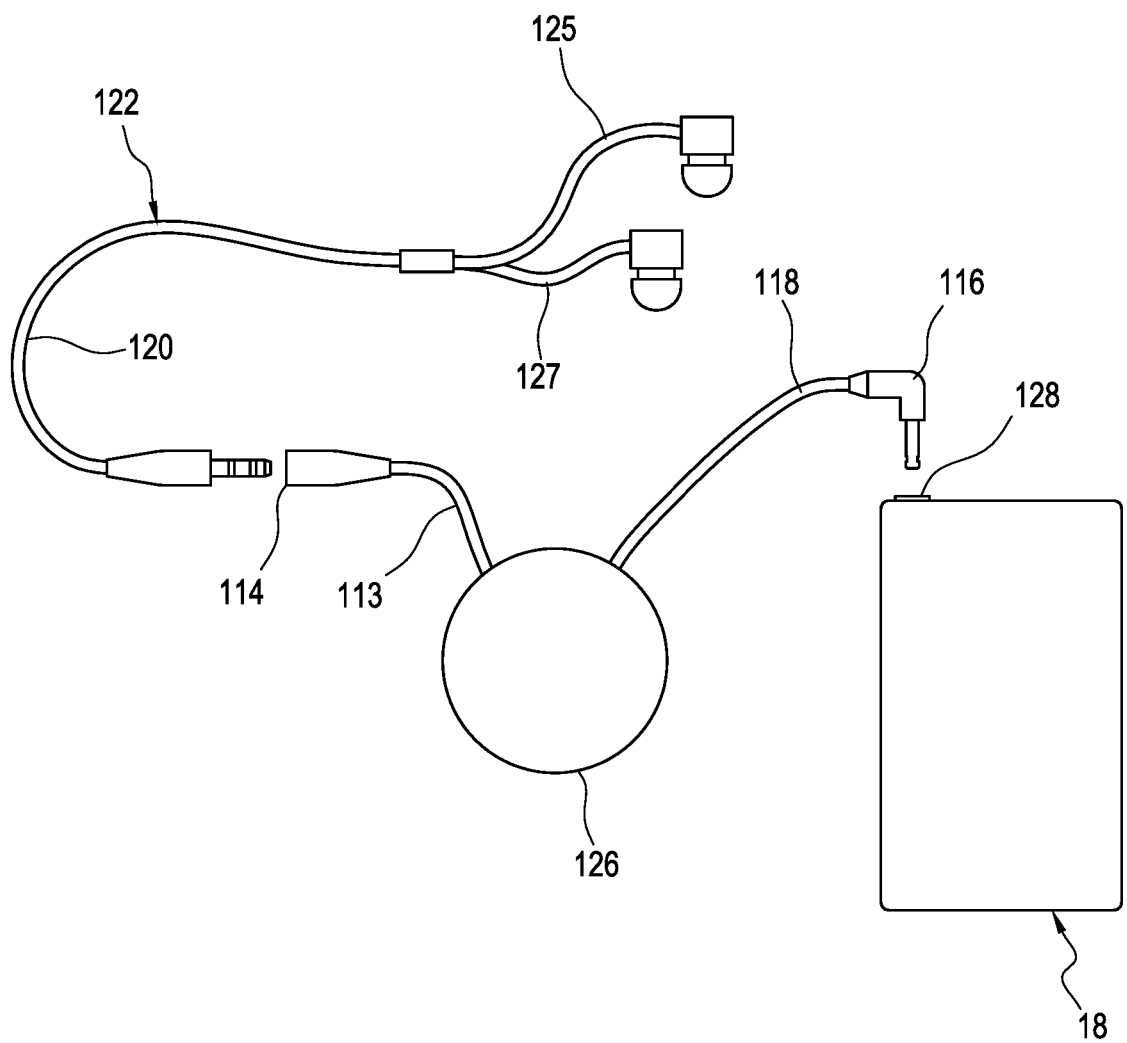
FIG. 7 is a view of a certain elements of the cradle of FIGS. 2-6 and an electronic device in accordance with an exemplary embodiment of the present disclosure.
Figure 21:
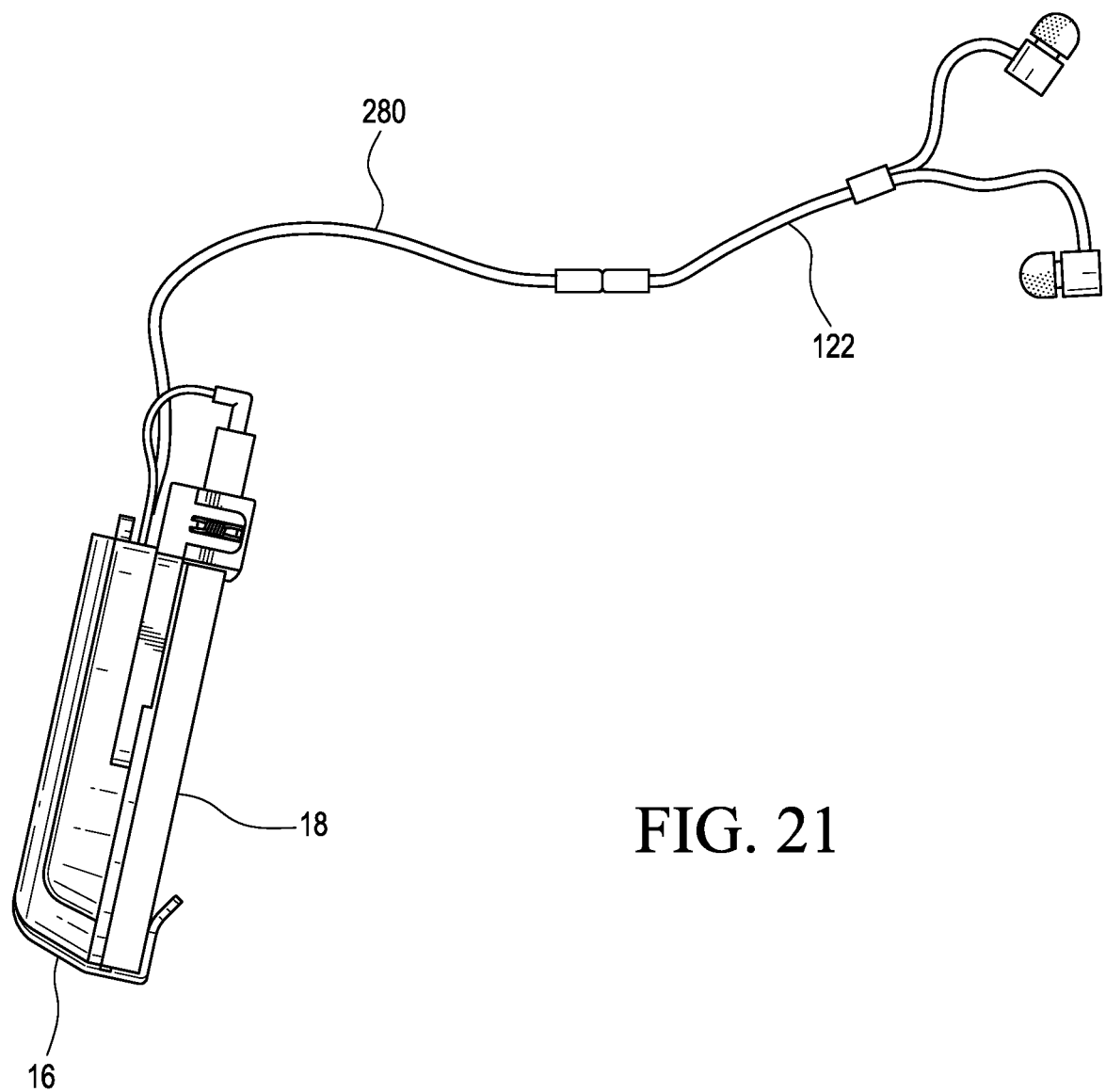
FIG. 21 is a view of a cradle holding an electronic device in accordance with an exemplary embodiment of the present disclosure, along with ear buds or speakers, and an extension cable between the ear buds and the cradle.

FIG. 21 is a view of cradle 16 holding electronic device 18 in accordance with an exemplary embodiment of the present disclosure. The configuration of FIG. 17 includes ear buds or speakers 122 and an extension cord or cable 280 positioned to connect ear buds to connector 114 of cradle 16. It should be understood that one single ear phone cord 122 can be directly connected to connector 114 of cradle 16, such as is shown in FIGS. 1 and 7, and in this embodiment there is no need for an extension cord.

FIGS. 22 and 23 are views of a support system 290 in accordance with a further exemplary embodiment of the present disclosure. Support system 290 includes a magnet 292 configured to be fixedly positioned in the interior of a wearable article 294, such as a shirt, and can be in a pocket 296. An electronic device 18, or a case of an electronic device 18, is configured to have a ferromagnetic plate or magnet 298 attached thereto. Magnet 292 can be secured to the interior of wearable article 294 by way of a fastener, adhesive, a securable pocket, or other arrangements. When plate or magnet 298 is near to magnet 292, the two magnets will be attracted to each other and the attraction will support electronic device 18 on wearable article 294.

Figure 24:
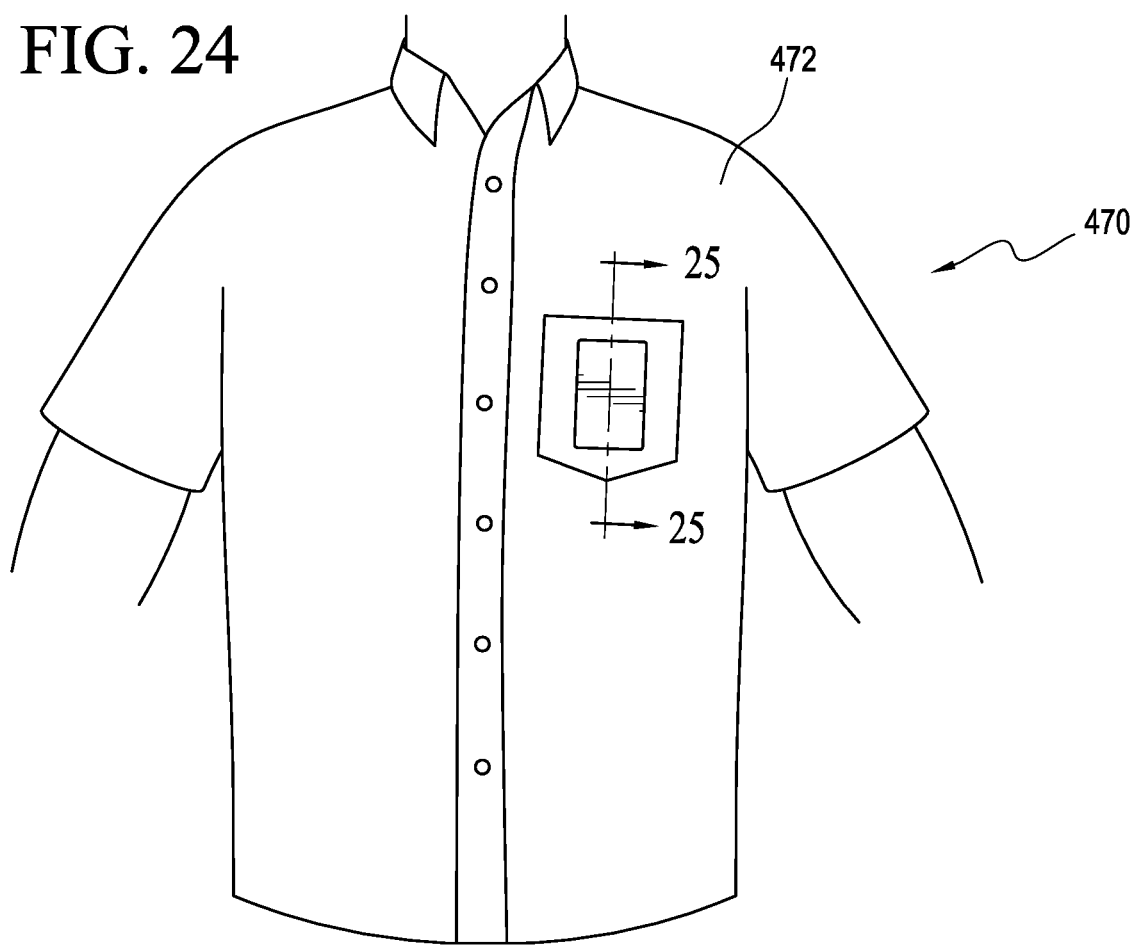
FIG. 24 is a view of support system in accordance with another embodiment of the present disclosure.
Figure 25:
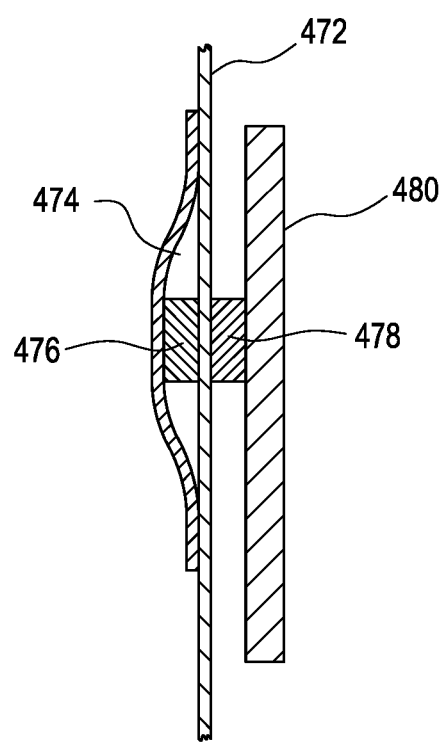
FIG. 25 is a sectional view of the support system of FIG. 24 along the lines 25-25.

In another exemplary embodiment, shown in FIGS. 24 and 25, a support system 470 includes a wearable article 472, such as a shirt, sweater, tee shirt, jacket, etc., which is configured to include an interior pocket 474 in which is positioned an internal metal plate or magnet 476. An electronic device 480 is configured with another magnet 478. When magnet 478 is in proximity to internal metal plate or magnet 476, magnet 478 secures electronic device 480 to internal metal plate or magnet 476, and thus to wearable article 472. It should be understood that magnet 98 of cradle 16 can be secured to magnet 476 in pocket 474.

Figure 26:
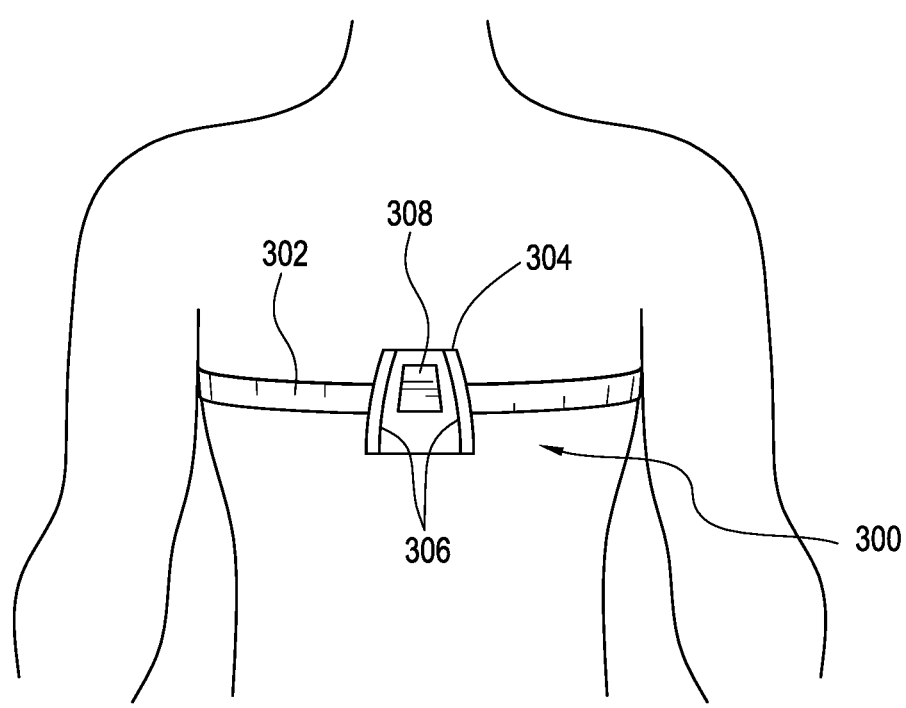
FIG. 26 is a view of a support system in accordance with a still further exemplary embodiment of the present disclosure.

FIG. 26 is a view of a support system 300 in accordance with a still further exemplary embodiment of the present disclosure. Support system 300 is configured as a chest band and includes an adjustable or stretchable band 302. Band 302 supports band interface 304, and band interface 304 includes internal geometry 306 that is configured to mate with external geometry of, for example, cradle 16 to fixedly secure cradle 16 to band interface 304 with the attraction of magnet 98 in cradle 16 to a magnet or plate 308 fixedly secured to band interface 304.

Figure 27:
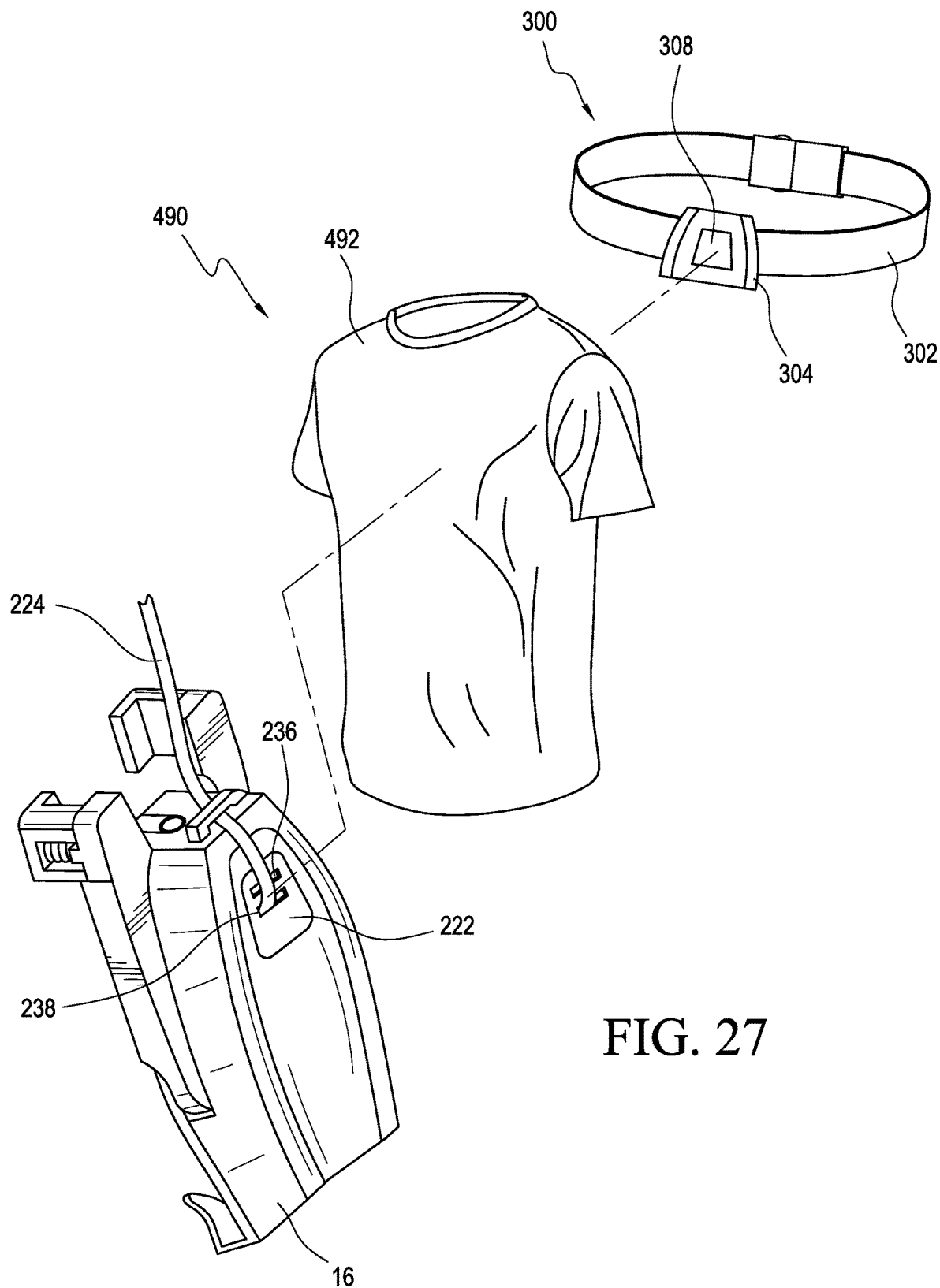
FIG. 27 is a view of a support system in accordance with a yet further exemplary embodiment of the present disclosure.
Figure 28:
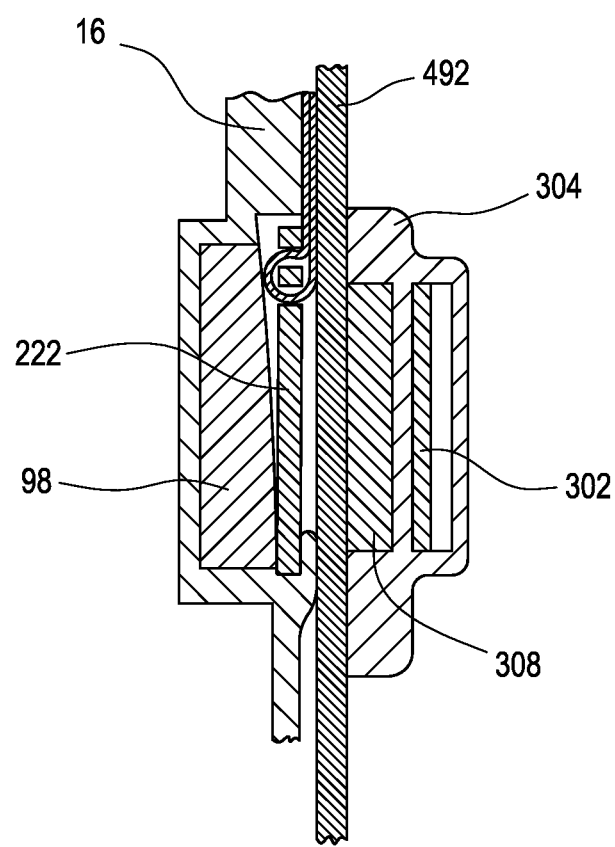
FIG. 28 is a sectional view of the support system of FIG. 27 through an interface between a wearable article, the cradle, and the band interface of the chest strap of FIG. 26.

FIGS. 27 and 28 are views of a support system 490 that includes the chest strap support system 300 of FIG. 26 positioned under a wearable article 492, which can be a tee-shirt, a shirt, a sweater, a jacket, etc. Cradle 16 can be positioned in the area of magnet 308 of band interface 304, such that metal plate 222 of cradle 16 is attracted to magnet 308, thus supporting cradle 16 on support system 300.

Figure 29:
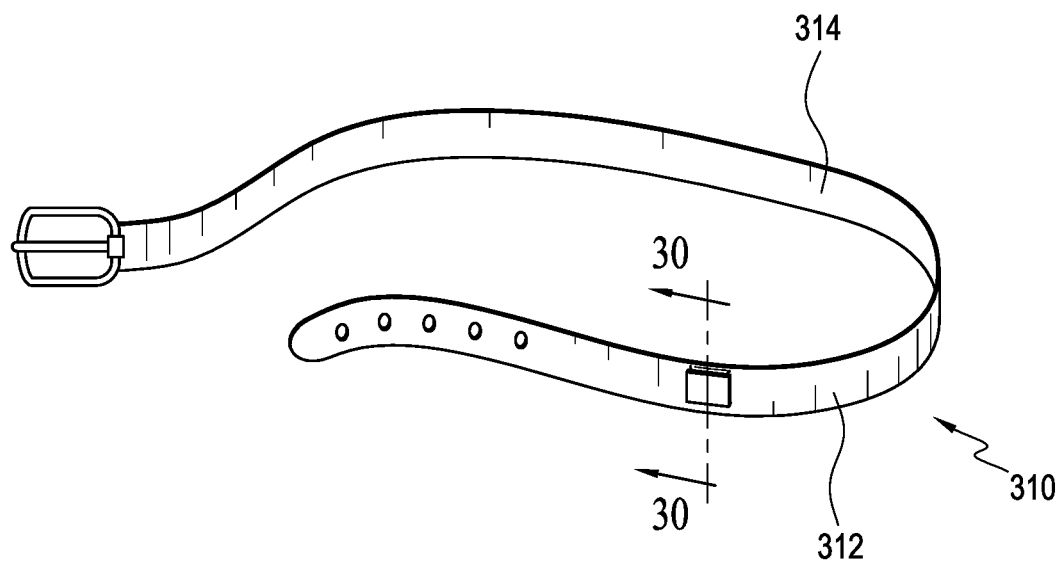
FIG. 29 is a view of a portion of a support system in accordance with yet another exemplary embodiment of the present disclosure.
Figure 30:
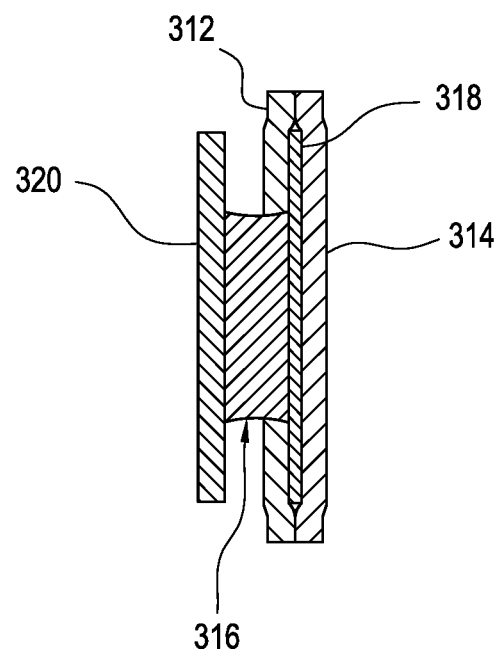
FIG. 30 is a sectional view of a support base of the support system of FIG. 29 along the lines 30-30.

FIGS. 29 and 30 are views of a portion of a support system 310 in accordance with yet another exemplary embodiment of the present disclosure. Support system 310 is configured as a belt, which includes a front exterior covering 312 and a rear exterior covering 314. Support system 310 includes a support base 316. Support base 316 includes a first plate 318 that is secured between front exterior covering 312 and rear exterior covering 314. Support base 316 further includes a second plate 320 that is formed of a ferromagnetic material or a rare earth magnetic material. Second plate 320 can be attached or fastened to support base 316 or can be integrally formed as part of support base 316. Second plate 320 is configured to interface with a cradle, such as cradle 16, and is dimensioned similar to plate 22.

Figures 31A, 31B:
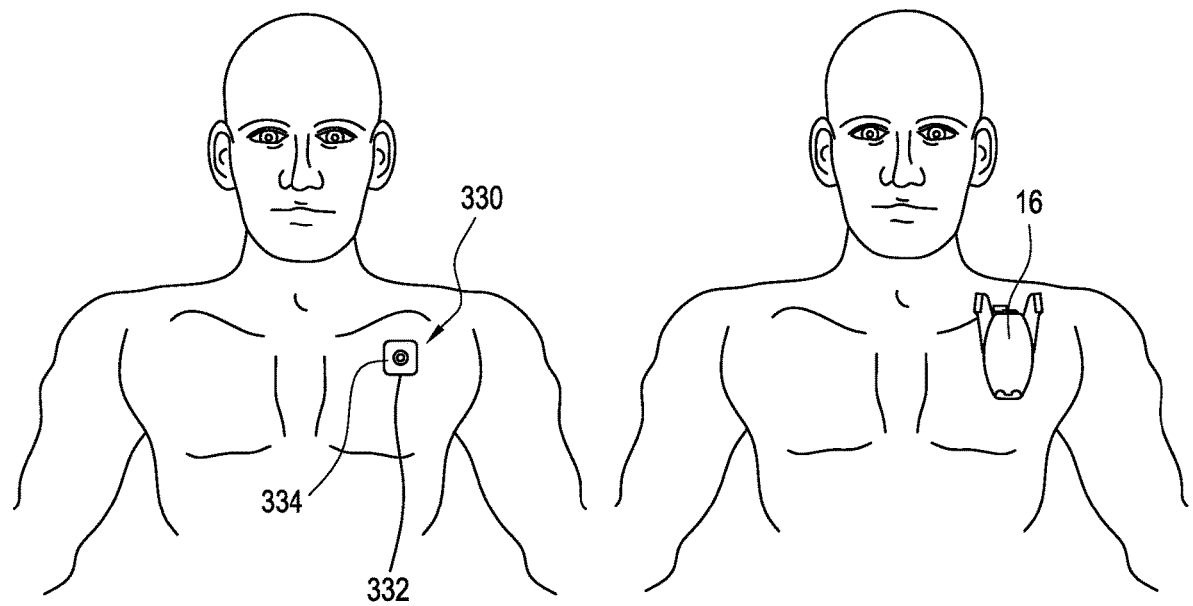
FIG. 31A is a view of a support base positioned on a chest of a wearer in an offset position in accordance with an exemplary embodiment of the present disclosure.
FIG. 31B is a view of the support base of FIG. 31A with a support cradle positioned thereon.
Figure 31C:
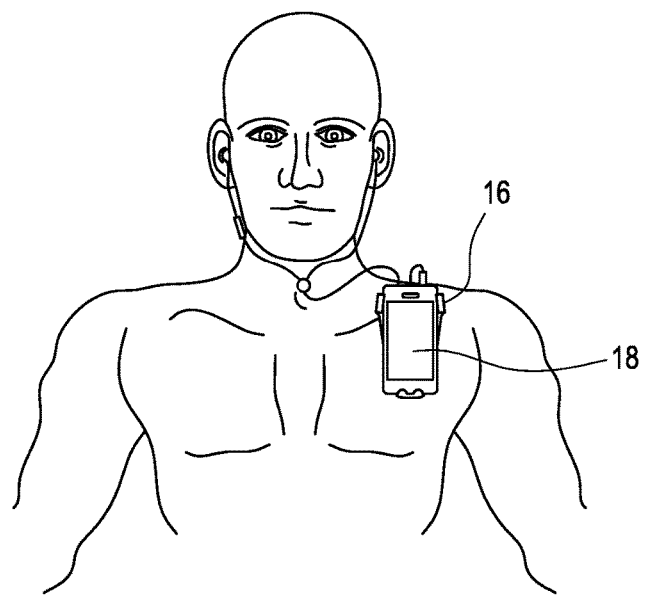
FIG. 31C is a view of the support cradle of FIG. 31B with an electronic device positioned thereon.
Figures 31D, 31E:
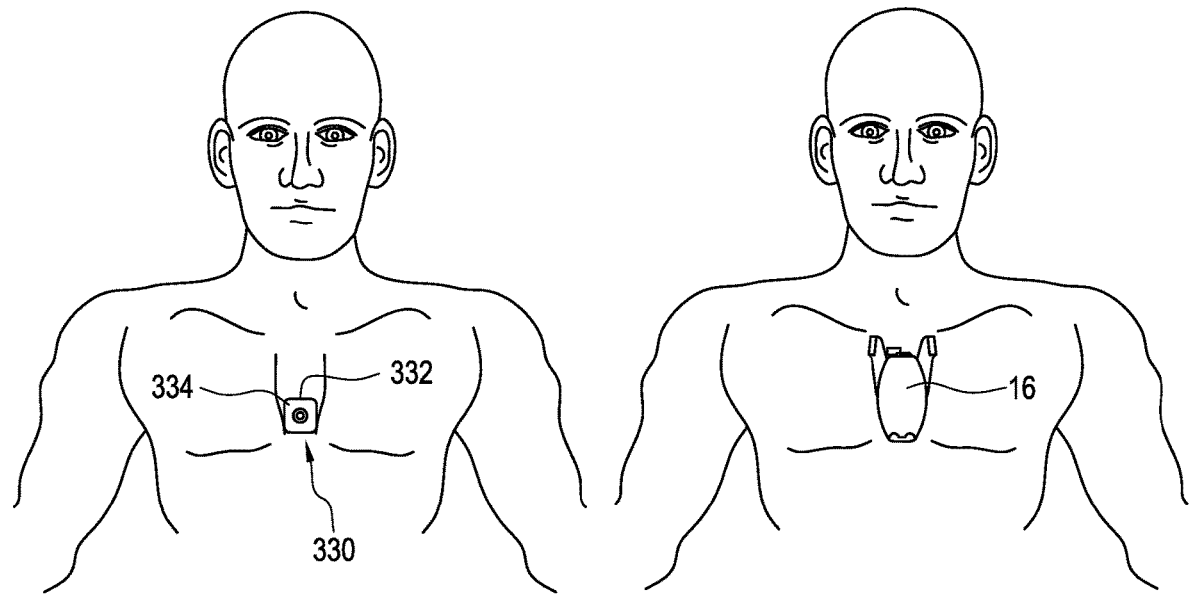
FIG. 31D is a view of the support base of FIG. 31A positioned on a chest of a wearer in a central position in accordance with an exemplary embodiment of the present disclosure.
FIG. 31E is a view of the support base of FIG. 31D with a support cradle positioned thereon.
Figure 31F:
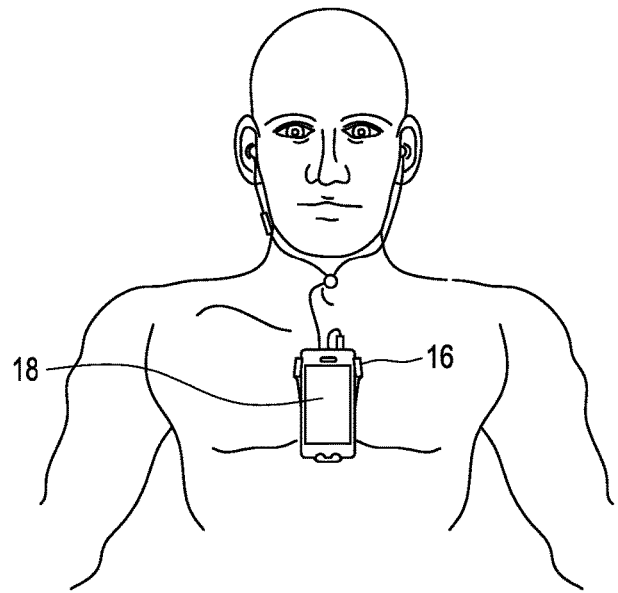
FIG. 31F is a view of the support cradle of FIG. 31E with an electronic device positioned thereon.

FIGS. 31A-C are views of a support base 330 positioned on a chest of a wearer in an offset position, with support cradle 16 and electronic device 18 positioned thereon, in accordance with an exemplary embodiment of the present disclosure. FIGS. 31D-F are views support base 330 positioned on a chest of a wearer in a central position, with support cradle 16 and electronic device 18 positioned thereon, in accordance with an exemplary embodiment of the present disclosure. Support base 330 is similar to support base 316 in FIGS. 21 and 22. However, support base 330 is configured to be directly attached to the skin of a wearer. Support base 330 includes a first side 332 configured to permit attachment to skin and a ferromagnetic or rare earth magnet second side 334 that is sized and dimensioned to interface with magnet 98 of cradle 16. An adhesive surface such as used for medical purposes (e.g., electrocardiogram electrodes) can be used to secure support base 330 to the skin of the user or wearer.

Figure 32:
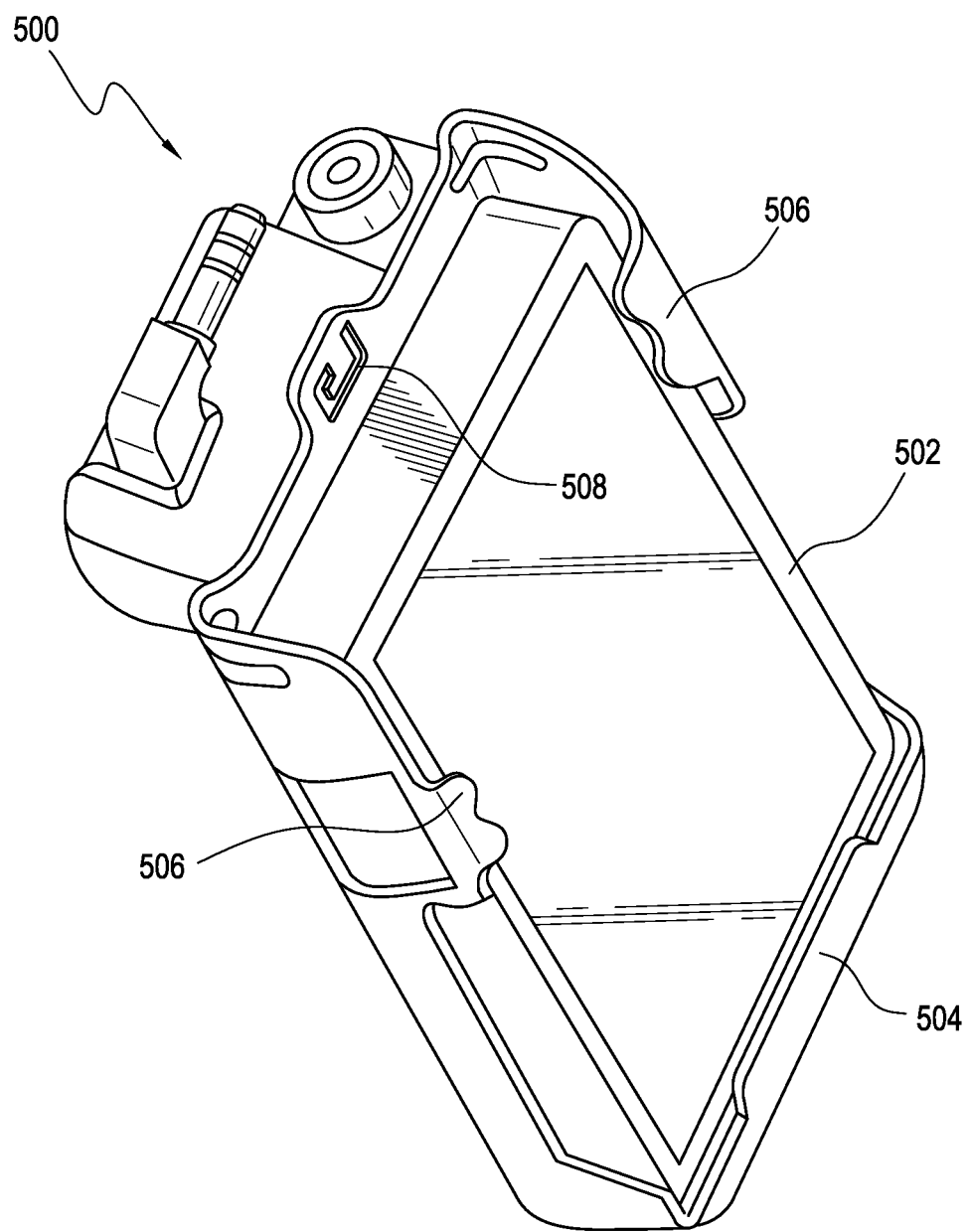
FIG. 32 is a perspective view of another support system holding an electronic device in accordance with an exemplary embodiment of the present disclosure.

FIG. 32 is a perspective view of another support system 500 holding an electronic device 502 in accordance with an exemplary embodiment of the present disclosure. Support system 500 is configured with specific dimensions to hold electronic device 502. Accordingly, support system 500 is sized and dimensioned for a specific electronic device 500. Support system 500 includes a bottom retainer 504, side retainers 506, and a top retainer 508 that must be pressed to permit removal of electronic device 502. Support system 500 includes features previously described herein, including a retraction apparatus, magnets, etc.

Figure 33:
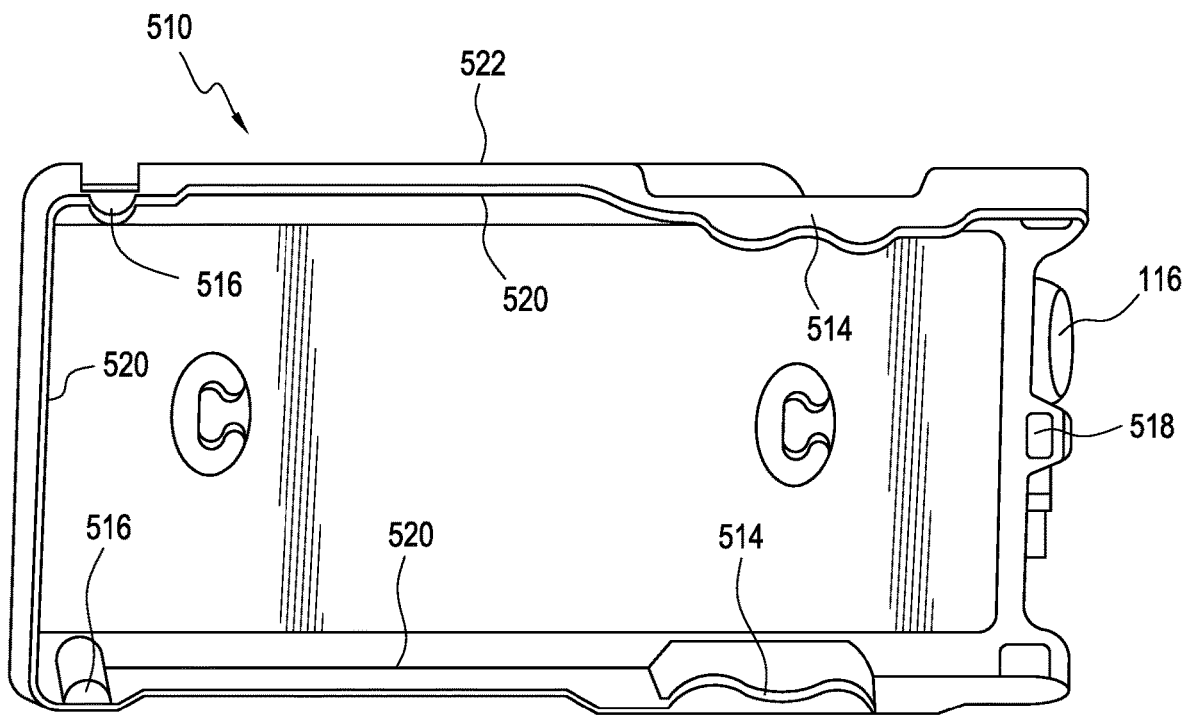
FIG. 33 a view of still another support system in accordance with an exemplary embodiment of the present disclosure.
Figure 34:
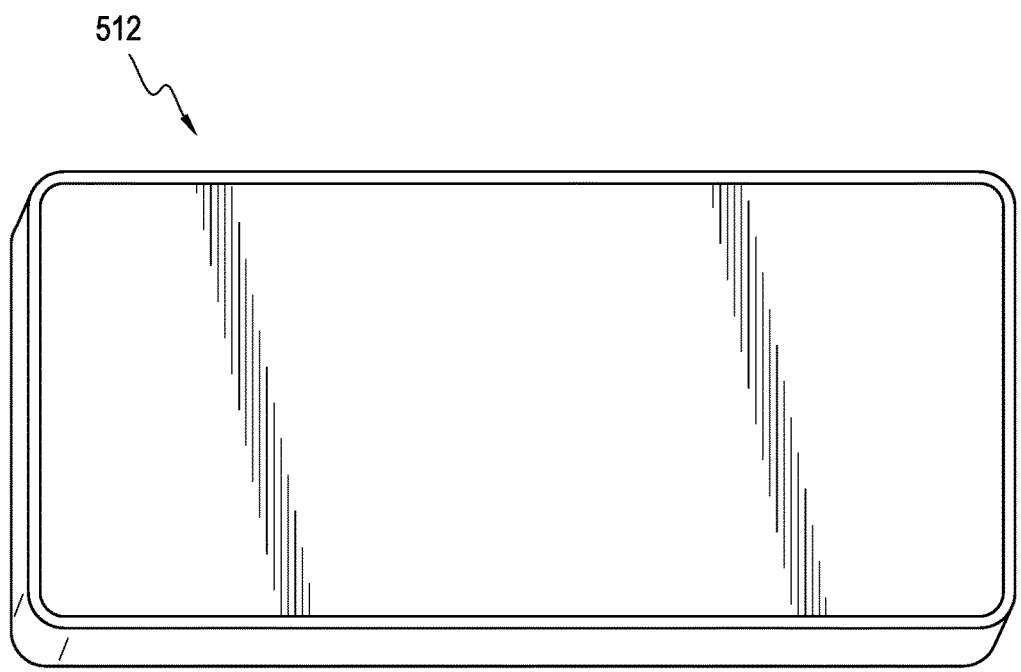
FIG. 34 is a view of the electronic device of FIG. 33.
Figure 35:
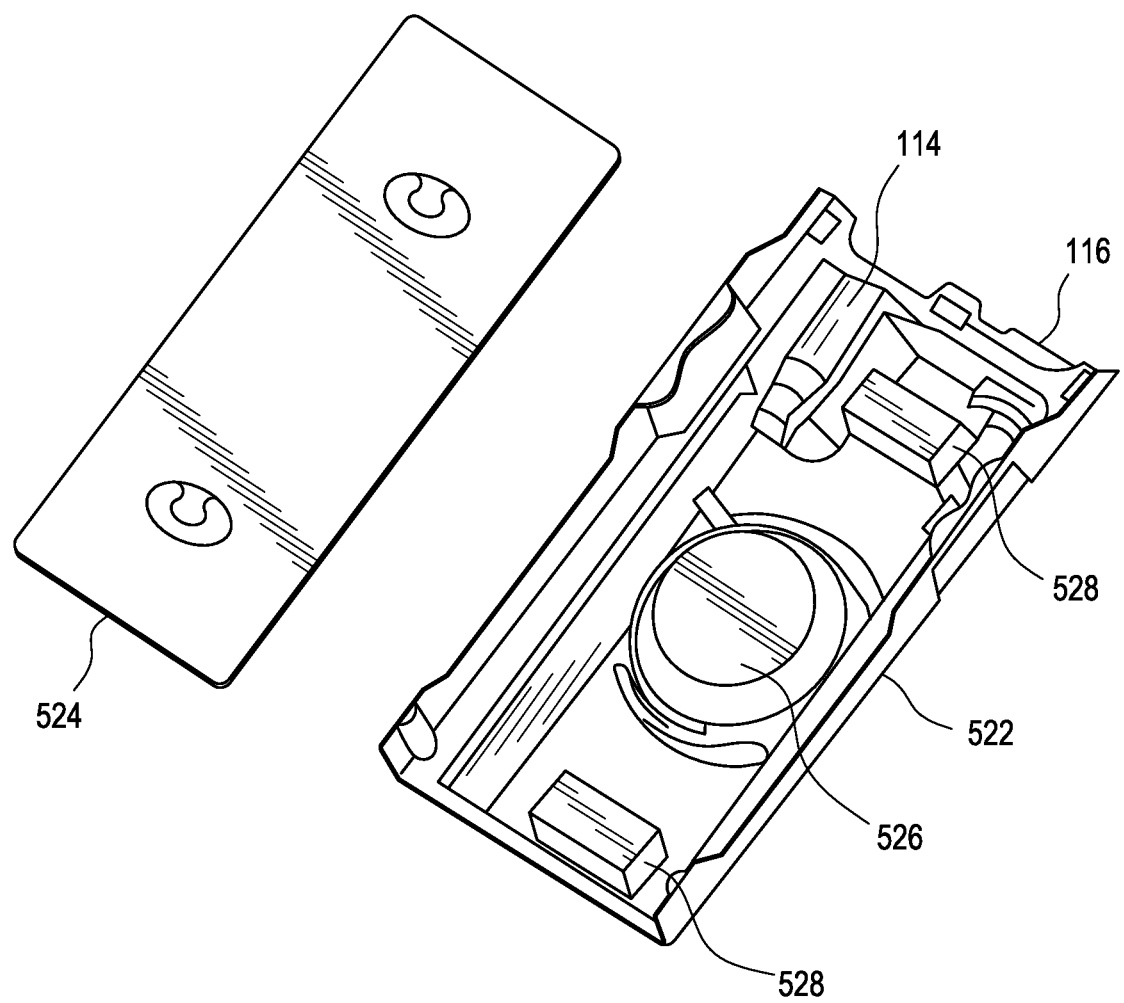
FIG. 35 is a view of the support system of FIG. 33 with a back cover removed to show internal features of the support system.

FIGS. 33-35 are views of still another support system 510 and electronic device 512 in accordance with an exemplary embodiment of the present disclosure. As with support system 500, support system 510 is sized and dimensioned for a specific electronic device 512. Support system 510 includes first side retainers 514, second side retainers 516, and top retainer 518 that must be pressed to permit removal of electronic device 512 from support system 510. As shown in FIG. 35, support system 510 also includes a first housing 522 and second housing 524. First housing 522 includes sides or side walls 520, which cooperate with first side retainers 514 and second side retainers 516 to secure electronic device 512 in position. Support system 510 further includes a retraction apparatus or mechanism 526 and magnets 528.

Figure 36:
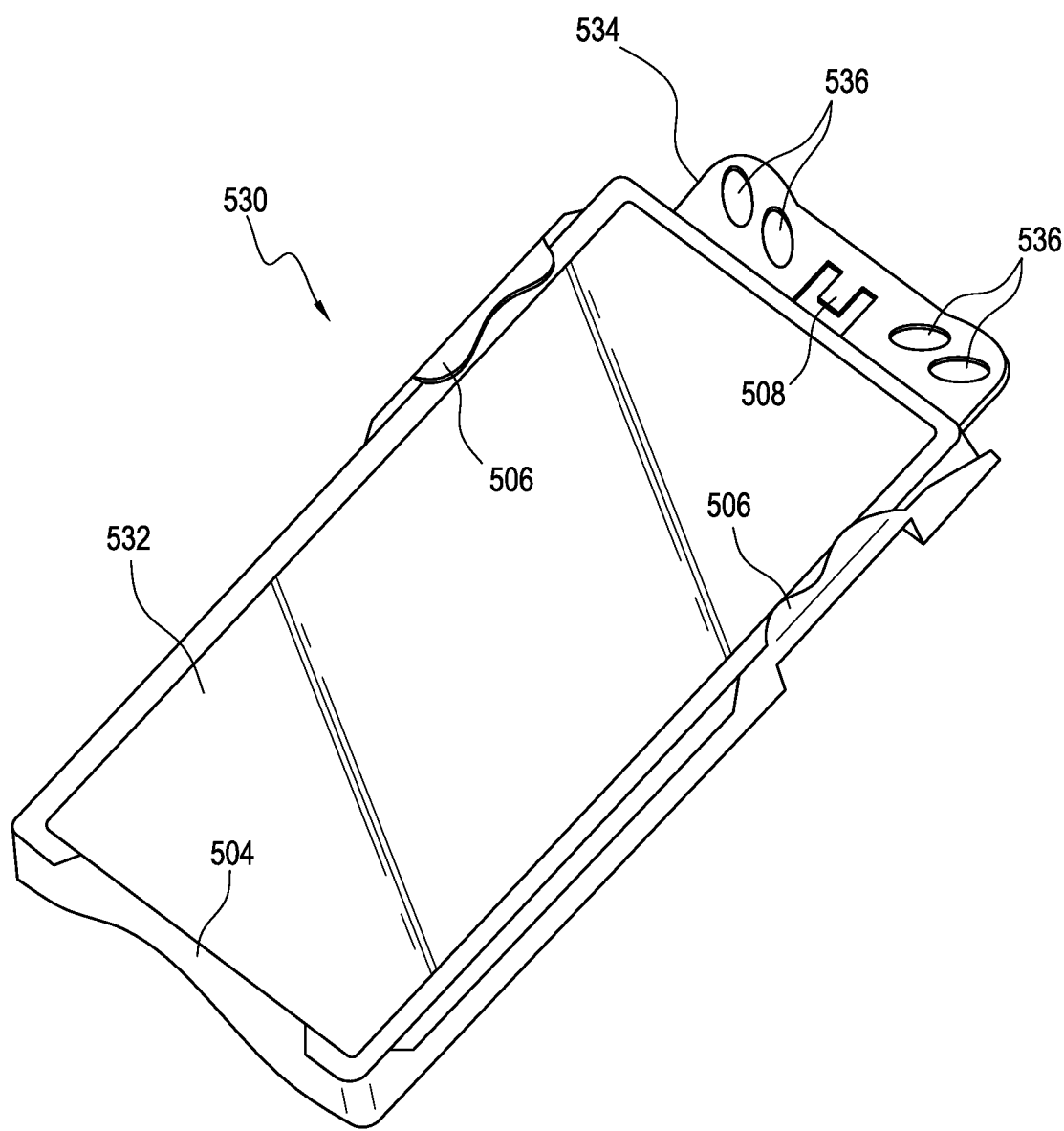
FIG. 36 is a perspective view of yet another support system holding an electronic device in accordance with an exemplary embodiment of the present disclosure.
Figure 37:
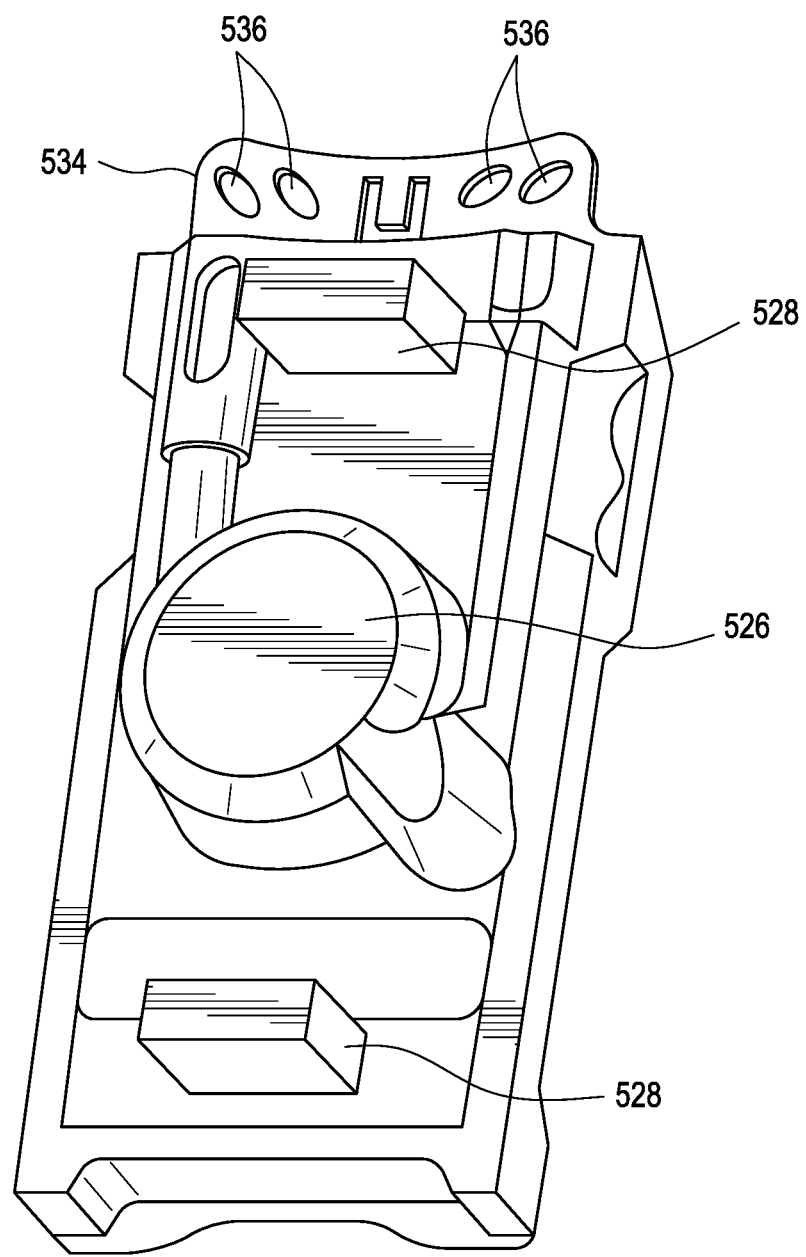
FIG. 37 is a view of the interior of the support system of FIG. 36.

FIGS. 36 and 37 are views of yet another support system 530 holding an electronic device 532 in accordance with an exemplary embodiment of the present disclosure. Support system 530 is similar to support system 500, but a housing 534 includes a plurality of openings 536 to provide flexibility in attaching a device such as a lanyard or necklace.

FIGS. 38 and 39 are views of a cradle 340 and associated electronic device 342 in accordance with an exemplary embodiment of the present disclosure. Electronic device 342 is supported in a case 344. Cradle 340 includes a retraction device 346 and connector 116, described earlier. Cradle 340 includes a plurality of magnets 346 secured thereto on an exterior plate 348 thereof. Case 344 includes magnets 350 positioned thereon in a dimensional arrangement to mate with magnets 346 positioned on cradle 340.

FIGS. 40 and 41 are views of a cradle 360 and associated electronic device 362 in accordance with an exemplary embodiment of the present disclosure. Electronic device 362 is supported in a case 364. Cradle 360 includes a retraction device 366 and connector 116, described earlier. Cradle 360 includes a plurality of magnets 368 secured thereto on an exterior plate 372 thereof. Cradle 360 further includes a hook and loop fastener 370, which in the exemplary embodiment of FIG. 26 is positioned longitudinally between magnets 368. Case 364 includes magnets 374 positioned thereon in a dimensional arrangement to mate with magnets 368 positioned on cradle 360. Case 364 further includes a hook and loop fastener 376 positioned to mate with hook and loop fastener 370 when magnets 374 mate with magnets 368.

Figure 42:
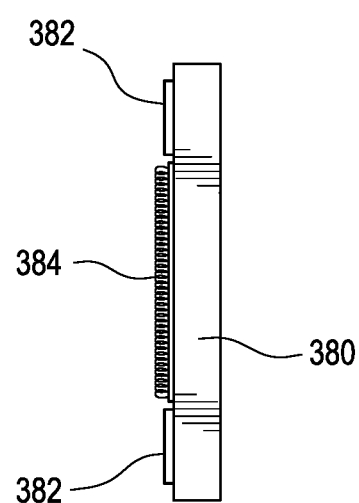
FIG. 42 is a side or edge view of an electronic device configured to mate with the cradle of FIG. 40 in accordance with an exemplary embodiment of the present disclosure.

FIG. 42 is a view of an electronic device 380 configured to mate with cradle 360 of FIG. 26 in accordance with an exemplary embodiment of the present disclosure. Electronic device 380 includes magnets 382 positioned thereon in a dimensional arrangement to mate with magnets 368 positioned on cradle 360. Electronic device 380 further includes a hook and loop fastener 384 positioned to mate with hook and loop fastener 370 when magnets 382 mate with magnets 368.

It should be apparent that the configuration of cradle 16 is such that the features on cradle 16 configured to mate with plate 22 form a mounting arrangement that can be universal. FIGS. 43-75 are views of support systems configured to interface with cradle 16.

Figure 43:
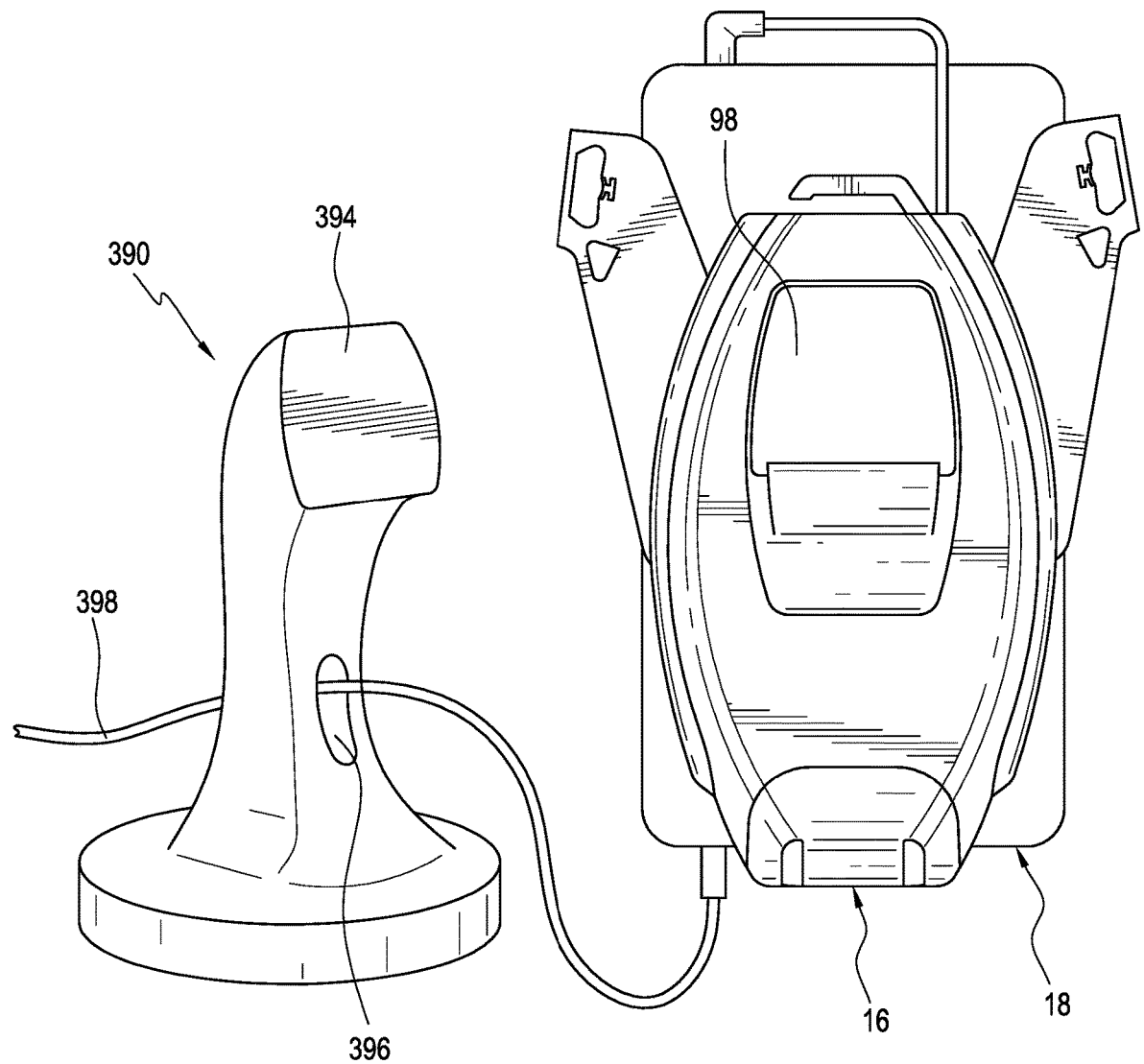
FIG. 43 is a view of a support system in accordance with another exemplary embodiment of the present disclosure.

FIG. 43 is a view of a support system 390 in accordance with another exemplary embodiment of the present disclosure. Support system 390 is configured as a base that can rest on or be attached to a table or tray, including those found in vehicles such as cars, planes, and trains. Support system 390 includes a ferromagnetic or magnetic plate 394 sized and dimensioned to interface with magnet 98 of cradle 16. Magnetic plate 394 can be adhered, fastened, insert molded, or otherwise attached to support system 390. An opening 396 in support system 390 can permit the routing of a power cable 398 to be conveniently located for attachment to electronic device 18.

Figure 44:
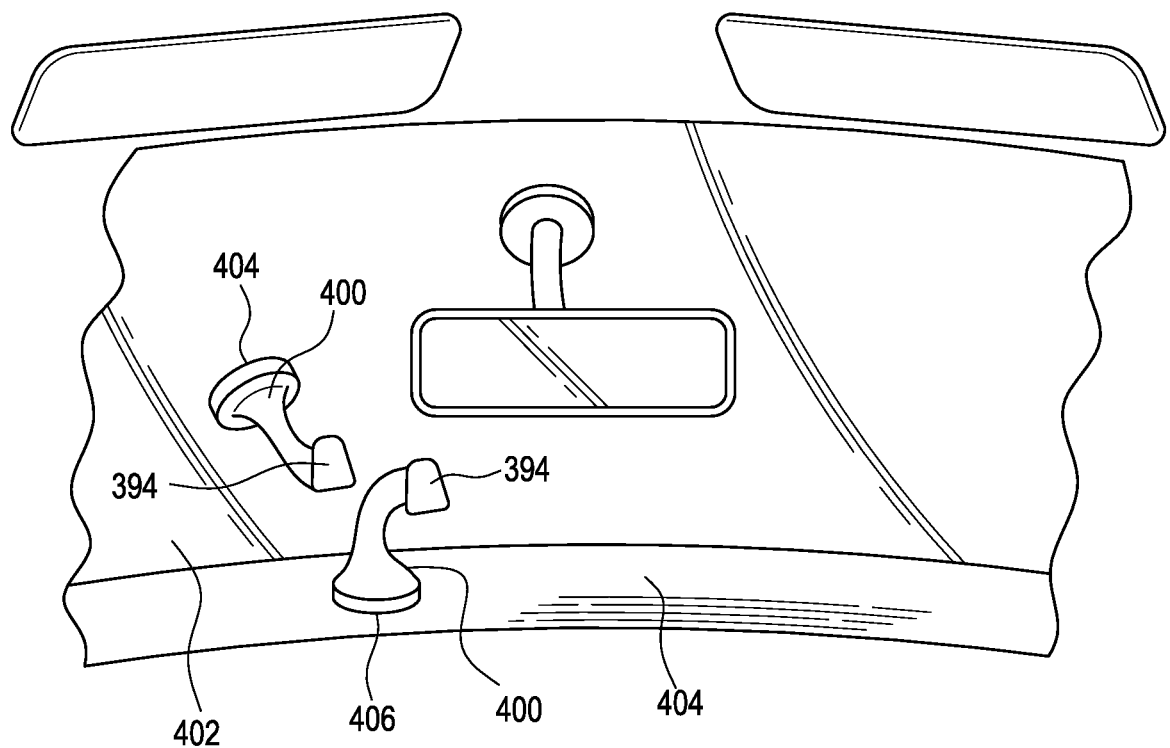
FIG. 44 is a view of a base configured to mate with a windshield or dash of a vehicle in accordance with an exemplary embodiment of the present disclosure.

FIG. 44 is a view of a base 400 configured to mate with a windshield 402 or dash 404 of a vehicle in accordance with an exemplary embodiment of the present disclosure. Base 400 can include a suction type portion 406 for attachment to windshield 402 or dash 404, or an adhesive. Base 400 also features plate 394, previously described.

Figure 45:
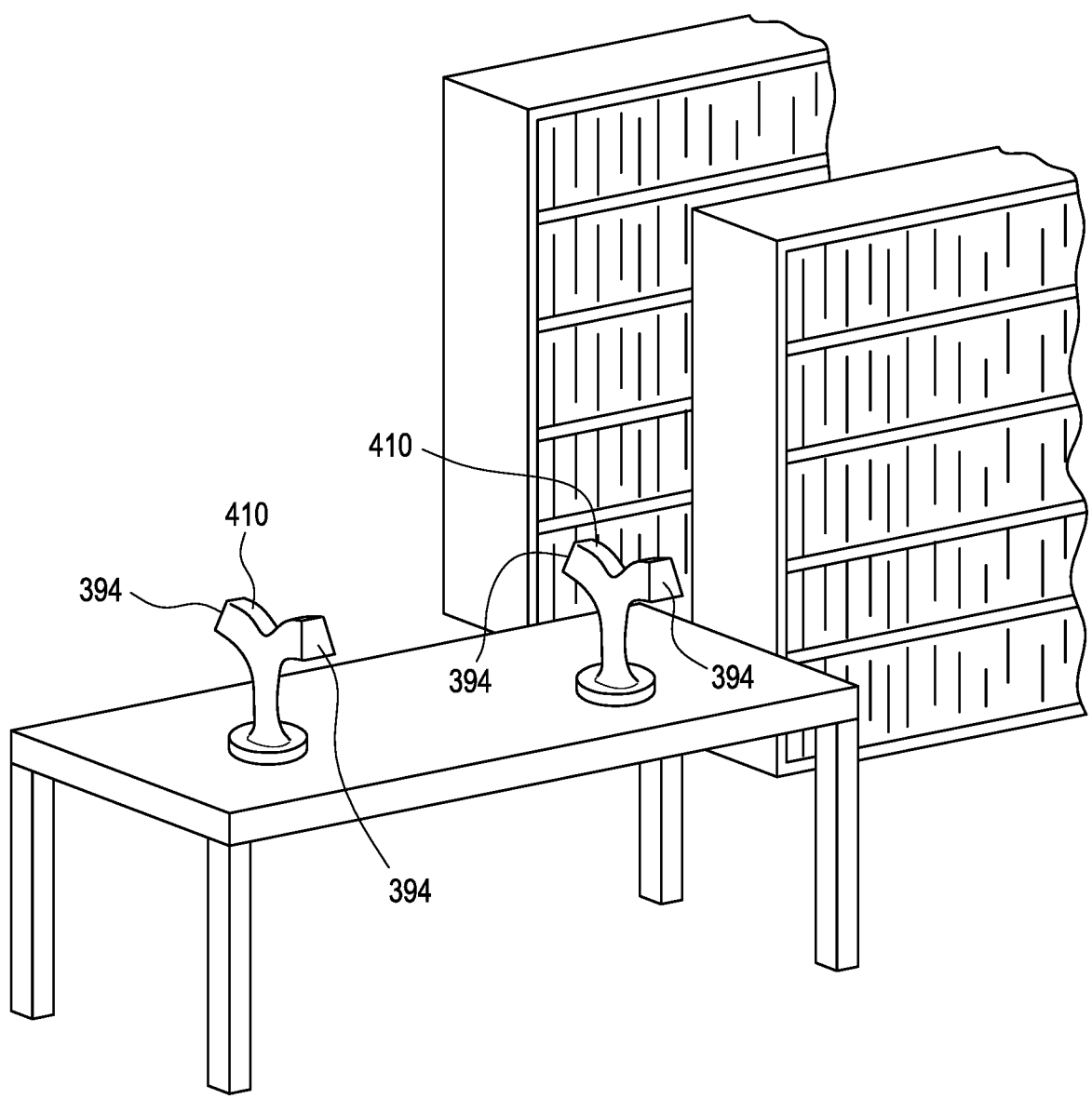
FIG. 45 is a view of table-mounted base in accordance with an exemplary embodiment of the present disclosure.

FIG. 45 is a view of table-mounted base 410 in accordance with an exemplary embodiment of the present disclosure. Base 410 includes a plurality of plates 394, each configured to mate with cradle 16. Thus, in an environment with multiple users, base 410 can allow convenient positioning of a plurality of electronic devices.

Figure 46:
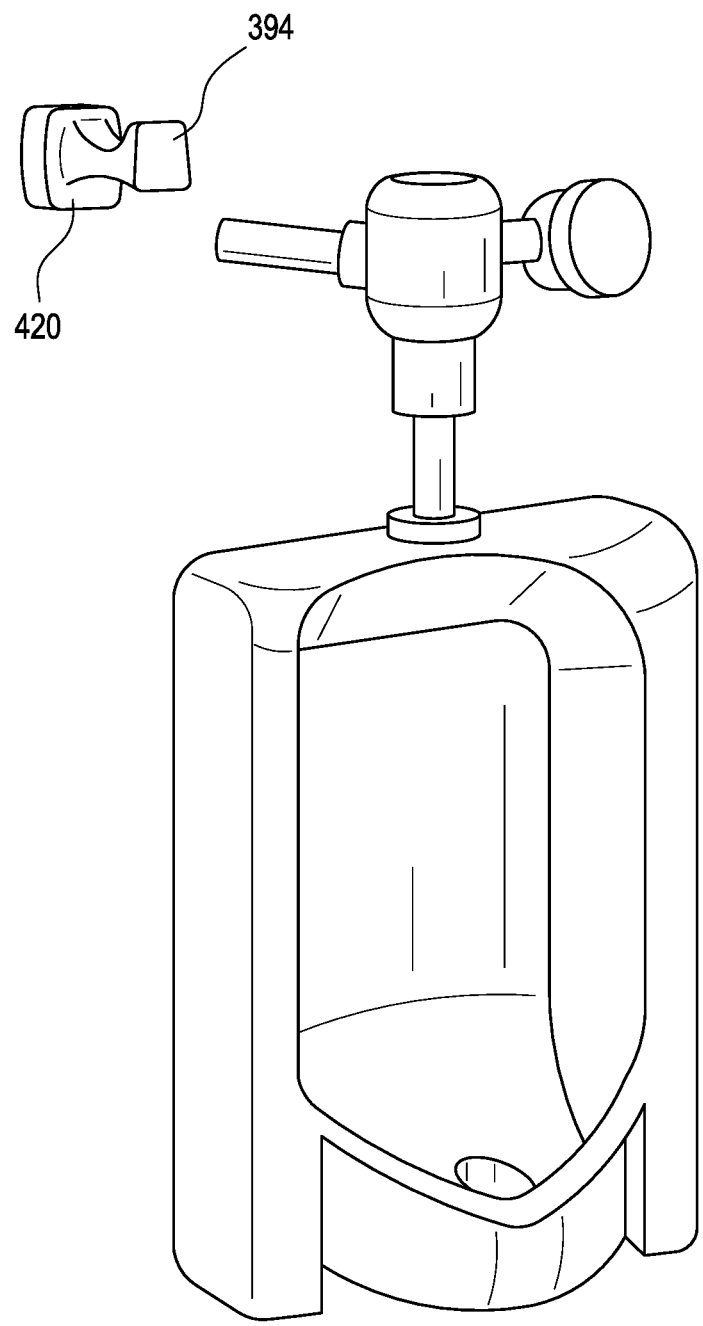
FIG. 46 is a view of a wall-mounted base in accordance with an exemplary embodiment of the present disclosure.

FIG. 46 is a view of a wall-mounted base 420 in accordance with an exemplary embodiment of the present disclosure. Wall mounted base 420 can be positioned in any location where electronic devices might be used, such as a restroom. Wall mounted base 420 includes interface plate 394, previously described.

Figure 47:
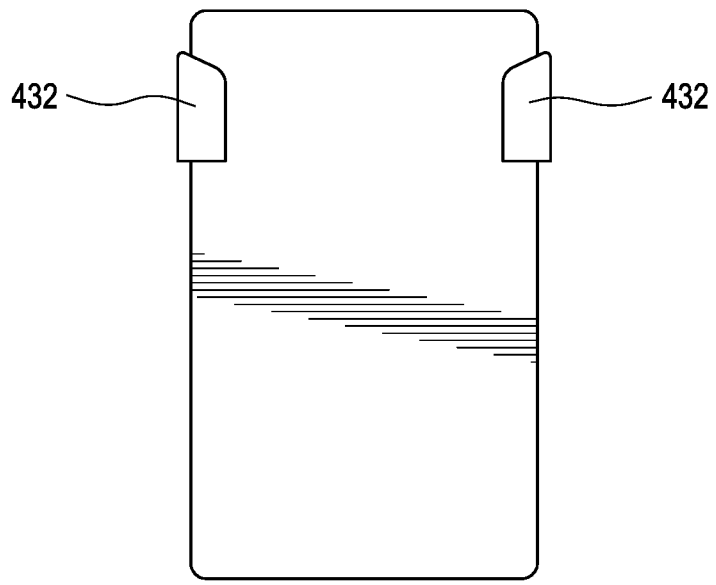
FIG. 47 is a view of a cradle in accordance with an exemplary embodiment of the present disclosure.
Figure 48:
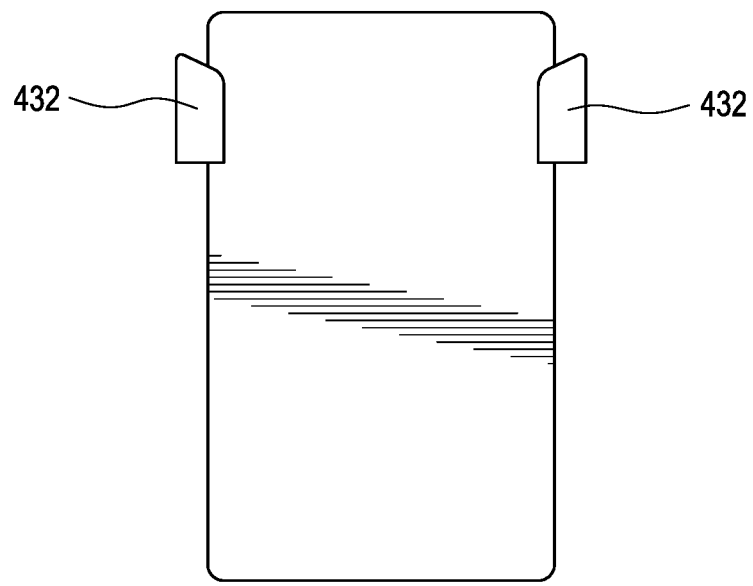
FIG. 48 is a view of the cradle of FIG. 47 with support arms extended.

FIGS. 47 and 48 are views of a cradle 430 in accordance with an exemplary embodiment of the present disclosure. Cradle 430 includes support arms 432 that move laterally outwardly. The back portion of cradle 430 includes features similar to the portion of cradle 16 that includes magnet 98. Thus, cradle 430 can be universally mounted on the various bases described herein.

For ease and simplicity of description, a ferromagnetic metal plate or magnet is described in each of the following embodiments as element 538. However, it should be understood that ferromagnetic metal plate or magnet 538 can be different in each embodiment, including variations in dimensions and materials. In addition, it should be understood that the force of attraction between ferromagnetic plate or magnet 538, described below simply as plate 538, and an associated ferromagnetic plate or magnet located on a cradle such as cradle 16, is configured in view of the application and the mechanical capabilities of any particular embodiment, including those described hereinabove and those described hereinbelow. Such forces of attraction can be in the range of about 0.5 pounds to about 9 pounds.

Figure 51:
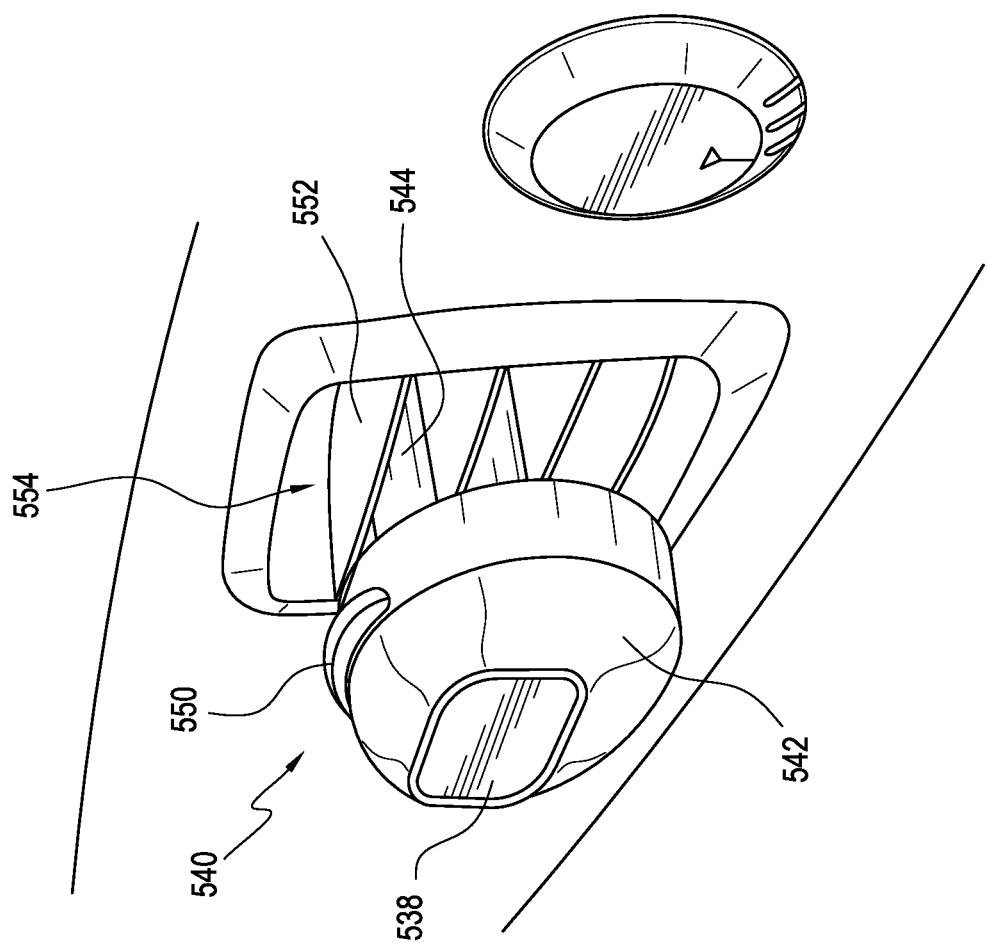
FIG. 51 is a view of the support system of FIG. 49 positioned in a vehicle in accordance with an exemplary embodiment of the present disclosure.

FIG. 49 is a view of a portion of a support system 540 in accordance with an exemplary embodiment of the present disclosure. Support system 540 includes a removal interface body 542 and a pronged base 544. Pronged base 544 can include an engagement pin 546 that mates with receiving feature 548 and locks into interface body 542. To disengage the lock, interface body 542 includes a release button 550. Support system 540 can be positioned on louvers 552 of a vehicle vent 554, as shown in FIG. 51. Though support system 540 can be positioned on pronged base 544, an adhesive plate 556 that includes adhesive on both sides can also be used to attach interface body 542 with a suitable surface.

FIG. 50 is a view of a portion of a support system 560 in accordance with an exemplary embodiment of the present disclosure. Support system 560 includes an interface body configured to engage with engagement pins 566 of a pronged base 564 in a locking configuration. Pronged base 564 also includes a release button 568 to permit removal of interface body 562 from pronged base 564. Interface body 562 can also be configured with an adhesive surface 570 to permit direct attachment of interface body 562 with a suitable surface.

Figure 52:
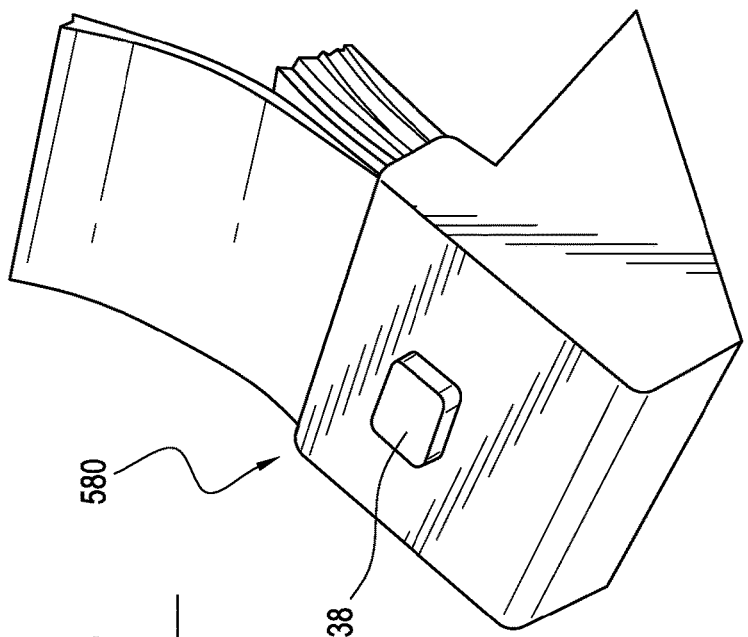
FIG. 52 is a view of a leaflet dispenser in accordance with an exemplary embodiment of the present disclosure.
Figure 54:
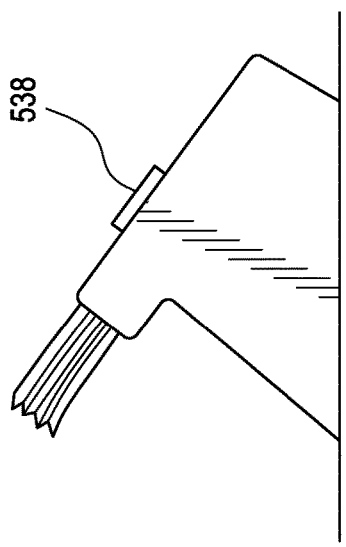
FIG. 54 is another view of the leaflet dispenser of FIG. 52.
Figure 53:
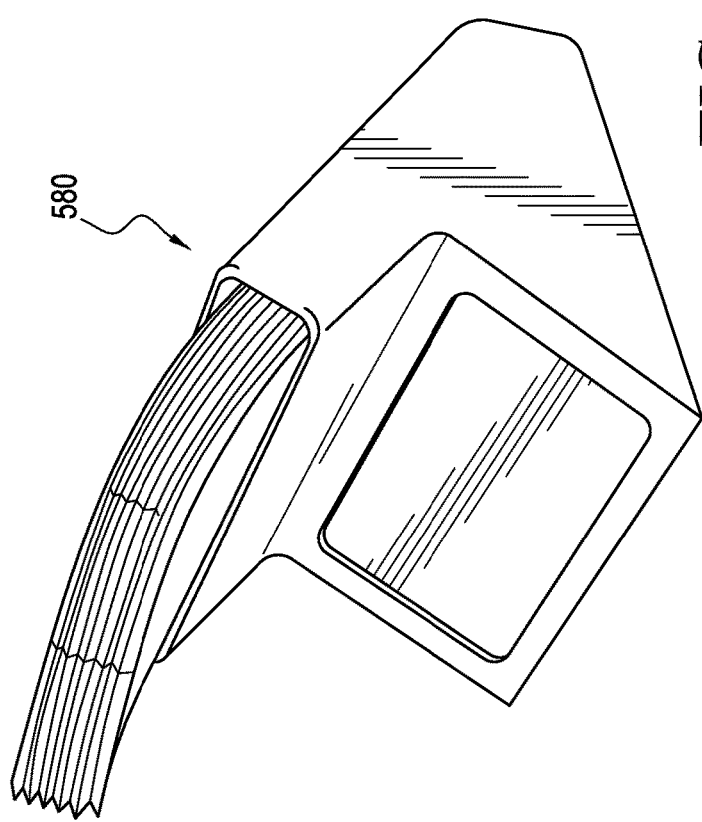
FIG. 53 is another view of the leaflet dispenser of FIG. 52.

FIGS. 52-54 are views of a leaflet dispenser 580 in accordance with an exemplary embodiment of the present disclosure. As should be apparent, leaflet dispenser 580 is configured to support a tablet or other electronic device on plate 538.

Figure 57:
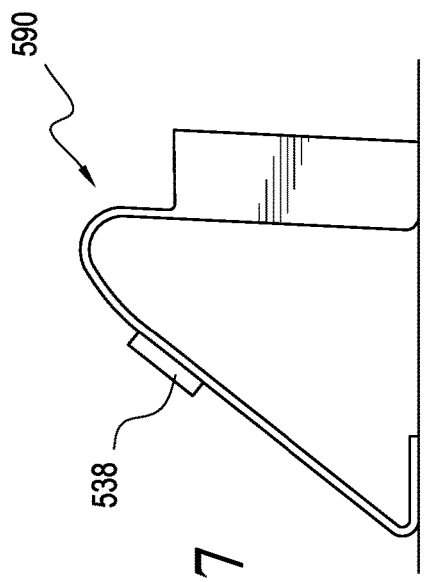
FIG. 57 is yet another view of the leaflet dispenser of FIG. 55.
Figure 55:
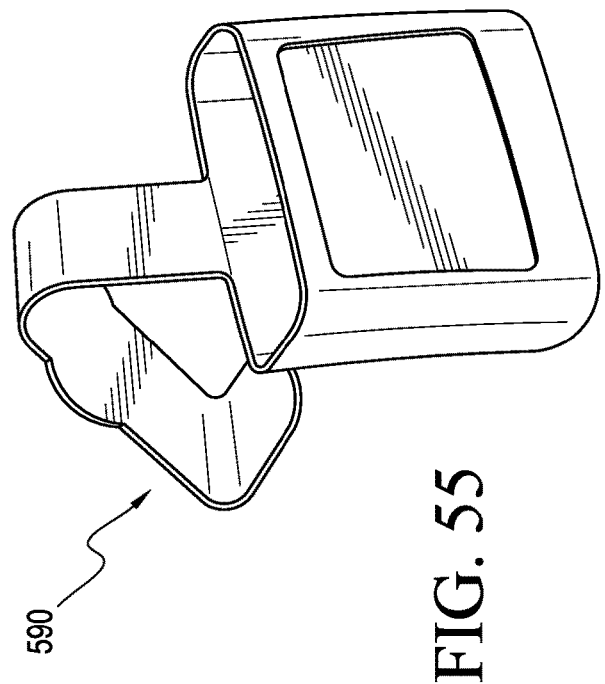
FIG. 55 is a view of another leaflet dispenser in accordance with an exemplary embodiment of the present disclosure.
Figure 56:
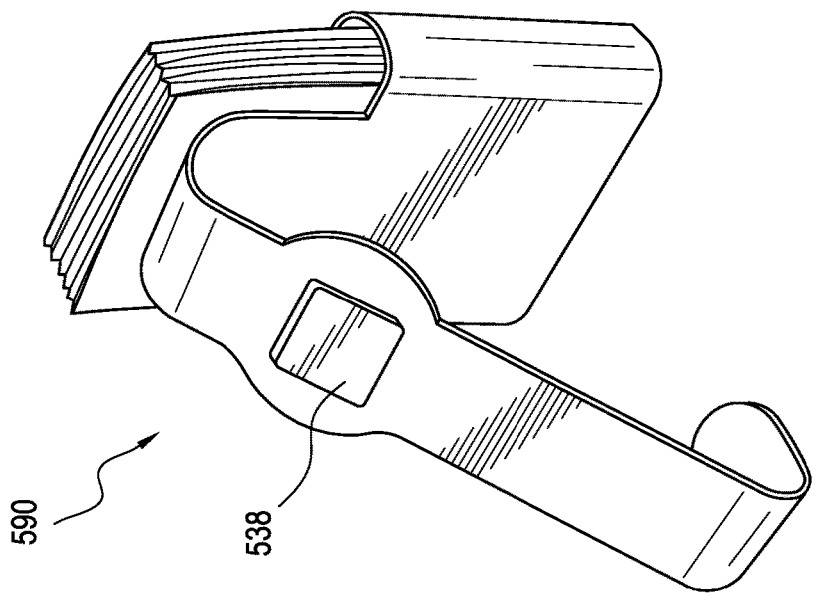
FIG. 56 is another view of the leaflet dispenser of FIG. 55.

FIGS. 55-57 are views of a leaflet dispenser 590 in accordance with an exemplary embodiment of the present disclosure. As should be apparent, leaflet dispenser 580 is configured to support a tablet or other electronic device on plate 538.

FIGS. 58-61 are views of a clamp apparatus 600 in accordance with an exemplary embodiment of the present disclosure. Clamp 600 includes a clamp body 602, a first retractable arm 604, a first folding arm 606 supported by a first hinge 608 on first retractable arm 604, a second retractable arm 610, and a second folding arm 612 supported by a second hinge 614 on second retractable arm 610. First folding arm 606 can be configured to include a first clamp pad 616 and second folding arm 612 can be configured to include a second clamp pad 618, each of which can have a coefficient of friction that reduces the slipping of first clamp pad 616 on a surface. Such coefficient of friction can be, for example, a minimum of 0.5. Each of first retractable arm 604 and second retractable arm 610 can be biased to retract within clamp body 602 by one or more bias springs 620, each of which is positioned between a first stop 622 formed within clamp body 602 and a second stop 624 formed on an interior end of a respective retractable arm 604 or 610.

Figure 58:
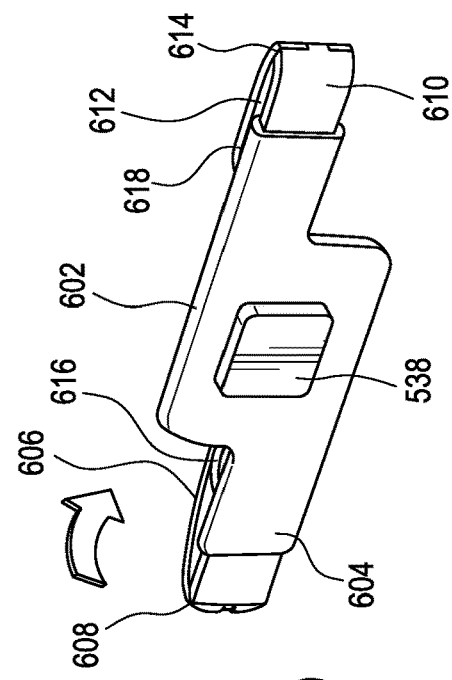
FIG. 58 is a view of a clamp apparatus in accordance with an exemplary embodiment of the present disclosure.
Figure 60:
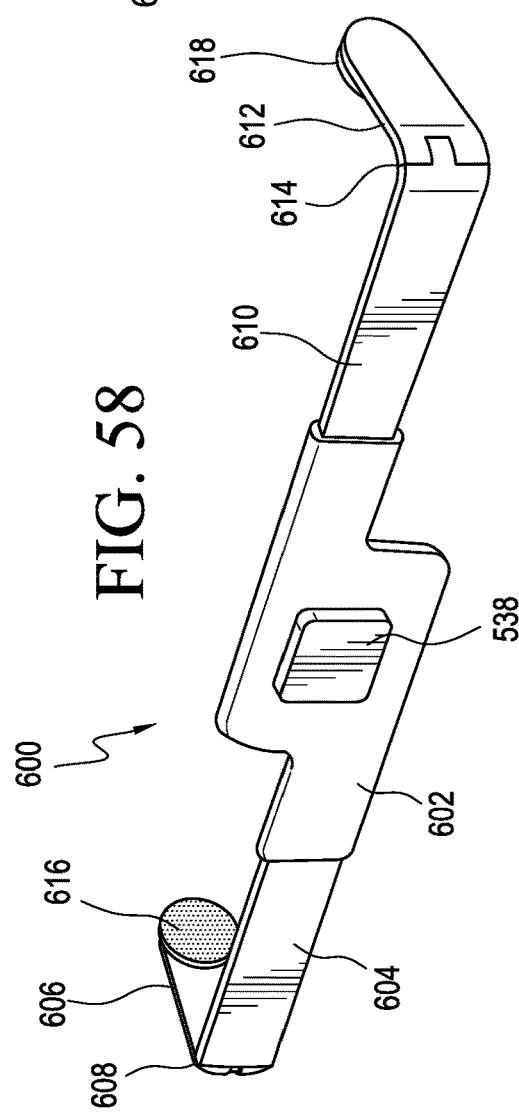
FIG. 60 is a view of a portion of the interior of the clamp apparatus of FIG. 58.
Figure 59:
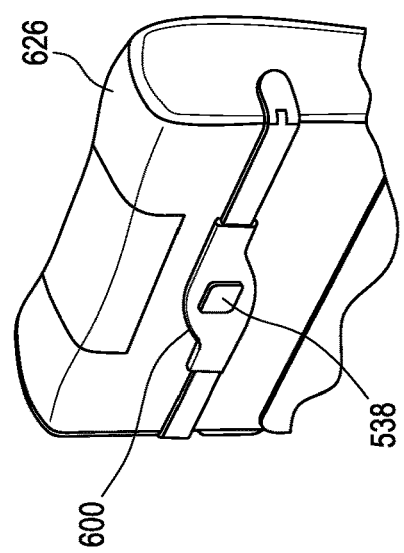
FIG. 59 is view of the clamp apparatus of FIG. 58 positioned on a seat in accordance with an exemplary embodiment of the present disclosure.
Figure 61:
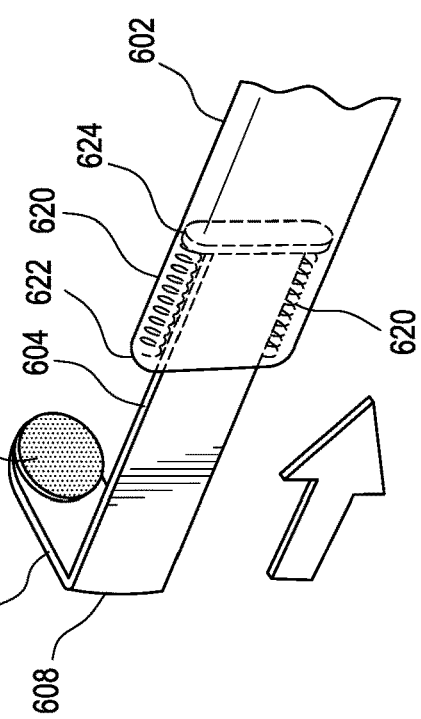
FIG. 61 is a view of the clamp apparatus of FIG. 58 in a collapsed configuration in accordance with an exemplary embodiment of the present disclosure.
Figure 63:
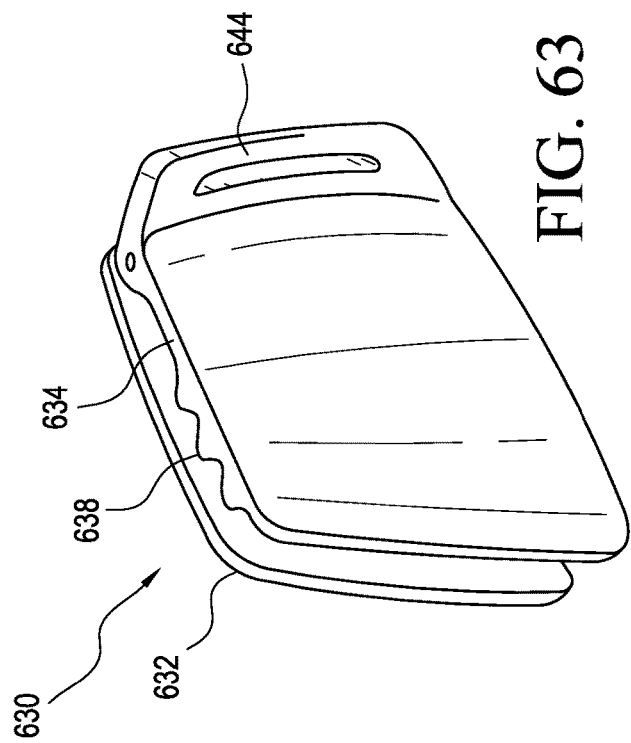
FIG. 63 is another view of the clamp apparatus of FIG. 62.
Figure 64:
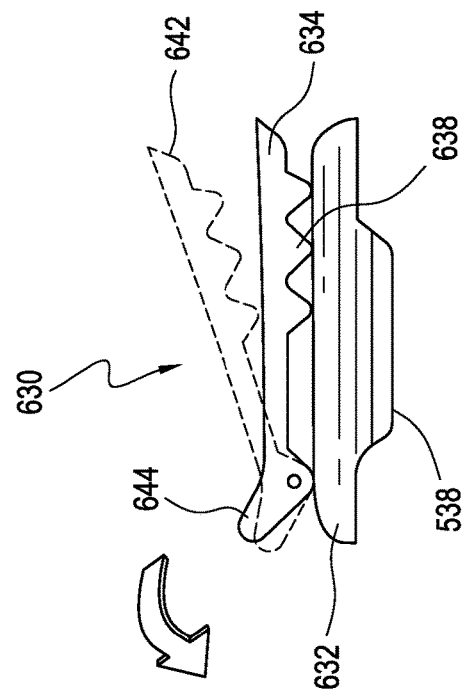
FIG. 64 is a further view of the clamp apparatus of FIG. 62.
Figure 62:
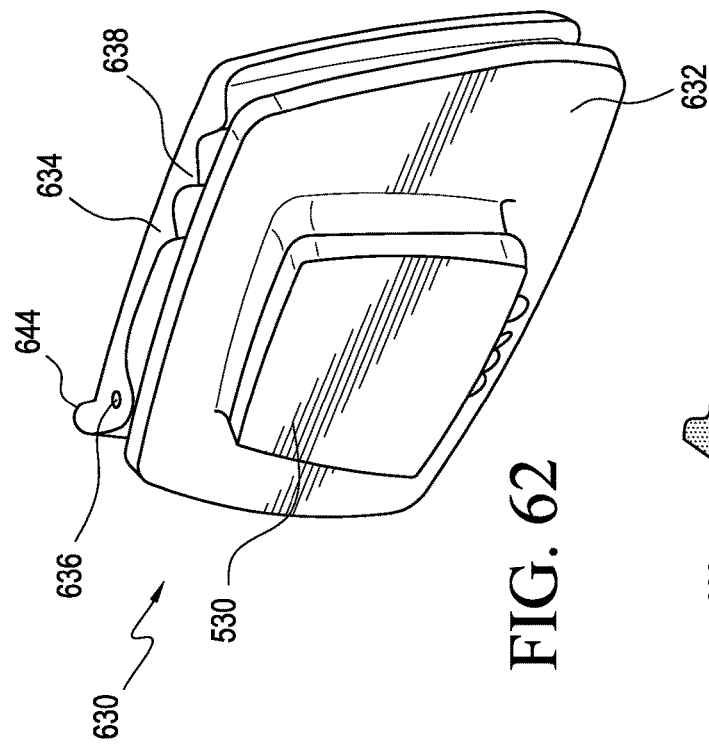
FIG. 62 is a view of a clamp apparatus in accordance with an exemplary embodiment of the present disclosure.
Figure 65:
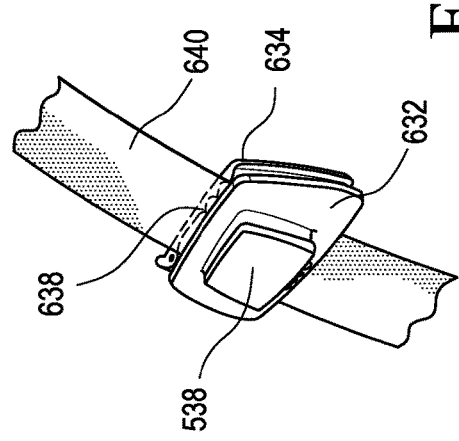
FIG. 65 is a view of the clamp apparatus of FIG. 62 positioned on a strap or belt.

When clamp apparatus 600 is configured as shown in FIG. 58, clamp apparatus can be positioned on and secured to a feature, such as a seat 626 shown in FIG. 59. Conversely, first folding arm 606 can be rotated about first hinge 608 to be positioned alongside first retractable arm 604 and clamp body 602, and first retractable arm 604 can be positioned at least partially within clamp body 602, and second folding arm 612 can be rotated about second hinge 614 to be positioned alongside second retractable arm 610 and clamp body 602, and second retractable arm 610 can be positioned at least partially within clamp body 602. Thus, clamp apparatus can be configured to be compact, as shown in FIG. 61, for storage.

FIGS. 62-70 are views of a hinged clamp apparatus 630 in accordance with an exemplary embodiment of the present disclosure. Hinged clamp apparatus 630 includes a base 632, an outer plate 634, a hinge 636 that permits movement of outer plate 634 with respect to base 632, and a plurality of teeth 638. Hinged clamp apparatus 630 is thus able to grip onto a plurality of relatively thin articles, such as a strap 640 shown in FIG. 65. Clamp apparatus 630 further includes a press plate 644 that causes outer plate 634 to be moved from a first position where outer plate 634 is in direct contact with base 632 via teeth 638 to a second position 642 where plurality of teeth 638 are positioned a spaced distance from base 632. Base 632 is configured to mate with, for example, magnet 98 of cradle 16, as shown in FIG. 67. Thus, clamp apparatus 630 can support an electronic device 18 on a wearable article, such as a head-mounted gear, e.g., headband, helmet, cap, hat 646 shown in FIG. 68, a shirt 648 shown in FIG. 69, a strap or belt 650 shown in FIG. 70, a portion of a backpack (not shown), or any other article carried by the body or worn on the body.

Figure 71:
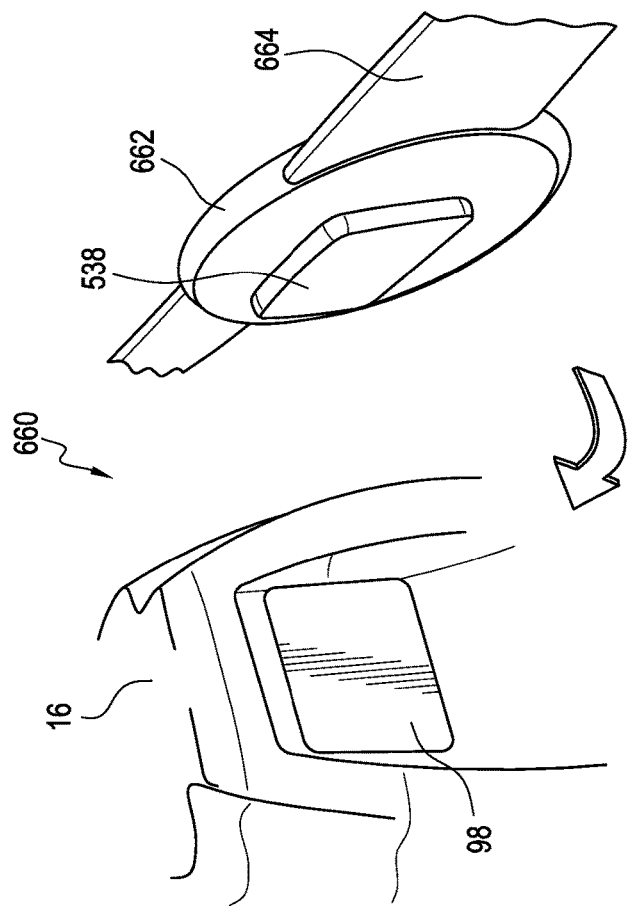
FIG. 71 is a view of a support apparatus in accordance with an exemplary embodiment of the present disclosure.

FIG. 71 is a view of a support apparatus 660 in accordance with an exemplary embodiment of the present disclosure. Support apparatus 660 includes a sliding base 662 slidably positioned on a support belt or strap 664. Sliding base 662 is configured to interface with magnet 98 of cradle 16.

Figure 72:
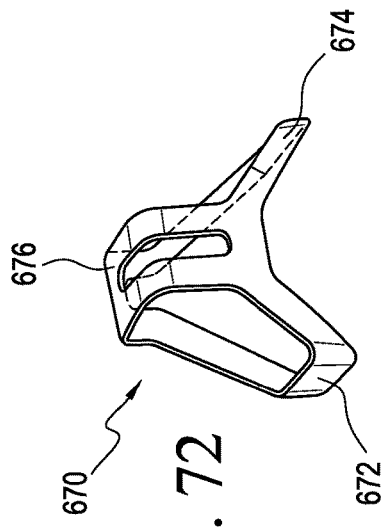
FIG. 72 is a view of a clamp in accordance with an exemplary embodiment of the present disclosure.
Figure 73:
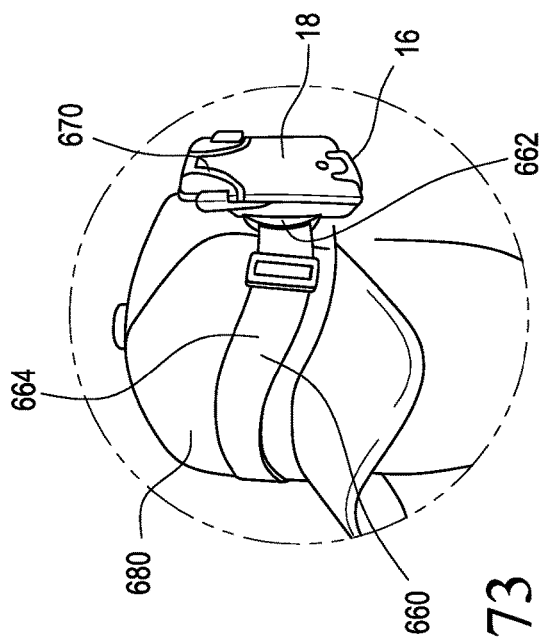
FIG. 73 is a view of the support apparatus of FIG. 71 positioned on a wearable article and the clamp of FIG. 72 in accordance with an exemplary embodiment of the present disclosure.
Figure 74:
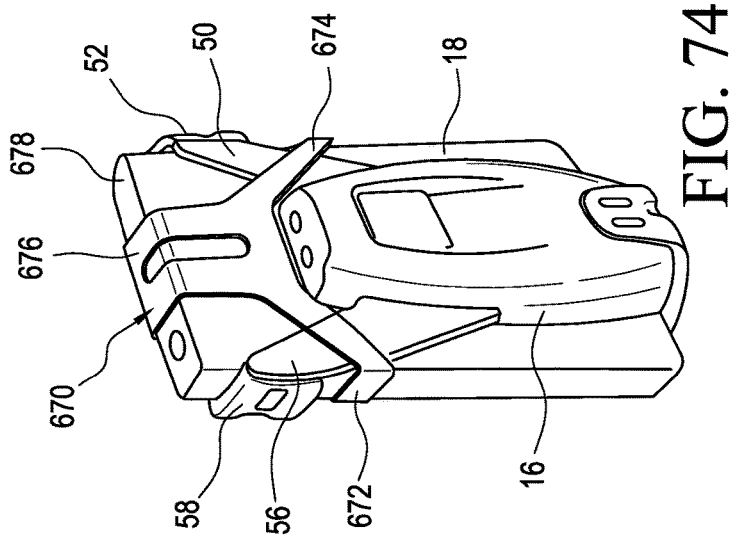
FIG. 74 is a view of the cradle of FIG. 1 with the clamp of FIG. 72 in accordance with an exemplary embodiment of the present disclosure.
Figure 75:
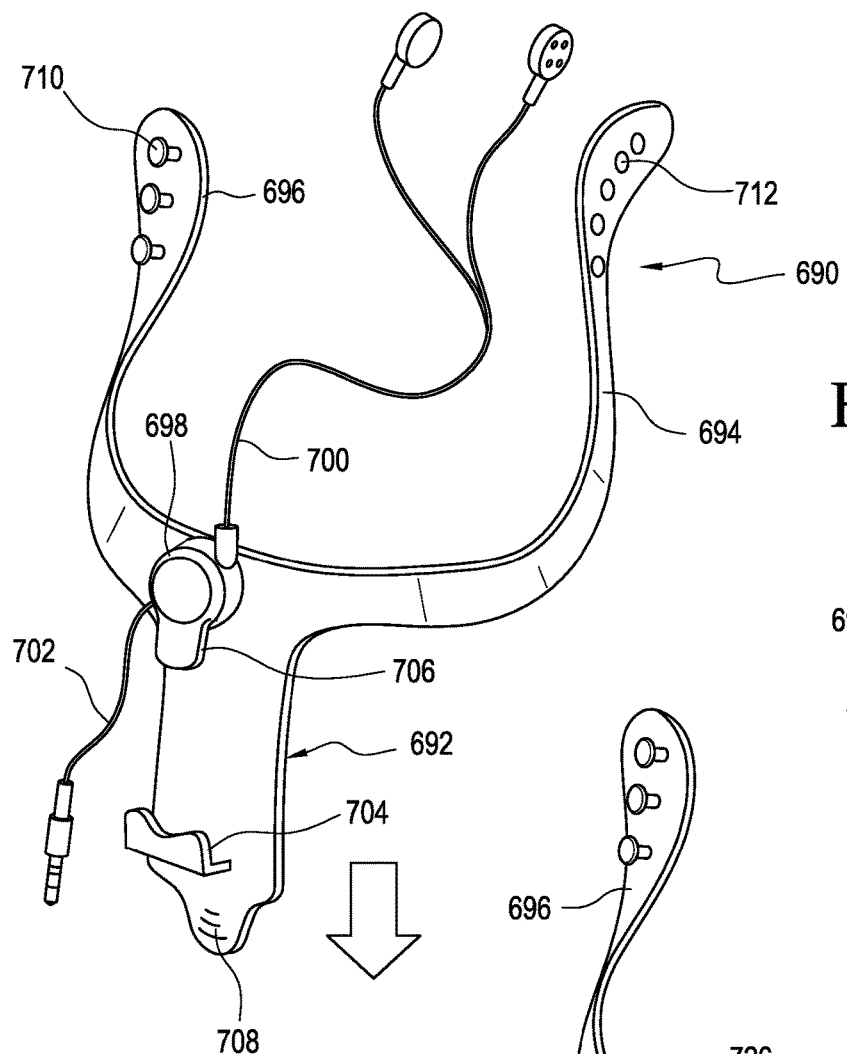
FIG. 75 is a view of a support system in accordance with an exemplary embodiment of the present disclosure.
Figure 76:
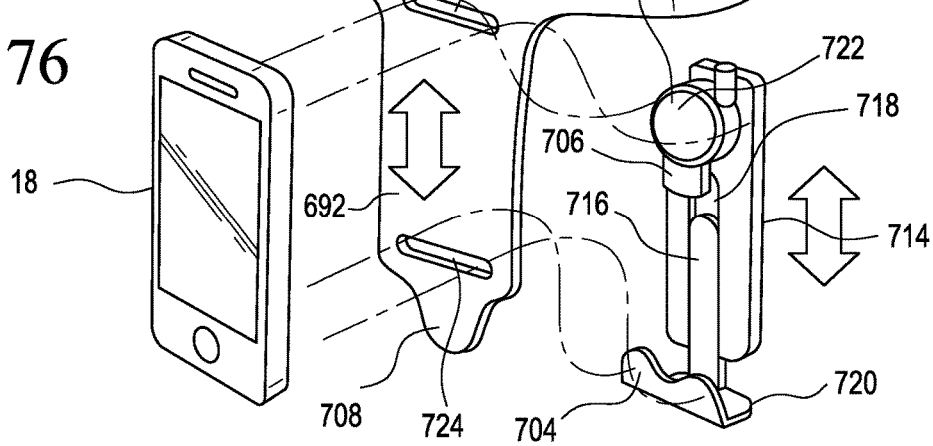
FIG. 76 is partially exploded view of the support system of FIG. 75 and an electronic device.

FIGS. 72-74 are views of a clamp 670 in accordance with an exemplary embodiment of the present disclosure. Clamp 670 is made of a compliant or stretchable material such as an elastomer. Clamp 670 includes a first band 672, a second band 674, and a central region 676 positioned between and connected to first band 672 and second band 674. Clamp 670 is configured such that when central region 676 is in contact with a top portion 678 of electronic device 18, first band 672 can be positioned to contact second arm 56 of cradle 16 in an area below second extendable support 58 and second band 674 can be positioned to contact first arm 50 of cradle 16 in an area below first extendable support 52. In this configuration, clamp 670 secures electronic device 18 on cradle 16. In other words, with clamp 670 in place, electronic device 18 is not removable from cradle 16 until clamp 670 is removed. The advantage of clamp 670 is that it allows cradle 16 to be used in any orientation, including upside down, with minimal risk that electronic device 18 is able to slide out from cradle 16. FIG. 73 shows support apparatus 660 positioned on a hat 680 with clamp 670 securing electronic device 18 to clamp apparatus 630.

FIGS. 75-79 are views of a support system 690 in accordance with an exemplary embodiment of the present disclosure. Support system 690 includes a stretchable support base 692. Support base 692 further includes a first arm 694, a second arm 696, and a pull tab 708. First arm 694 includes a plurality of openings or holes 712 configured to accept or mate with fasteners 710 formed or positioned on second arm 696. Support system 690 further includes a retraction mechanism 698 supported on support base 692. Earphones 700 are retractably supported on retraction mechanism 698. An earphone connector cord 702 also extends from retraction mechanism 698 to mate with a suitable connector located on electronic device 18. Support system 690 further includes a bottom retainer 704 and a top retainer 706 formed integrally with retraction mechanism 698. Bottom retainer 704 and top retainer 706 are positioned a spaced distance apart and are configured to support electronic device 18 on support base 692.

Retraction mechanism 698 is supported on a retraction mechanism base 714, which includes a slide channel 718 that mates with a slide 716 formed integrally with bottom retainer 704. To install or remove electronic device from support system 690, pull tab 708 is pulled downwardly, moving bottom retainer 704 away from top retainer 706, which increases the spaced distance between top retainer 706 and bottom retainer 704 and which permits electronic device 18 to move out from under either top retainer 706 or bottom retainer 704, or both, permitting removal of electronic device 18 from support system 690.

Support base 692 further includes a lower opening 724 and an upper opening 726. A lower plate 720 positioned between bottom retainer 704 and slide 716 is configured to extend through lower opening 724, and an upper plate 722 extending between retraction mechanism base 714 and retraction mechanism 698 is configured to extend through upper opening 726, thus supporting retraction mechanism 698 and bottom retainer 704 on support base 692.

Figure 77:
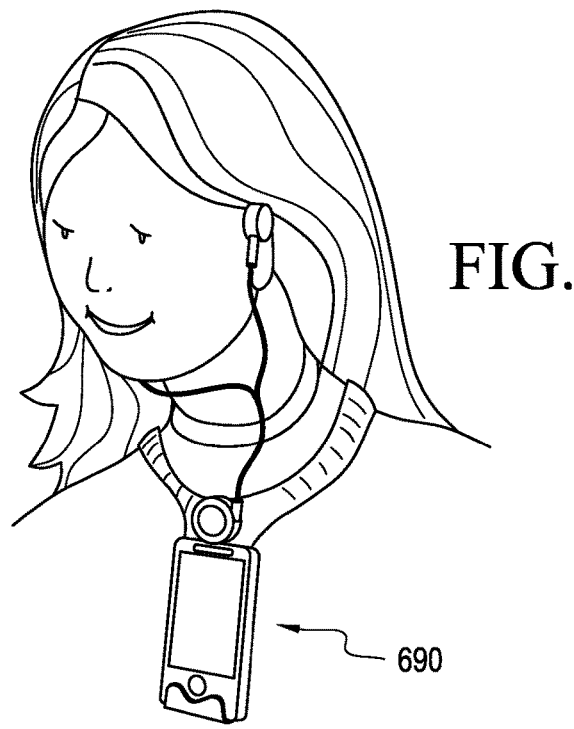
FIG. 77 is a view of the support system of FIG. 75 and an electronic device positioned on the neck of a wearer.
Figure 78:
FIG. 78 is a view of the support system of FIG. 77 showing a first mode of operation.
Figure 79:
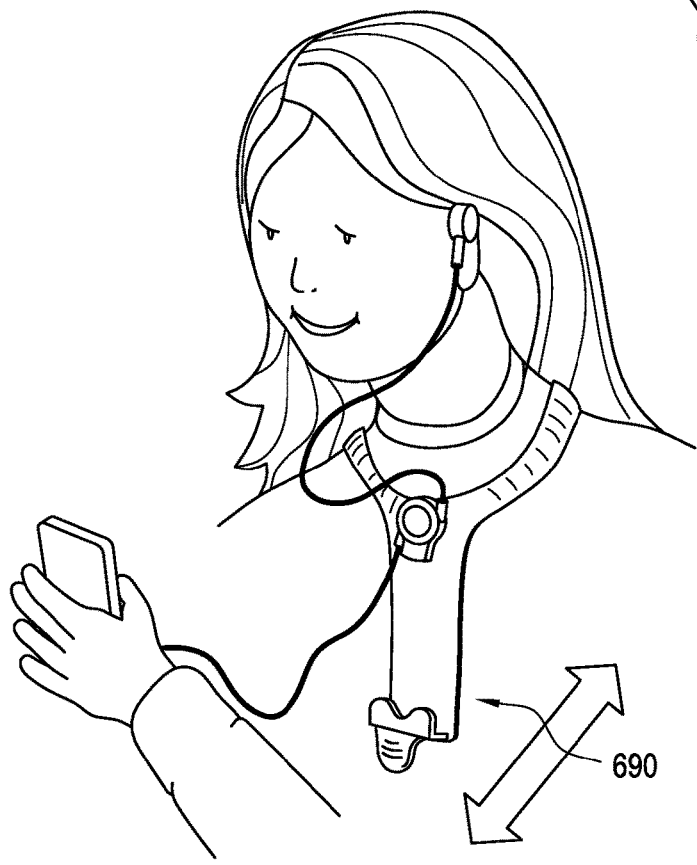
FIG. 79 is a view of the support system of FIG. 77 showing a second mode of operation.

FIGS. 77-79 show how support system 690 can operate. In FIG. 77, support system 690 is secured around the neck of the wearer by securing fasteners 710 to mating openings 712. In FIG. 78, the wearer has rotated electronic device 18 while it is supported on support system 690 to be able to view and/or operate electronic device 18. In FIG. 79, the wearer has removed electronic device 18 from support system 690 for convenience of certain operations.

Figure 80:
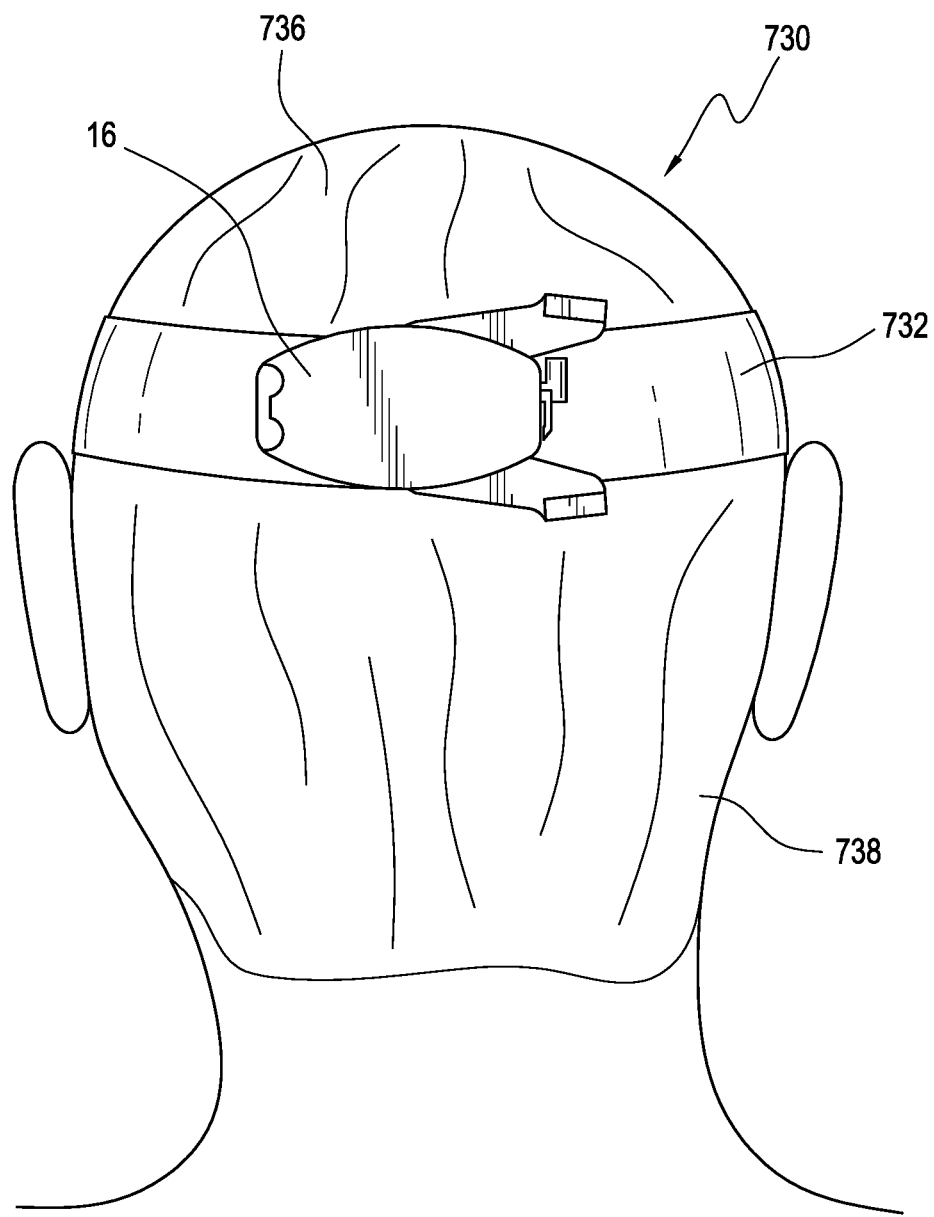
FIG. 80 is a view of a support system in accordance with an exemplary embodiment of the present disclosure.
Figure 81:
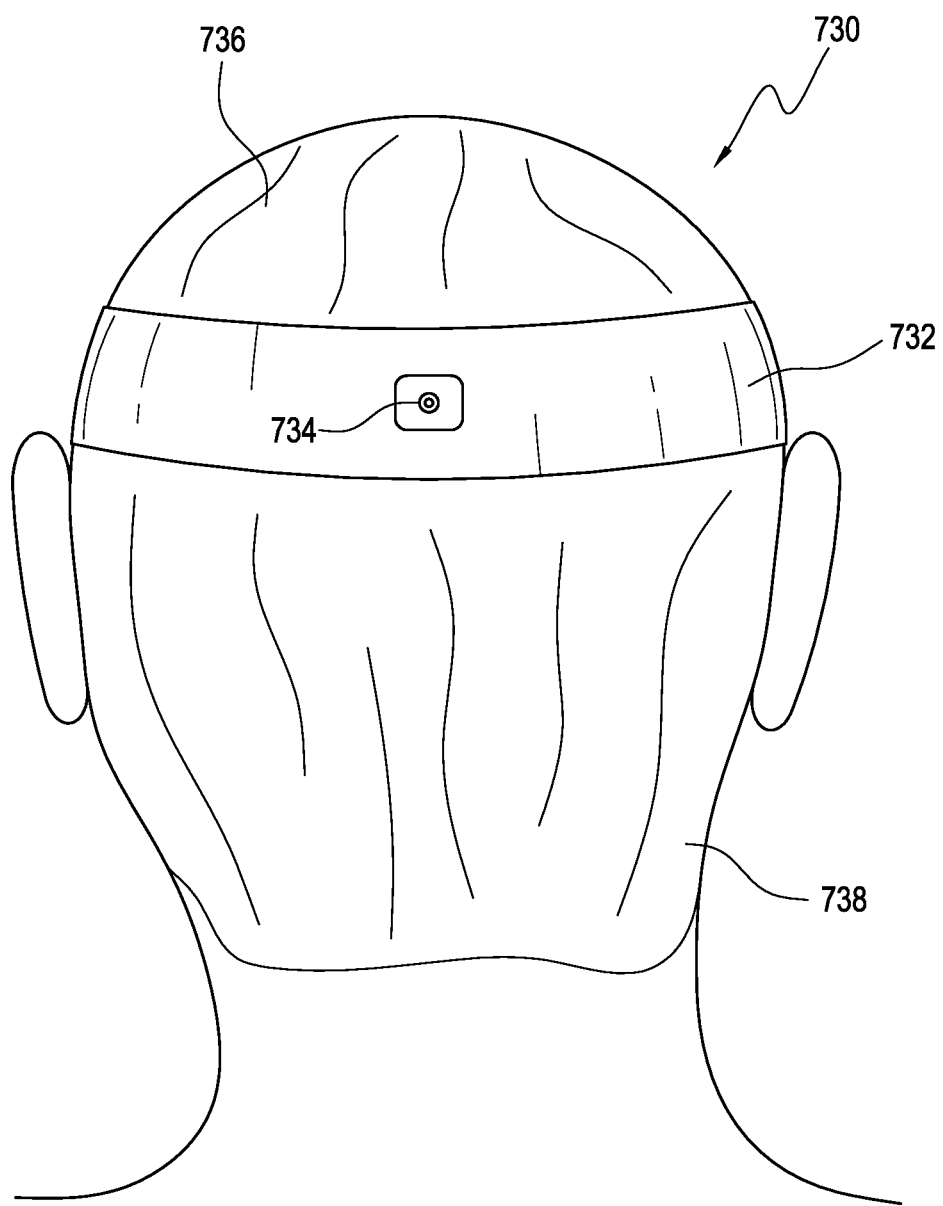
FIG. 81 is a view of the support system of FIG. 80 with a support cradle removed.

FIGS. 80 and 81 are views of a support system 730 in accordance with an exemplary embodiment of the present disclosure. Support system 730 includes a headband 732 and a ferromagnetic or magnetic plate 734 positioned on headband 732. Plate 734 is configured to mate with cradle 16, for example, magnet 98 of cradle 16. Headband 732 positions an electronic device, such as electronic device 18, at the back 736 of a wearer's head 738 in a location away from more radiation sensitive areas of a brain.

A kit can be formed of the various devices, apparatuses, etc., described herein. Such a kit could include, for example, support system (chest strap) 300, which includes band interface 304, necklace 262, including plate 264, extension cord or cable 280, and earbuds 122.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications. It should be understood that each embodiment described and each part of each figure described can be combined to form one embodiment, and this combined embodiment is within the scope of the disclosure.

I claim:

1. A support system for an electronic device, comprising:
a flexible and stretchable support base;
a top retainer; and
a bottom retainer positioned a spaced distance from the top retainer, the bottom retainer being movable by stretching of the support base to increase the spaced distance to enable insertion or removal of the electronic device,
the top retainer and the bottom retainer extending through two slots of the support base,
the support base including two arms integral with the support base, the two arms being removably interconnected with each other and being a stretchable part of the support base to support the support base around the neck of a user by the interconnection of the two arms and being removed from around the neck of the user by disconnecting of the two arms.

2. The support system of claim 1, further including a cable retraction mechanism positioned on the support base, and the top retainer is formed on the retraction mechanism.

3. The support system of claim 2, further including earbuds connected to the retraction mechanism by way of a connector, and further including a second connector positioned on a wire extending from the retraction mechanism, the second connector configured to mate with a connector on the electronic device, the wire being extendable and retractable from the retraction mechanism.

4. The support system of claim 2, wherein the retraction mechanism base includes two parts slidably mounted on each other.

5. The support system of claim 4, wherein the top retainer is a part of a first of the two parts and the bottom retainer is a part of a second of the two parts.

6. The support system of claim 1, wherein the support base includes a pull tab, the pull tab is gripped to stretch the support base.

7. The support system of claim 2, wherein the cable retraction mechanism is part of the first part of the retraction mechanism base.

* * * * *